United States Patent
Imamura et al.

(10) Patent No.: US 9,851,031 B2
(45) Date of Patent: Dec. 26, 2017

(54) JOINT AND JOINT ASSEMBLY

(71) Applicant: DAIKIN INDUSTRIES, LTD., Osaka-shi, Osaka (JP)

(72) Inventors: Hitoshi Imamura, Settsu (JP); Jihong Liu, Settsu (JP); Hideki Kono, Settsu (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 15/507,068

(22) PCT Filed: Sep. 2, 2015

(86) PCT No.: PCT/JP2015/075005
§ 371 (c)(1),
(2) Date: Feb. 27, 2017

(87) PCT Pub. No.: WO2016/035834
PCT Pub. Date: Mar. 10, 2016

(65) Prior Publication Data
US 2017/0254450 A1    Sep. 7, 2017

(30) Foreign Application Priority Data
Sep. 5, 2014    (JP) .................................. 2014-181550

(51) Int. Cl.
| | | |
|---|---|---|
| F16L 19/04 | (2006.01) | |
| F16L 33/22 | (2006.01) | |
| F16L 47/04 | (2006.01) | |

(52) U.S. Cl.
CPC .............. *F16L 19/04* (2013.01); *F16L 33/22* (2013.01); *F16L 47/04* (2013.01)

(58) Field of Classification Search
CPC ....... F16L 19/04; F16L 19/041; F16L 19/045; F16L 19/046; F16L 47/04; F16L 33/22
(Continued)

(56) References Cited

U.S. PATENT DOCUMENTS

| | | | | |
|---|---|---|---|---|
| 2,000,481 A | * | 5/1935 | Harrison ............... | F16L 33/224 285/248 |
| 2,191,582 A | * | 2/1940 | Parker .................... | F16L 19/04 285/334.5 |

(Continued)

FOREIGN PATENT DOCUMENTS

| | | |
|---|---|---|
| CN | 2814078 Y | 9/2006 |
| JP | 2009-144916 A | 7/2009 |

(Continued)

OTHER PUBLICATIONS

International Preliminary Report of corresponding PCT Application No. PCT/JP2015/075005 dated Sep. 2, 2015.

(Continued)

*Primary Examiner* — James M Hewitt, II
(74) *Attorney, Agent, or Firm* — Global IP Counselors, LLP

(57) ABSTRACT

A joint is connected to a tube and includes a joint body, nut, and ring. The joint body has a tube coupling part and a main body thread part. The nut has a nut thread part and a constricted diameter part. The ring is arranged in a space radially inward of the nut thread part. The ring abuts an abutted part of the nut. The ring has a Young's modulus greater than the tube. The ring has a curved surface part at least at a radially inward portion of the ring axially on the joint body side, the curved surface part bulging radially inward of the ring and axially toward the joint body side. A maximum thickness of the ring in a radial direction is defined as 2r, an axial length of the curved surface part of the ring is defined as h, and $\alpha = h/r$ being 0.5 to 1.2.

20 Claims, 57 Drawing Sheets

(58) Field of Classification Search
USPC .............................. 285/247, 248, 249, 334.5
See application file for complete search history.

(56) References Cited

U.S. PATENT DOCUMENTS

| | | | | |
|---|---|---|---|---|
| 2,427,260 | A | * | 9/1947 | Cowles ................. F16L 19/045 |
| | | | | 285/116 |
| 2,517,617 | A | * | 8/1950 | Woodling ............. F16L 19/045 |
| | | | | 285/334.5 |
| 2,536,354 | A | * | 1/1951 | Cowles ................. F16L 19/045 |
| | | | | 285/334.5 |
| 3,294,425 | A | * | 12/1966 | Franck ................... F16L 19/04 |
| | | | | 285/334.5 |

FOREIGN PATENT DOCUMENTS

| | | | | |
|---|---|---|---|---|
| KR | 20110111775 A | * | 10/2011 | ............ F16L 19/041 |
| TW | 201411019 A | | 3/2014 | |
| WO | 2014/013994 A1 | | 1/2014 | |

OTHER PUBLICATIONS

International Search Report of corresponding PCT Application No. PCT/JP2015/075005 dated Nov. 24, 2015.

* cited by examiner

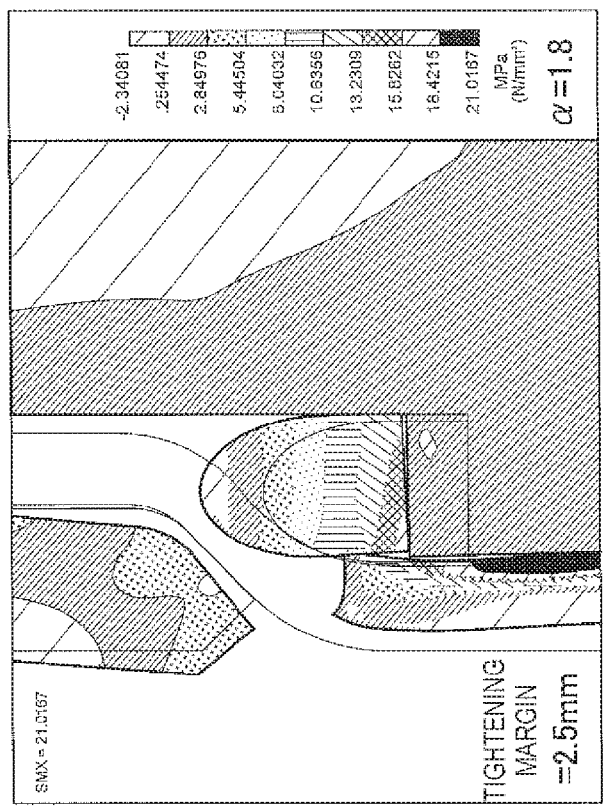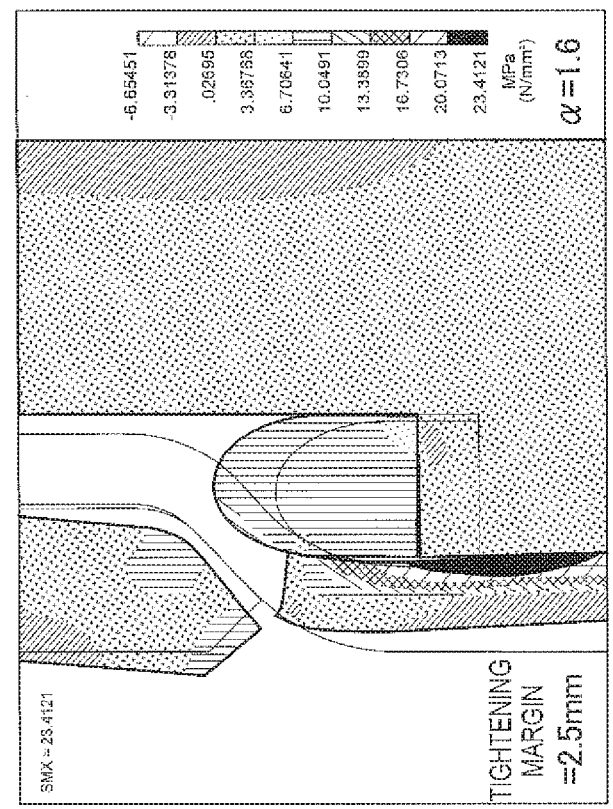
FIG. 52

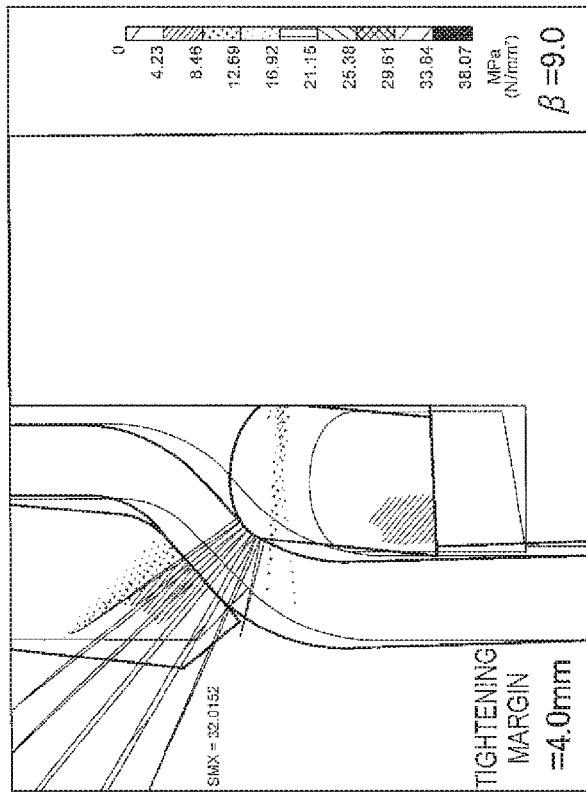
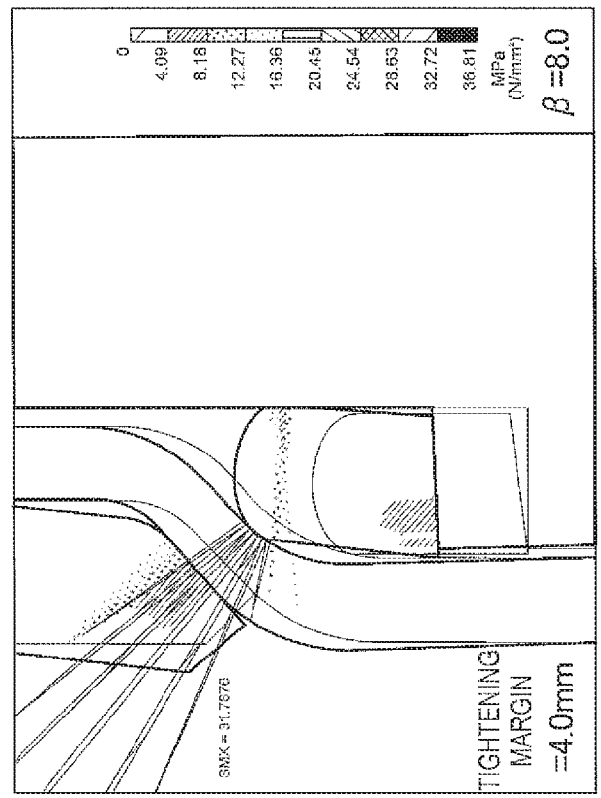
FIG. 57

JOINT AND JOINT ASSEMBLY

CROSS-REFERENCE TO RELATED APPLICATIONS

This U.S. National stage application claims priority under 35 U.S.C. §119(a) to Japanese Patent Application No. 2014-181550, filed in Japan on Sep. 5, 2014, the entire contents of which are hereby incorporated herein by reference.

TECHNICAL FIELD

The present invention relates to a joint and a joint assembly.

BACKGROUND ART

Conventionally, for example, as described in JP-A No. 2009-144916, a tube joint has been proposed, which is able to be firmly coupled so as not to leak fluid passing inside a tube.

In this tube joint, in the case in which a tube is attached to an end part of a cylindrical joint body to screw a coupling nut onto the joint body, a fixation ring is disposed between the coupling nut and the joint body. Then, when the coupling nut is screwed onto the joint body, the tube is tightened from inside the tube by the joint body and from outside the tube by the fixation ring pressed by the coupling nut.

In this tube joint, since the above configuration has been employed, when the coupling nut is screwed onto the joint body, the coupling nut rotates about the tube while the fixation ring does not rotate about the tube. Therefore, it is described that this tube joint is able to prevent an annular flaw from being made on the outer surface of the tube due to the friction between the outer surface and the fixation ring and the tube from being cut due to the friction between the outer surface and the fixation ring.

SUMMARY

Technical Problem

As described above, in the joint described in the above-mentioned JP-A No. 2009-144916, specific shapes has not been studied excluding making the fixation ring harder than the tube and making the angle of the contact portion of the fixation ring relative to the tube being 30 through 95 degrees in order to ensure sufficient abutting, a sufficient contact area, and/or a sufficient pressing force.

In contrast to this, the inventors has noticed that the change in the shape of the fixation ring causes the extent of the wedging of the fixation ring into the tube and the force of the fixation ring tightening the tube to change.

The present invention is made in light of the above. It is an object of the present invention to provide a joint and a joint assembly being able to prevent a tube from being flawed, the detachment of a tube, and the leakage of fluid flowing inside a tube.

Solution to Problem

A joint according to a first aspect is a joint connected to a tube including a resin and is provided with a joint body, a nut, and a ring. The joint body has a tube coupling part and a main body thread part. The tube coupling part constitutes one axial end side of the joint body and has at least a portion of a periphery covered by the tube. The main body thread part has an outer diameter greater than an outer diameter of the tube coupling part. In the joint body, a through hole axially extending is formed. The nut has a nut thread part and a constricted diameter part. The nut thread part is threadedly engageable with the main body thread part in a state in which the tube coupling part of the joint body has been inserted from an axial direction. The constricted diameter part is disposed on an insertion and travel side and has an inner diameter smaller than an inner diameter of the nut thread part. Toward the insertion and travel side, the tube coupling part is inserted and travels. The ring is arranged in a space radially inward of the nut thread part of the nut. The ring abuts an abutted part which is a portion of the constricted diameter part of the nut on a joint body side. The ring has a Young's modulus greater than the tube. The ring has a curved surface part at least at a radially inward portion of the ring and axially on the joint body side. The curved surface part bulges radially inward of the ring and axially toward the joint body side. In the case in which the maximum thickness of the ring in a radial direction is defined as 2r and the axial length of the curved surface part of the ring is defined as h, $\alpha=h/r$ is 0.5 or more and 1.2 or less.

In this joint, in a state in which the tube is attached to the joint body such that the inner surface of the tube contacts the outer surface of the tube coupling part of the joint body, when the nut thread part of the nut is screwed onto and threadedly engaged with the main body thread part of the joint body, the ring, which is positioned outward of the tube, abuts the abutted part of the nut and is moved closer to the end part of the tube coupling part of the joint body. Then, in a state in which a portion of the tube is sandwiched between the ring and the end part of the tube coupling part of the joint body, the ring elastically deforms to be widen radially outward. In the elastic state in which the ring elastically deformed in such a manner, the ring is able to allow an elastic force to act on the tube to hold the tube radially inward from radially outward. Then, the Young's modulus of the ring of this joint is greater than the Young's modulus of the tube. Thus, the strong elastic force of the ring is able to hold the tube to prevent the leakage of fluid flowing inside the tube.

Moreover, the ring has a curved surface part at the radially inward portion of the ring and axially on the joint body side. The curved surface part bulges radially inward of the ring and axially toward the joint body side. In the case in which the maximum thickness of the ring in the radial direction is defined as 2r and the axial length of the curved surface part of the ring is defined as h, $\alpha=h/r$ is 0.5 or more and 1.2 or less. Thus, the value of $\alpha$ of 0.5 or more is able to ensure a sufficient contact area between the ring and the tube to prevent the ring from excessively wedging into the tube and ensure a sufficient tightening force of the ring on the tube. Moreover, the value of $\alpha$ of 1.2 or less is able to make the tube resistant to detachment in the state in which the tube is tightened and fixed.

Thereby, the tube is able to be prevented from being flawed and detached, and the leakage of the fluid flowing inside the tube is prevented.

A joint according to the second aspect is the joint according to the first aspect, in which the curved surface part of the ring constitutes an arc or an ellipsoid arc axially in cross-section.

With this joint, the ring is able to be more sufficiently prevented from locally wedging into the tube.

A joint according to the third aspect is the joint according to first or second aspect, in which the radially inward portion of the ring axially on the joint body side has a shape gentler than a radially outward portion of the ring axially on the joint body side.

With this joint, the tube is able to be prevented from being flawed, and the leakage of the fluid flowing inside the tube is prevented even if the ring has a curved surface only radially inward.

A joint according to the fourth aspect is the joint according to any one of the first through third aspects, in which the abutted part of the constricted diameter part of the nut abuts a portion of the ring on the side axially opposite to the joint body side during tightening. On the side axially opposite to the joint body side, the ring primarily has a portion inclined between 1.0 degrees or greater and 7.0 degrees or smaller relative to a primary surface of the abutted part such that the portion of the ring is positioned closer to the abutted part with closing to the radially inward. Here, the phrase "primary surface" refers to a surface occupying the largest portion of the surface constituting the abutted part of the nut. Moreover, here, the phrase "primarily has" refers to a portion inclined from 1.0 degrees or greater to 7.0 degrees or smaller which occupies the largest portion of the entire portion of this ring on the side axially opposite to the joint body side (the portion which occupies a portion larger than a portion which is not inclined between 1.0 degrees or greater and 7.0 degrees or smaller).

With this joint, even in a state in which a sufficient tightening force of the ring on the tube has been ensured, the deformation in the ring itself is able to decrease, and the contact pressure distribution over the contact portion between the ring and the abutted part of the nut is able to be made uniform in the radial direction.

A joint according to the fifth aspect is the joint according to any one of the first through fourth aspects, in which a radially outward surface in the vicinity of an end part of the tube coupling part of the joint body on the insertion and travel side is inclined between 30 degrees or greater and 60 degrees or smaller relative to the axial direction.

In this joint, since the radially outward surface in the vicinity of the end part of the tube coupling part is inclined between 30 degrees or greater and 60 degrees or smaller relative to the axial direction, likely, the tube attached to radially outward in the vicinity of the end part of the tube coupling part is able to be inclined between 30 degrees or greater and 60 degrees or smaller relative to the axial direction. Thereby, the curved surface part of the ring pressed against the inclination portion of the tube is able to ensure a more sufficient contact area.

A joint according to the sixth aspect is the joint according to any one of the first through fifth aspects, in which the tube is composed of a resin composition containing at least one of PFA and FEP. The nut is composed of a resin composition containing at least one selected from the group consisting of PTFE, PFA, PVDF, ETFE, and ECTFE. The ring is composed of a resin composition containing at least one selected from the group consisting of PTFE, PFA, PCTFE, PVDF, ETFE, ECTFE, PPS, and PEEK.

With this joint, the tube is able to be more reliably prevented from being cut, and the leakage of fluid is able to be more reliably prevented.

A joint according to the seventh aspect is the joint according to any one of the first through sixth aspects, in which the ring is non-transparent. The nut is transparent or translucent.

In this joint, since the ring is non-transparent, and the nut is transparent or translucent, the presence of the ring is able to be visibly checked from outward of the nut in the state in which the ring and the nut are coupled to the tube. Thereby, the neglect of the attachment of the ring is prevented.

A joint assembly according to the eighth aspect is provided with the tube and the joint according to any one of the first through seventh aspects.

In this joint assembly, the tube is prevented from being flawed, and the leakage of fluid is able to be prevented.

Advantageous Effects of Invention

With the joint according to the first aspect and the joint assembly according to the eighth aspect, the tube is able to be prevented from being flawed and detached, and the leakage of the fluid flowing inside the tube is prevented.

With the joint according to the second aspect, the ring is able to be more sufficiently prevented from locally wedging of the ring into the tube.

With the joint according to the third aspect, the tube is able to be prevented from being flawed, and the leakage of the fluid flowing inside the tube is prevented even if the ring has a curved surface only radially inward.

With the joint according to the fourth aspect, even in the state in which a sufficient tightening force of the ring on the tube has been ensured, the deformation in the ring itself is able to decrease, and the contact pressure distribution over the contact portion between the ring and the abutted part of the nut is able to be made uniform in the radial direction.

With the joint according to the fifth aspect, the curved surface part of the ring pressed against the inclination portion of the tube is able to ensure a more sufficient contact area.

With the joint according to the sixth aspect, the tube is able to be more reliably prevented from being cut, and the leakage of fluid is able to be more reliably prevented.

With the joint according to the seventh aspect, the neglect of the attachment of the ring is prevented.

BRIEF DESCRIPTION OF DRAWINGS

FIG. 52 illustrates simulation results on first principle stress distribution during pulling out of the tube in the case in which the tightening margin is 2.5 mm, the ring 70 has $\alpha=1.6, 1.8$, and the ring 70 is composed of PCTFE.

FIG. 57 illustrates simulation results on contact pressure distribution in the case in which the tightening margin is 4.0 mm, the ring 70 has a fixed value of α=0.6, the value of β is 8.0, 9.0, and the ring 70 is composed of PCTFE.

DESCRIPTION OF EMBODIMENT

Figure 1:
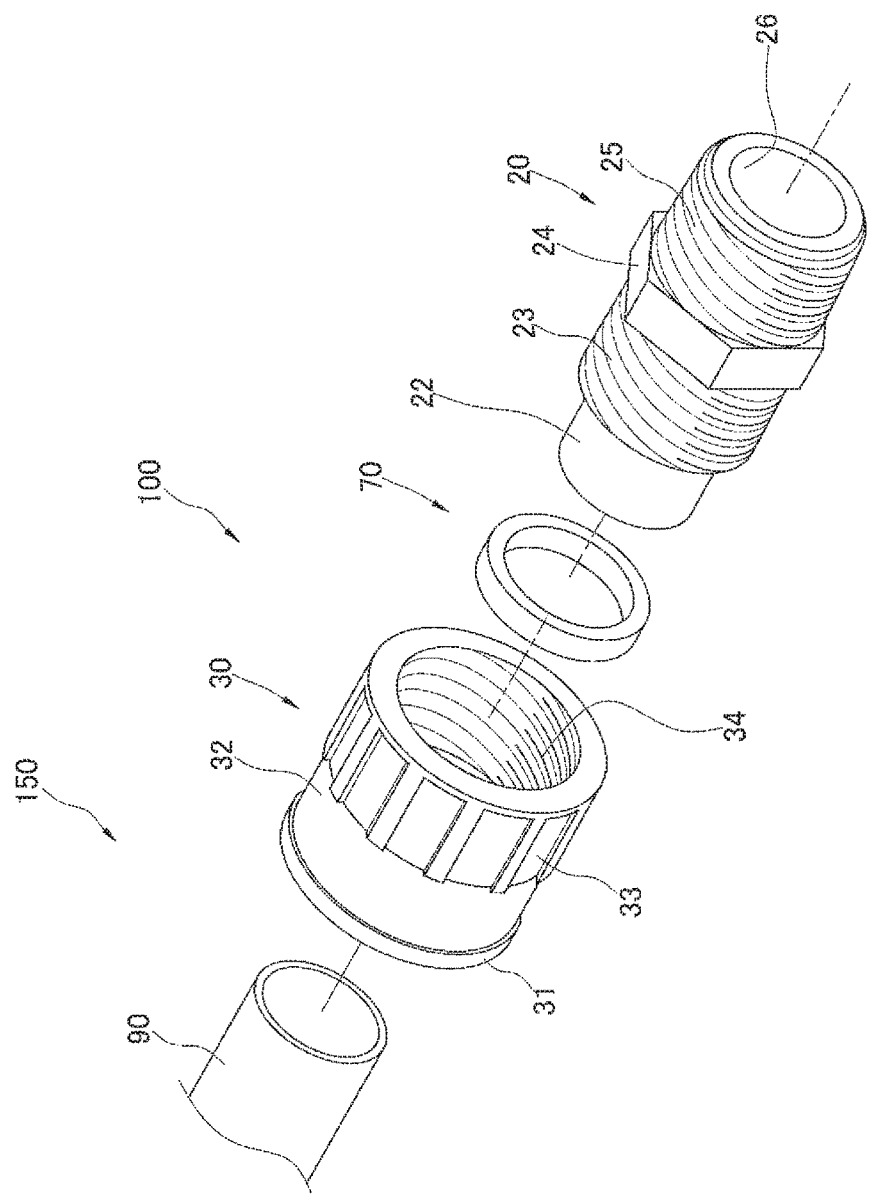
FIG. 1 is a schematic exploded perspective view illustrating the appearances of a joint and a joint assembly to be simulated.

Hereinafter, a joint and a joint assembly according to one embodiment will be described. The joint and the joint assembly will be described by way of example, but not limited thereto.

Hereinafter, it should be noted that each of parts thereof will be described with reference to illustrated referential numerals for facilitation of understanding, but not be limited to illustrated specific shapes.

(1) Joint 100 and Joint Assembly 150

A joint 100 of the present embodiment is a joint 100 connected to a tube 90, and is provided with a joint body 20, a nut 30, and a ring 70. The joint 100 is coupled and fixed to the tube 90 to configure a joint assembly 150.

(2) Tube 90

The tube 90 is an annular member including a resin.

Preferably, the tube 90 has at least an inner surface composed of the resin. For example, the tube 90 may partially include a metallic layer or the like. Moreover, the tube 90 may have a radially inner surface and a radially outer surface, which are composed of the resin, and an intermediate layer composed of metal. Moreover, preferably, the tube 90 is composed of one type of resin composition.

Although fluid passing inside the tube 90 is not particularly limited thereto, the fluid includes, for example, acid, alkali, solvent, high temperature water such as hot spring, ocean water, and industrial effluents. Acid includes, for example, hydrochloric acid, nitric acid, hydrofluoric acid, sulfuric acid, phosphoric acid, or the like. Alkali includes, for example, ammonia water, organic amines such as monoethanolamine, sodium hydroxide, potassium hydroxide or the like. Solvent includes, for example, alcohols such as methanol and propanol and organic solvents such as toluene.

The fluid passing inside the tube 90 may be in a pressurized state. Such pressurized fluid tends to cause problematic leakage of the fluid from the joint 100 portion. However, the joint 100 of the present embodiment is able to prevent the leakage even in the case in which such pressurized fluid flows inside the tube 90.

Although the size of the tube 90 is not particularly limited thereto, for example, in the case in which the tube 90 having an outer diameter having a size of 38.1 mm (1.5 inches) or greater is used, a tightening force needed for preventing the leakage of fluid will be greater, and thus the tube 90 tends to be flawed. Therefore, an effect of the present invention of preventing the leakage of fluid and the tube 90 from being flawed is able to be more noticeably demonstrated. Hereinafter, the specific size of the tube 90 will be described as an example.

From the viewpoint of ensuring more quantity of flow of fluid passing inside and making workability excellent, in a state in which the tube 90 is not coupled or fixed, or no force is acted on, preferably, the inner diameter of the tube 90 is 28.0 mm or greater and 66.0 mm or smaller, more preferably 45.0 mm or greater and 55.0 mm or smaller. Preferably, the outer diameter of the tube 90 is greater than 38.1 mm (1.5 inches), and more preferably greater than 50.8 mm (2.0 inches). Moreover, preferably, the outer diameter of the tube 90 is 70.0 mm or smaller. Furthermore, and more preferably, the outer diameter of the tube 90 is 52.0 mm or greater and 62.0 mm or smaller.

Preferably, the thickness of the tube 90 is 2.5 mm or greater and 4.0 mm or smaller, and more preferably 3.0 mm or greater and 3.5 mm or smaller.

Preferably, the bend radius of the tube 90 is 0.3 in or greater and 3.0 in or smaller, and more preferably 0.5 m or greater and 1.5 m or smaller. It should be noted that the bend radius of the tube 90 refers to a radius immediately before the tube 90 is folded (not broken) when the tube 90 is bent in an arc.

It should be noted that, as the thickness of the tube 90 increases the tube 90 becomes resistant to cuts, but the bend radius tends to be lengthen. If the bend radius is lengthen, the tube would be looped but not sufficiently compacted. Therefore, it would be difficult to carry the tube to a site. Thus, the tube would need to be divided into short lengths to be carried. However, in such a case, an on-site connection operation would be complicated, and the number of connections would increase. Therefore, the leakage problem is noticeable. Thus, in order to ensure the facilitation of the carriage of the tube 90 and the facilitation of the routing the tube at an execution site, preferably, for example, the thickness of the tube 90 is 1.0 mm or greater and 10.0 mm or smaller, and the bend radius of the tube 90 is 0.3 m or greater and 1.5 m or smaller.

Preferably, in order to enhance the facilitation of the execution during coupling and fixing the tube 90 to the joint 100, an end of the tube 90 to be connected is heated and expanded.

Preferably, the resin of which the tube 90 is composed is a resin having chemical resistance. The resin having chemical resistance includes, for example, PFA (tetrafluoroethylene-perfluoroalkylvinylether copolymer), FEP (tetrafluoroethylene-hexafluoropropylene copolymer) and their mixtures. Especially, preferably, the tube 90 is composed of PFA from the standpoint of chemical resistance, crack resistance, heat resistance, and mechanical property of being resistant to being folded though being bent. Preferably, the melting point of this resin, which is determined by a peak top obtained using DSC (differential scanning calorimetry), is 260 degrees Celsius or higher and 310 degrees Celsius or lower, and more preferably 295 degrees Celsius or higher and 310 degrees Celsius or lower. Since PFA having a melting point of 295 degrees Celsius or higher is not too soft, such PFA is able to prevent the deformation of a flared part and make the tube 90 resistant to detachment. Moreover, PFA having a melting point of 310 degrees Celsius or lower has excellent crack resistance, and thus the flared part is resistant to cracks. Preferably, the Young's modulus of this resin measured in accordance with ASTM D638 (hereinafter, the Young's modulus will be measured in the same manner) is 300 MPa or greater and 800 MPa or smaller, and more preferably 300 MPa or greater and 500 MPa or smaller. Moreover, preferably, for this resin, the Poisson's ratio is 0.44 or more and 0.50 or less, and more preferably 0.45 or more and 0.48 or less in the case in which the Poisson's ratio of a compression molding test specimen is measured using an Instron Model 1125 with a longitudinal and transverse strain gauge in accordance with JIS K 7181 at a measurement temperature of 23 degrees Celsius using a load cell of 10 ton under a full scale of 200 kg at a crosshead speed of 2 mm/min (hereinafter, the Poisson ratio will be measured in the same manner). Moreover, preferably, the yield stress of this resin is 7.7 MPa or greater and 15 MPa or smaller.

It should be noted that, preferably, the surface roughness of the tube 90 is 0.001 or more and 2.0 or less. It should be noted that, here, the surface roughness is measured using SURFTEST SV-600, a product of Mitsutoyo Corporation, in accordance with JIS B 0601-1994 as an arithmetic average roughness Ra (μm) of the outer surface of the tube 90 (hereinafter, the surface roughness will be measured in the same manner).

It should be noted that the tube 90 is shaped into an expanded state using a flaring tool before this tube is attached to a tube coupling part 22 of the joint body 20. Here, a portion of the tube 90, which is located to face a later-described radially outward insertion part 21a (a radially outward portion of a tube insertion end 21) on the tube coupling part 22 of the joint body 20, is shaped with the flaring tool such that an inclination angle of this portion is the same as an inclination angle of this radially outward insertion part 21a. Preferably, the shaping angle during the shaping with this flaring tool is 30 degrees or greater and 60 degrees or smaller. If this angle is smaller than 30 degrees, the tube 90 is readily detached from the joint 100. If this angle is greater than 60 degrees, it is difficult to insert the tube 90 onto the flaring tool.

(3) Joint Body 20

The joint body 20 has the tube coupling part 22, and a main body thread part 23, and in the joint body 20, an through hole 26 axially extending is formed.

The main body thread part 23 is disposed axially outward of the tube coupling part 22. The main body thread part 23 has an outer diameter greater than an outer diameter of the tube coupling part 22. The main body thread part 23 is configured to be threadedly engaged with a nut thread part 34 of the nut 30.

Furthermore, the joint body 20 may have an attachment side thread part 25 and a joint body operation part 24. The attachment side thread part 25 is disposed on the peripheral surface of the joint body 20 in the vicinity of the end part axially opposite to the side at which the tube coupling part 22 is disposed. The attachment side thread part 25 is configured to be threadedly engaged with a thread of a member to which the joint 100 is connected. The joint body operation part 24 is a portion held by a wrench or human's fingers when the nut 30 is screwed onto the joint body 20. The joint body operation part 24 is disposed in the axial direction between the main body thread part 23 and the attachment side thread part 25. This joint body operation part 24 has a polygonal shape or a transformed polygonal shape as viewed in the axial direction.

The tube coupling part 22 is formed in a cylindrical shape at one end side of the joint body 20. The tube coupling part 22 has an outer diameter of the peripheral portion thereof formed to be greater than the inner diameter of the ring 70 and covered by the inner surface of the tube 90 from radially outward when the expanded tube 90 is attached to the tube coupling part 22.

The main body thread part 23 is disposed such that the main body thread part 23 has an outer diameter greater than the tube coupling part 22 on the peripheral surface.

Preferably, an end on which the tube 90 is to be inserted is disposed at an axial end part of the tube coupling part 22 of the joint body 20. The end on which the tube 90 is inserted has the radially outward insertion part 21a and a radially inward insertion part 21b. The radially outward insertion part 21a constitutes a radially outward side, and is configured to have a diameter smaller toward the axial end part. The radially inward insertion part 21b is configured to have a diameter greater toward the axial end part. The radially outward insertion part 21a may be configured with an outward inclination surface or with an outer R-shaped portion on the axial end part side bulging radially outward and being gently bent. In the case in which the radially outward insertion part 21a is configured with an outward inclination surface, preferably, a smaller angle of angles made by the outward inclination surface and the axial direction is 30 degrees or greater and 60 degrees or smaller, and more preferably 40 degrees or greater and 50 degrees or smaller in a cross-section along the axis in a state in which no parts are coupled and fixed, and no force is acted on. Preferably, the radially inward insertion part 21b is not bulging radially inward at the axial end part, and preferably is configured with an inward inclination surface. This is because if the radially inward insertion part 21b is bulging radially inward, and in the state in which the joint 100 is coupled and fixed to the tube 90, fluid can be build up between the inner surface of the tube 90 and the portion of the radially inward insertion part 21b bulging radially inward. In the case in which the radially inward insertion part 21b is configured with an inward inclination surface, preferably, a smaller angle of angles made by the inward inclination surface and the axial direction is 30 degrees or greater and 70 degrees or smaller in the cross-section along the axis in the state in which no parts are coupled and fixed, and no force is acted on. By making the angle 30 degrees or greater, the thickness of the distal end of the tube coupling part 22 in a radial direction is able to be avoided from being thin; a decrease in strength is able to be avoided; and the tube coupling part 22 is readily avoided from being pushed inward by the ring 70 and/or the tube 90 to be fallen radially inward when the joint 100 is coupled and fixed to the tube 90. Moreover, by making this angle 70 degrees or smaller, fluid is able to be prevented from building up at a clearance formed between the inward inclination surface of the tube coupling part 22 and the inner surface of the tube 90.

Preferably, the radial position of the boundary portion between the radially outward insertion part 21a and the radially inward insertion part 21b on the tube coupling part 22 of the joint body 20 is within the width of the thickness of the tube coupling part 22, and the boundary portion is positioned radially closer to the inner side of the tube coupling part 22. Moreover, preferably, the diameter of a circle constituted by this boundary portion is smaller than the inner diameter of the ring 70. Thus, the shape of the distal end of the boundary portion of the tube coupling part 22 is avoided from piercing the tube 90 in the direction of the thickness of the tube 90, and the tube 90 is made to be resistant to cuts in the state in which the tube 90 is coupled and fixed to the joint 100. It should be noted that, in the case in which the radially outward insertion part 21a is configured with an outward inclination surface, and the radially inward insertion part 21b is configured with an inward inclination surface, preferably, a smaller angle of angles made by the outward inclination surface and the inward inclination surface is 80 degrees or greater, and more preferably 90 degrees or greater in the cross-section along the axis in the state in which no parts are coupled and fixed, and no force is acted on. Thus, the shape of the distal end of the boundary portion of the tube coupling part 22 is avoided from being into a too sharp shape. It should be noted that in the case in which the ring 70 described later is provided with an inclination surface on the joint body 20 side and radially inward, and the tube coupling part 22 is provided with an outward inclination surface, preferably, the difference between an inclination angle of an inclination surface of this ring 70 and an inclination angle of an outward inclination surface of the tube coupling part 22 is smaller than 10 degrees, and more preferably both of the angles are identical in the cross-section along the axis.

Moreover, preferably, the diameter of the circle constituted by the boundary portion of the tube coupling part 22 is smaller than the outer diameter of the tube 90, and greater than the inner diameter of the tube 90. Thereby, in the state in which the tube 90 is coupled and fixed to the joint 100, the tube coupling part 22 of the joint body 20 is able to be made resistant to being fallen radially inward and be avoided from hindering the flow of fluid, and the tube 90 is able to be made resistant to cuts.

Preferably, the outer diameter of the tube coupling part 22 of the joint body 20 is 1.05 times or more and 1.10 times or less of the outer diameter of the tube 90 in the state in which no parts are coupled and fixed, and no force is acted on.

Preferably, the thickness of the tube coupling part 22 of the joint body 20 in a radial direction is 1.5 times or more and 1.8 times or less of the thickness of the tube 90 in the state in which no parts are coupled and fixed, and no force is acted on.

The joint body 20 may be configured with a plurality of parts, and preferably composed of one type of resin composition. Preferably, also, this resin of which the joint body 20 is composed is a resin having chemical resistance in the same manner as the tube 90. Such resin includes, for example, PTFE (polytetrafluoroethylene) or PFA (tetrafluoroethylene-perfluoroalkylvinylether copolymer). In the case in which PTFE is used as a resin of which the joint body 20 is composed, preferably, the melting point of this PTFE, which is determined by a peak top obtained using DSC (differential scanning calorimetry), is 320 degrees Celsius or higher and 330 degrees Celsius or lower, and more preferably 327 degrees Celsius. In the case in which PFA is used as a resin of which the joint body 20 is composed, preferably, the melting point of this PFA, which is determined by a peak top obtained using DSC (differential scanning calorimetry), is 260 degrees Celsius or higher and 310 degrees Celsius or lower, more preferably 295 degrees Celsius or higher and 310 degrees Celsius or lower. Here, particularly not limited thereto, for example, raw material of a molded product of PTFE is fired in a hot wind environmental furnace at 360 degrees Celsius or higher and 380 degrees Celsius or lower after the powdery PTFE raw material powder is compressed and consolidated in a metal mold; the molded material is worked after cooled; and then a finished product is able to be obtained. At this time, if the raw material powder is insufficiently fired during heating, the melting point is higher than 327 degrees Celsius, and thereby a mechanical property will be poor and defects such as a crack will be caused. Moreover, preferably, the Young's modulus of this resin is 300 MPa or greater and 800 MPa or smaller, and more preferably 350 MPa or greater and 600 MPa or smaller. Moreover, preferably, the Poisson's ratio of this resin is 0.40 or more and 0.48 or less. Moreover, preferably, the yield stress of this resin is 7.0 MPa or greater and 15.0 MPa or smaller.

It should be noted that, preferably, the surface roughness of the joint body 20 is 0.001 or more and 2.0 or less.

(4) Nut 30

The nut 30 has the nut thread part 34 and a constricted diameter part 36.

The nut thread part 34 is configured to be threadedly engaged with the main body thread part 23 in a state in which the tube coupling part 22 of the joint body 20 has been inserted from one axial end side (an opening for insertion side) to the other axial end side.

The constricted diameter part 36 is disposed at the other axial end side (the side opposite to the opening for insertion). The constricted diameter part 36 is configured to have an inner diameter smaller than the nut thread part 34. The constricted diameter part 36 has an abutted part 37. The inner diameter of the constricted diameter part 36 is configured to be substantially equal to the outer diameter of the tube 90. The abutted part 37 constitutes a portion of this constricted diameter part 36 facing the one axial end side (the opening for insertion). The abutted part 37 primarily has, for example, a surface (as a primary surface) of which the direction of the normal line is in the axial direction of the ring 70. The abutted part 37 is a portion abutted a portion of the ring 70 (an axial end of the ring 70) in the state in which the tube 90 is coupled and fixed to the joint 100.

Preferably, the nut 30 has a thickness in the radial direction at the axial end part on the opening for insertion side, which is configured to be thicker than a portion in the vicinity thereof.

Preferably, a nut 30 cylindrical part is formed in the nut 30 in the axial direction between the nut thread part 34 and the constricted diameter part 36. The nut 30 cylindrical part has an axially extending cylindrical shape without a thread.

The nut 30 may have a nut operation part 33. The peripheral shape of the nut operation part 33 has a polygonal shape or a transformed polygonal shape as viewed in the axial direction. The nut operation part 33 is a portion held by a wrench or human's fingers when the nut 30 is screwed onto the joint body 20.

Although the shape of the abutted part 37 is not particularly limited thereto, in the state in which the tube 90 is coupled and fixed to the joint 100, preferably, the shape of the abutted part 37 is the shape corresponding to an abutting portion of the ring 70. For example, in the case in which the abutting portion of the ring 70 has a portion having a surface shape and the direction of the normal line of the surface thereof is in the axial direction in the state in which the tube 90 is coupled and fixed to the joint 100, preferably, the abutted part 37 is also configured to have a surface shape and configured such that the direction of the normal line of the surface thereof is in the axial direction.

Preferably, the nut 30 is composed of one type of resin composition. Preferably, also, this resin of which the nut 30 is composed is a resin having chemical resistance in the same manner as the tube 90 and the joint body 20. Such resin includes, for example, PFA (tetrafluoroethylene-perfluoroalkylvinylether copolymer), PVDF (polyvinylidene fluoride), ETFE (tetrafluoroethylene-ethylene copolymer), PTFE (polytetrafluoroethylene), ECTFE (ethylene-chlorotrifluoroethylene copolymer), and their mixtures. Especially, preferably, the nut 30 is composed of PFA. Preferably, the melting point of this resin, which is determined by a peak top obtained using DSC (differential scanning calorimetry), is 295 degrees Celsius or higher and 310 degrees Celsius or lower. Since PFA having a melting point of 295 degrees Celsius or higher is not too soft, such PFA is able to prevent the deformation and make the tube 90 resistant to detachment. Moreover, PFA having a melting point of 310 degrees Celsius or lower has excellent crack resistance, and thus is resistant to cracks. Preferably, the Young's modulus of this resin is 300 MPa or greater and 1700 MPa or smaller, and more preferably 350 MPa or greater and 1600 MPa or smaller. Moreover, preferably, the Poisson's ratio of this resin is 0.34 or more and 0.47 or less. Moreover, preferably, the yield stress of this resin is 7.0 MPa or greater and 50 MPa or smaller.

It should be noted that, preferably, the nut 30 is transparent or translucent from the standpoint of visibly checking whether the ring 70 is positioned inside thereof (whether the attachment of the ring 70 is not neglected) in the state in which the tube 90 is coupled and fixed to the joint 100.

(5) Ring 70

The ring 70 is arranged in a space radially inward of the nut thread part 34 of the nut 30. The ring 70 has a greater Young's modulus than the tube 90. The ring 70 is an annular member to be used while abutting the abutted part 37 of the constricted diameter part 36 of the nut 30. It suffices that, in the joint 100, at least one ring 70 is used, but a plurality of rings 70 may be used. In the case in which a plurality of rings 70 is used, the ring 70 abutting the abutted part 37 of the constricted diameter part 36 of the nut 30 may be different from the ring 70 facing the distal end of the tube coupling part 22 of the joint body 20.

In a state in which the joint body 20, the nut 30, and the ring 70 are coupled to and tightened to the tube 90, the ring 70 is able to press the tube 90 radially inward from radially outward with its own stress. When the Young's modulus of the ring 70 is adjusted to be greater than the Young's modulus of the tube 90, in a state in which a portion of the tube 90 is sandwiched between the ring 70 and the end part of the tube coupling part 22 of the joint body 20, the ring 70 is elastically deformed to be widen radially outward to allow an elastic force to act on so as to hold the tube 90 radially inward from radially outward. Thereby, the tube 90 is firmly fixed to make the tube 90 resistant to detachment, and leakage of fluid passing inside the tube 90 is able to be prevented.

Moreover, since the ring 70 is used as a member separate from the nut 30, in the stage of screwing the nut 30 onto the joint body 20, the nut 30 rotates about the tube 90. However, the ring 70 does not actively rotate. Thereby, a flaw on the periphery of the tube 90, caused by the rotate of the ring 70, is able to be prevented, and thus the tube 90 is able to be protected from cuts.

The shape of the ring 70 has a curved surface part at a radially inward portion of the ring 70 axially on the joint body 20 side. The curved surface part bulges radially inward of the ring 70 and axially toward the joint body 20 side in the cross-section along the axis. In the case in which the maximum thickness of the ring 70 in a radial direction is defined as 2r and the axial length of the curved surface part of the ring 70 is defined as h, $\alpha=h/r$ is 0.5 or more and 1.2 or less is satisfied. If this is satisfied, the ring 70 is not particularly limited. The value of $\alpha$ may be 0.6 or more and 1.0 or less. For example, a radially inward portion and/or a radially outward portion of the ring 70 on the side axially opposite to the joint body 20 side may be configured to have a corner. These corners may have a chamfered shape or a rounded shape. Moreover, a radially outward portion of the ring 70 axially on the joint body 20 side may be configured to have a corner. This corner may have a chamfered shape or a rounded shape. Moreover, the radially outward portion of the ring 70 axially on the joint body 20 side may have a shape symmetric to the curved surface part at the radially inward portion of the ring 70 axially on the joint body 20 side.

Moreover, the end part of the ring 70 on the side axially opposite to the joint body 20 side may be configured to be inclined relative to the radial direction of the ring 70 by having a radially outward portion of the ring 70 extending toward the side opposite to the joint body 20 side more than a radially inward portion of the ring 70. Moreover, on the side axially opposite to the joint body 20 side, the ring 70 may primarily have a portion inclined between 1.0 degrees or greater and 7.0 degrees or smaller relative to the primary surface of the abutted part 37 of the nut 30 such that this portion of the ring 70 is positioned closer to the abutted part 37 with closing to the radially inward. Here, preferably, at the end part of the ring 70 on the side axially opposite to the joint body 20 side, an inclination angle of this inclined portion of the ring 70 relative to the primary surface of the abutted part 37 of the nut 30 constituting the largest portion is 1.0 degrees or greater and 7.0 degrees or smaller, and more preferably 1.0 degrees or greater and 4.0 degrees or smaller. It should be noted that, in the case in which the normal line of the primary surface of the abutted part 37 of the nut 30 is in the axial direction of the ring 70, preferably, an inclination angle of the surface of the ring 70 primarily constituting the portion on the side axially opposite to the joint body 20 side relative to the radial direction of the ring 70 is 1.0 degrees or greater and 7.0 degrees or smaller, and more preferably 1.0 degrees or greater and 4.0 degrees or smaller. Such inclination angles enable the deformation in the ring 70 itself to decrease and contact pressure distribution over the contact portion between the ring 70 and the abutted part 37 of the nut 30 to be uniform in the radial direction even in a state in which a sufficient tightening force of the ring 70 on the tube 90 has been ensured.

It should be noted that, preferably, the curved surface part of the ring 70 bulging radially inward of the ring 70 and axially toward the joint body 20 side is positioned in a portion of 30% or greater and 60% or smaller of the radial width of the ring 70 and 30% or greater and 60% or smaller of the axial width of the ring 70. The curved surface part provided in this manner avoids a local force from acting on the tube 90 from the ring 70, and thereby the tube 90 is able to be prevented from being cut even in the case in which the ring 70 having a greater Young's modulus than that of the tube 90 is employed to ensure a tightening force. Moreover, the contact area between the ring 70 and the tube 90 is not too wide, and thereby the tube 90 is able to be prevented from being detached due to a distributed tightening force of the ring 70.

In the case in which the radially inward portion, the radially outward portion of the ring 70 on the side axially opposite to the joint body 20 side and/or the radially outward portion of the ring 70 axially on the joint body 20 side have a chamfered shape or a rounded shape, preferably, these shapes are a portion of 1% or greater and 30% or smaller of the radial width of the ring 70 and 1% or greater and 30% or smaller of the axial width of the ring 70.

Moreover, since the tube 90 is attached in a state in which the tube 90 is inclined relative to the axial direction along the outer surface of the radially outward insertion part 21a of the joint body 20, the curved surface part at a radially inward portion of the ring 70 axially on the joint body 20 side is pressed in the direction in which the thickness of the tube 90 is narrowed against a portion of the tube 90 on the outer surface thereof inclined relative to the axial direction. On the other hand, the radially outward insertion part 21a of the joint body 20 is pressed in the direction in which the thickness of the tube 90 is narrowed against a portion of the tube 90 on the inner surface thereof inclined relative to the axial direction. Thereby, the tube 90 is held by the curved surface part at the radially inward portion of the ring 70 axially on the joint body 20 side and the radially outward insertion part 21a of the joint body 20. The thickness of this held portion of the tube 90 is thinner compared to the other portion of the tube 90. Moreover, the thickness of a portion of the tube 90 at the rear of the held portion is thicker than that of the held portion of the tube 90. Thereby, since it is difficult for the thicker portion of the tube 90 to pass the portion held by the curved surface part of the ring 70 and the radially outward insertion part 21a of the joint body 20, the tube 90 is resistant to being detached forward.

Preferably, the inner diameter of the ring 70 is 1.001 times or more and 1.04 times or less of the outer diameter of the tube 90, and more preferably 1.001 times or more and 1.01 times or less of the outer diameter of the tube 90.

Preferably, the thickness of the ring 70 in a radial direction is thicker than the thickness of the tube 90. More particularly, preferably, the thickness of the ring 70 in a radial direction is 1.2 times or more and 2.5 times or less, more preferably 1.2 times or more and 2.0 times or less, and further more preferably 1.4 times or more and 1.8 times or less of the thickness of the tube 90.

The axial width of the ring 70 is not particularly limited thereto. For example, preferably, the axial width of the ring 70 is 0.5 times or more and 4 times or less, and more preferably 1.0 times or more and 2.0 times or less of the thickness of the ring 70 in a radial direction.

Preferably, the ring 70 is composed of one type of resin composition. Preferably, also, this resin of which the ring 70 is composed is a resin having chemical resistance in the same manner as the tube 90, the joint body 20, and the nut 30. Such resin includes, for example, PTFE (polytetrafluoroethylene), PFA (tetrafluoroethylene-perfluoroalkylvinylether copolymer), PCTFE (polychlorotrifluoroethylene), PVDF (polyvinylidene fluoride), ETFE (tetrafluoroethylene-ethylene copolymer), ECTFE (ethylene-chlorotrifluoroethylene copolymer), PPS (polyphenylene sulphide), PEEK (polyether ether ketone), and their mixtures. These resins composition may contain fillers. However, preferably, these resins do not contain fiberglass. Preferably, such resin includes especially PVDF or PCTFE. Preferably, the melting point of this resin, which is determined by a peak top obtained using DSC (differential scanning calorimetry), is 130 degrees Celsius or higher and 290 degrees Celsius or lower, and more preferably 160 degrees Celsius or higher and 230 degrees Celsius or lower. Since the melting point falling within these ranges makes the ring 70 not too soft, the deformation is able to be prevented. Thereby, the tube 90 is able to be resistant to detachment, and has excellent crack resistance, and thus is resistant to cracks. Preferably, the Young's modulus of this resin is 500 MPa or greater and 4000 MPa or smaller, more preferably greater than the Young's modulus of the nut 30, still more preferably greater than the Young's modulus of the tube 90, and further more preferably 1000 MPa or greater and 2500 MPa or smaller. Moreover, preferably, the Poisson's ratio of this resin is 0.34 or more and 0.47 or less. Moreover, preferably, the yield stress of this resin is 7.0 MPa or greater and 170 MPa or smaller.

It should be noted that, in the case in which the nut 30 is transparent or translucent, from the standpoint of preventing the neglect of the attachment of the ring 70, preferably, the ring 70 is non-transparent or colored.

It should be noted that, preferably, the surface roughness of the ring 70 is 0.001 or more and 8.0 or less.

(6) Relationship of Each Member

Preferably, the relationship among raw material of which each of members is made, that is, a combination of the resins of which the tube 90, the ring 70, and the nut 30 are composed includes PFA as the resin of which the tube 90 is composed and PVDF or PCTFE as the resin of which the ring 70 is composed. It should be noted that, more preferably this combination includes PFA as the resin of which the nut 30 is composed and PTFE or PFA the resin of which the joint body 20 is composed.

EXAMPLE

Hereinafter, a structure of a joint and joint assembly used for simulations will be described. Furthermore, simulations for studying changes in a tightening force in the case in which the curvature of the curved surface part of a ring was changed, behavior during a process of pulling out of a tube, changes in a tightening force in the case in which the inclination shape of the side of the ring axially opposite to the joint body, and the like will be described.

It should be noted that an actual nut-tightening operation is performed by imparting torque. However, in these simulations, a nut-tightening operation was simulated in an axially symmetric model in which a nut was subjected to axial forced displacement, and thereby a tightening force was calculated. More particularly, this tightening force was calculated on the basis of a reaction force needed for generating axial forced displacement in the nut.

FIG. 1 illustrates the appearances of the joint and the joint assembly used to be simulated.

The joint assembly 150 is configured with the joint 100 and the tube 90 coupled and fixed to each other.

The joint 100 is configured with the joint body 20, the ring 70, and the nut 30.

In a state in which one end of the tube 90 is coupled to the tube coupling part 22 of the joint body 20 (later-described), the nut 30 is threadedly engaged with the joint body 20. Thereby, the tube 90 is held by the ring 70, which is positioned radially inward of the nut 30 and radially outward of the tube 90, and the tube insertion end 21 (later-described) of the joint body 20, and then is coupled and fixed.

Hereinafter, each of the members will be described in detail separately.

(Tube 90)

The tube 90 was composed of PFA, and had an outer diameter of 57.4 mm, an inner diameter of 50.8 mm, and a thickness of 3.3 mm in a radial direction. The bend radius of this tube 90 was 0.91 m, the Young's modulus of this tube 90 was 390 MPa. Moreover, this tube had a Poisson's ratio of 0.45 and a yield stress of 8.0 MPa.

Figure 2:
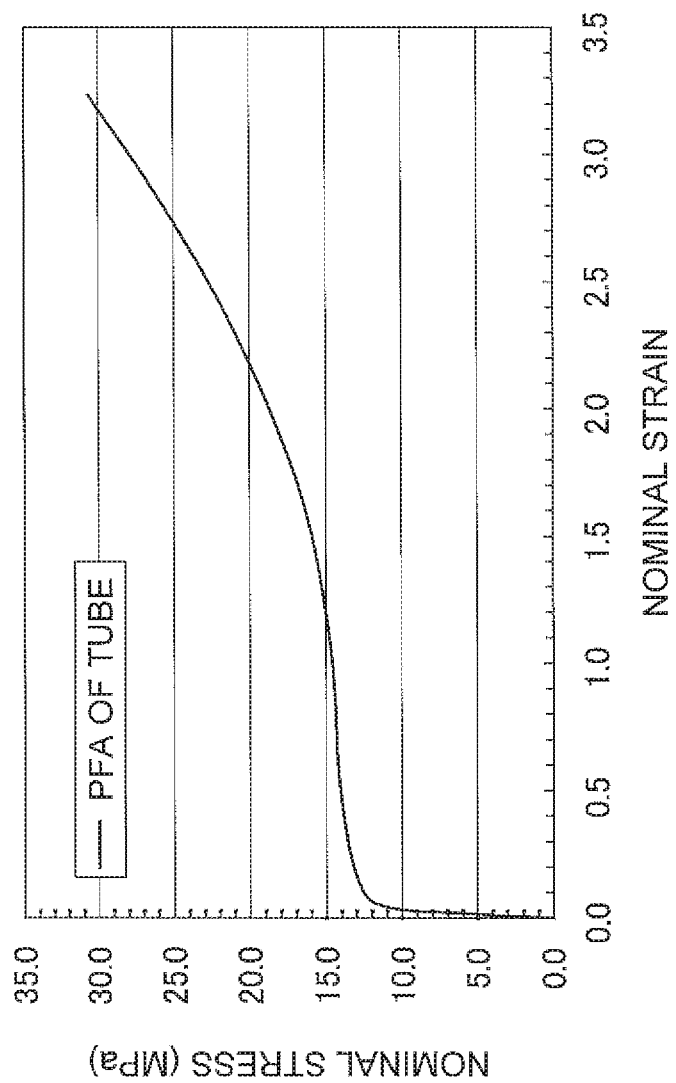
FIG. 2 is a nominal stress-nominal strain diagram of PFA of a tube.
Figure 3:
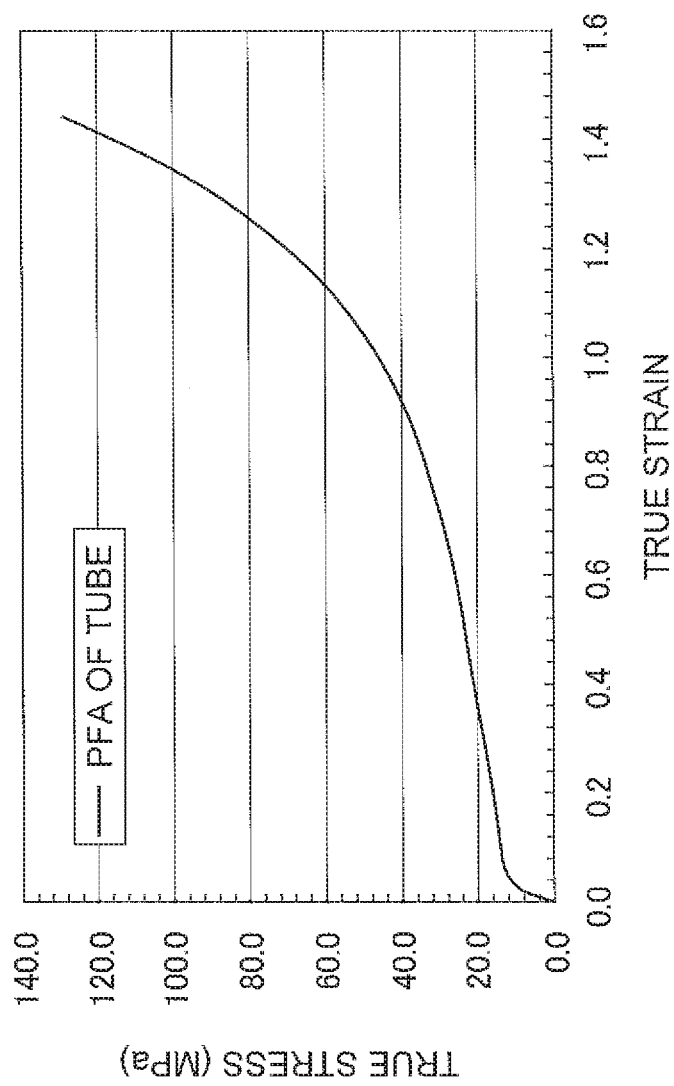
FIG. 3 is a true stress-true strain diagram of PFA of the tube.

Here, with respect to PFA, which is material of the tube 90, FIG. 2 illustrates a nominal stress-nominal strain diagram, and FIG. 3 illustrates a true stress-true strain diagram.

(Joint Body 20)

Figure 4:
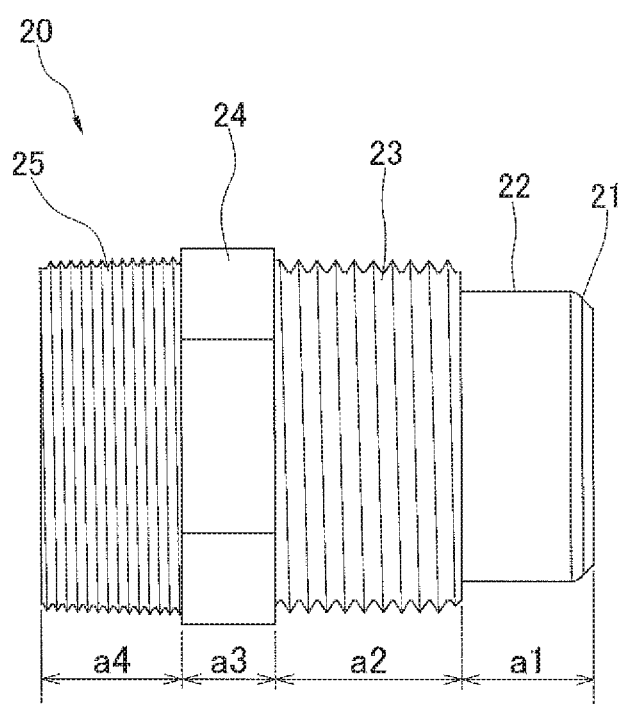
FIG. 4 is a side view of a joint body.

As illustrated in the side external view of FIG. 4, the joint body 20 is provided with the tube insertion end 21, the tube coupling part 22, the main body thread part 23, the joint body operation part 24, the attachment side thread part 25, and the through hole 26. The tube insertion end 21 constitutes the distal end on the side from which the tube 90 is inserted. As illustrated in the cross-sectional side view of FIG. 5, the tube insertion end 21 has the radially outward insertion part 21a and the radially inward insertion part 21b. The radially outward insertion part 21a is an inclination surface configured to be inclined such that a radially outward portion of the tube insertion end 21 is positioned radially inward toward the axial end part. The radially inward insertion part 21b is an inclination surface configured to be inclined such that a radially inward portion of the tube insertion end 21 is positioned radially outward toward the axial end part. The tube coupling part 22 is a portion having an outer surface being in contact with the inner surface of the tube 90 in the state in which the tube 90 has been inserted. The tube coupling part 22 is configured to extend in a cylindrical shape from the tube insertion end 21. The main body thread part 23 is disposed on the side opposite to the tube insertion end 21 side relative to the tube coupling part 22. The main body thread part 23 has an outer diameter greater than the outer diameter of the tube coupling part 22. The main body thread part 23 is configured to be threadedly engaged with the later-described nut thread part 34 of the nut 30. The joint body operation part 24 is the portion held by a wrench or human's fingers when the nut 30 is screwed onto the joint body 20. The joint body operation part 24 is disposed on the side opposite to the tube coupling part 22 side relative to the main body thread part 23. As illustrated in the top view of FIG. 6, the joint body operation part 24 as viewed in the axial direction has a shape in which each of rectangular sides are gently connected to each other as viewed in the axial direction. The attachment side thread part 25 has a thread for being screwed to a member to be attached (not illustrated). The through hole 26 is a hole axially passing through the joint body 20.

Figure 5:
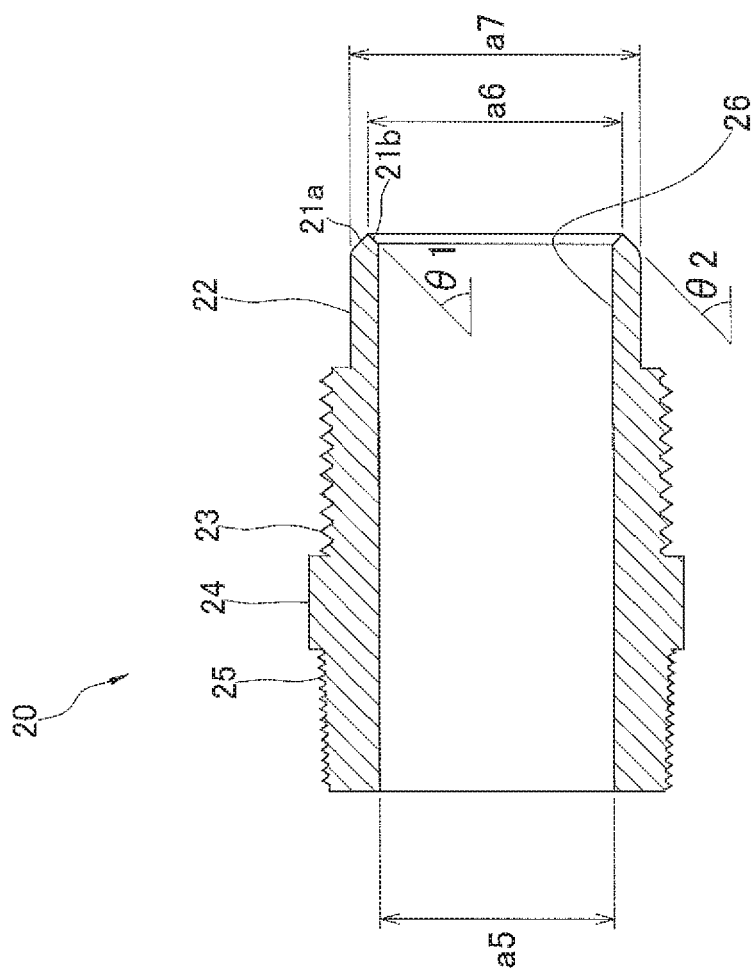
FIG. 5 is a cross-sectional side view of the joint body.
Figure 6:
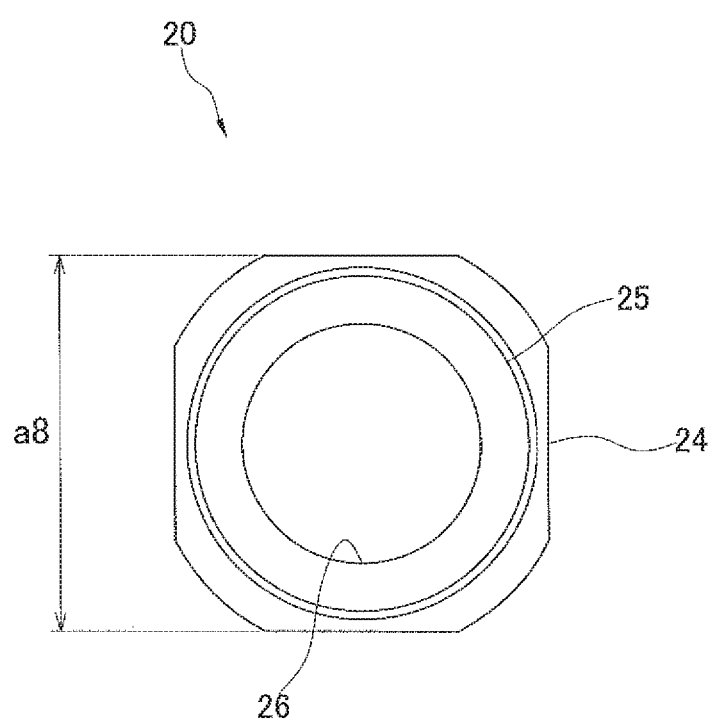
FIG. 6 is a view of the joint body as viewed in the axial direction from the side thereof opposite to the side into which the tube is inserted.

As illustrated in FIG. 4, with respect to axial lengths, the total length a1 of the tube insertion end 21 and the tube coupling part 22 was 28.0 mm; the length a2 of the main body thread part 23 was 40.0 mm; the length a3 of the joint body operation part 24 was 20.0 mm; and the length a4 of the attachment side thread part 25 was 30.0 mm. Moreover, as illustrated in FIG. 5, the inner diameter a5 of the through hole was 20.8 mm; the diameter a6 of a circle constituted by the boundary portion of the radially outward insertion part 21a and the radially inward insertion part 21b was 54.8 mm; and the outer diameter a7 of the tube coupling part 22 was 61.8 mm; and all of them were positioned on concentric circles. Moreover, in the axial cross section, the inclination angle θ1 of the radially outward insertion part 21a relative to the axial direction was 45 degrees, and the inclination angle θ2 of the radially inward insertion part 21b relative to the axial direction was 45 degrees. It should be noted that, in the axial cross section, the angle made by the inclination angle of the radially outward insertion part 21a and the inclination angle of the radially inward insertion part 21b was 90 degrees. Moreover, as illustrated in FIG. 6, the spacing a8 between surfaces of the joint body operation part 24 facing each other was 80.0 mm.

The joint body 20 was composed of PTFE. This joint body 20 had a Young's modulus of 440.0 MPa, a Poisson's ratio of 0.46, and a yield stress of 7.6 MPa.

Figure 7:
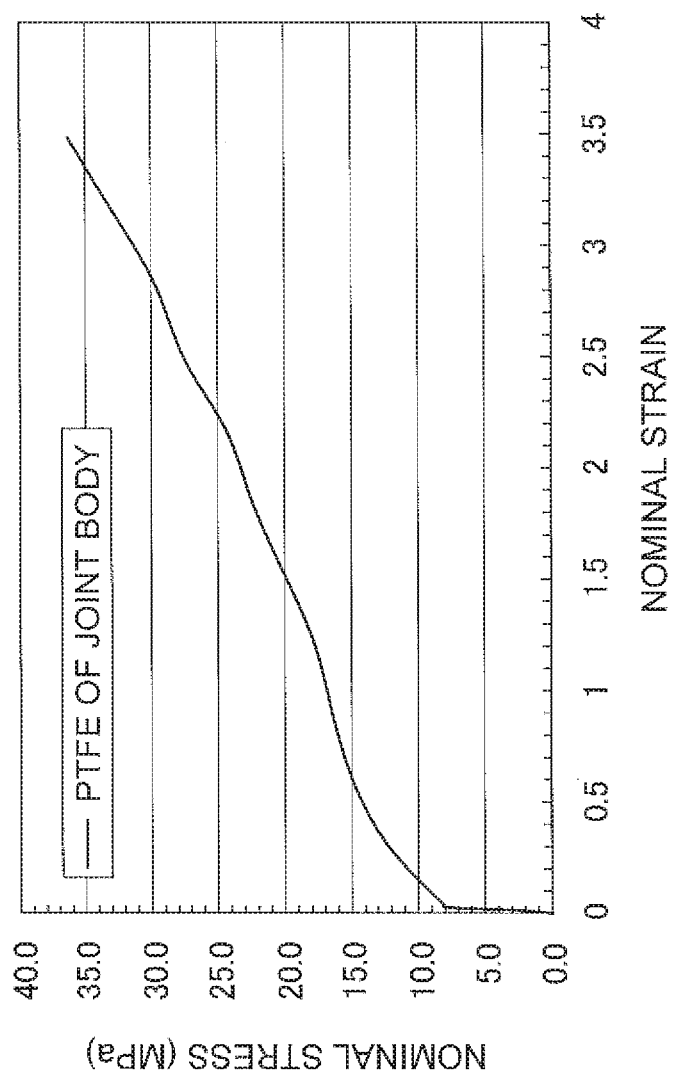
FIG. 7 is a nominal stress-nominal strain diagram of PTFE of the joint body.
Figure 8:
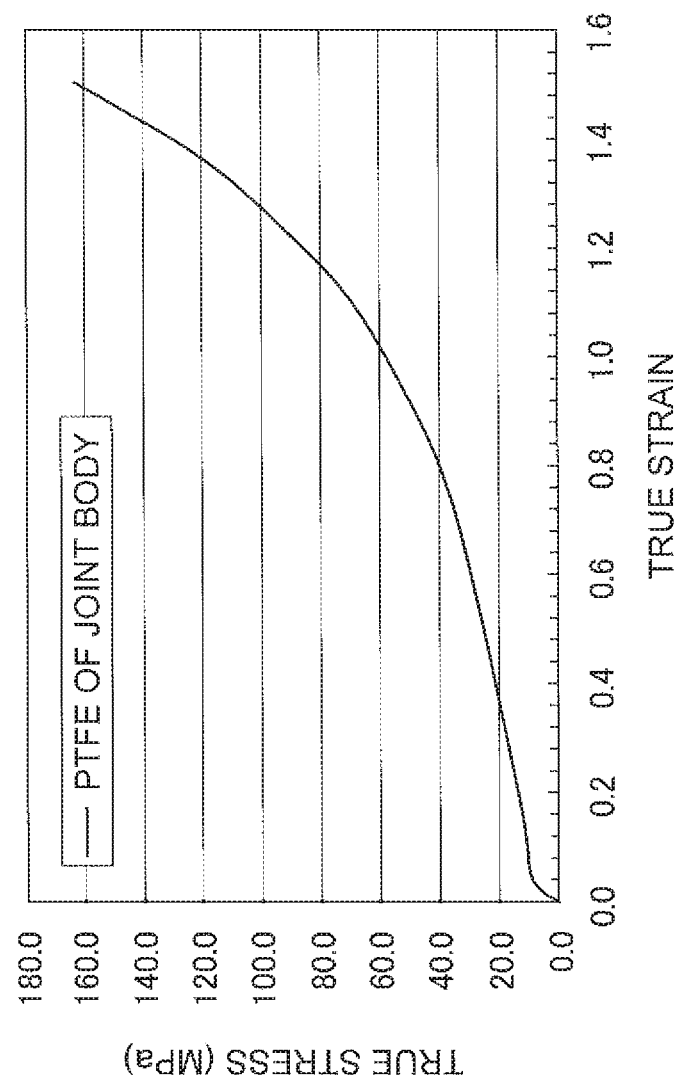
FIG. 8 is a true stress-true strain diagram of PTFE of the joint body.

Here, with respect to PTFE, which is material of the joint body 20, FIG. 7 illustrates a nominal stress-nominal strain diagram, and FIG. 8 illustrates a true stress-true strain diagram.

(Ring 70)

Figure 9:
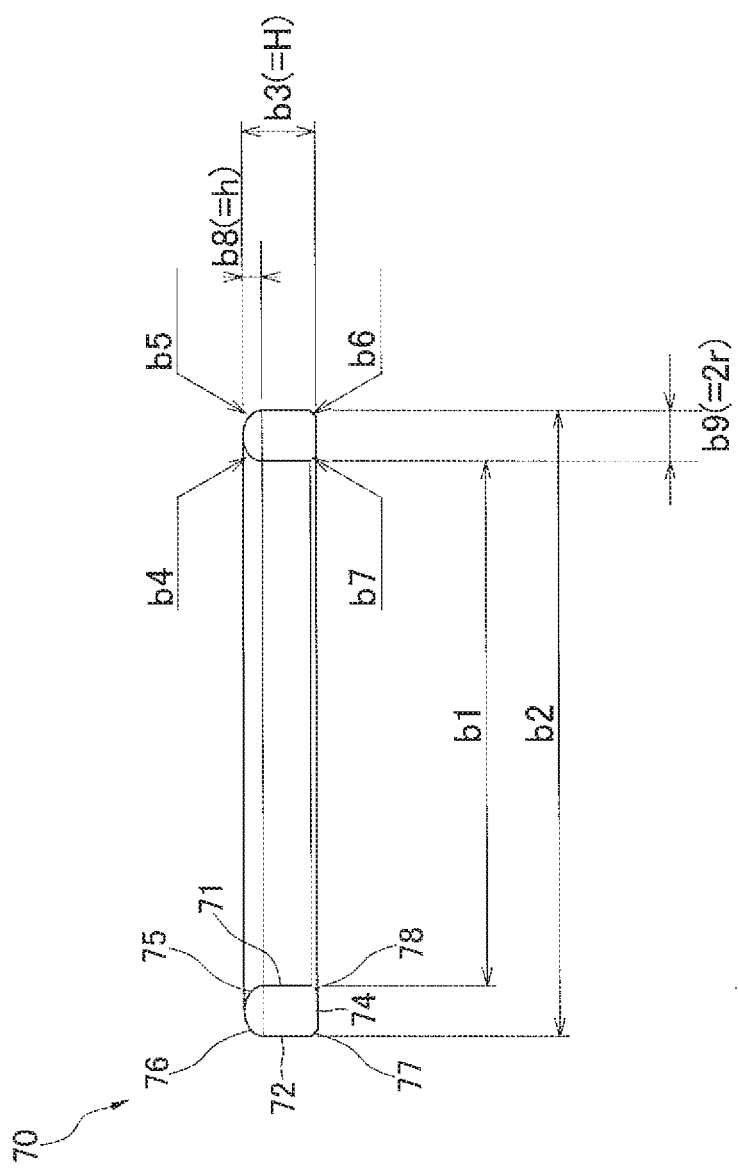
FIG. 9 is a side view of a ring.

As illustrated in FIG. 9, the ring 70 is an annular member having an inner surface 71, an outer surface 72, a back surface 74, an inward curved surface part 75, an outward curved surface part 76, an outward inclination surface 77, and an inward inclination surface 78.

The inner surface 71 has a cylindrical surface extending in parallel with the axial direction which constitutes a most radially inward surface of the ring 70. The outer surface 72 has a cylindrical surface extending in parallel with the axial direction which constitutes a most radially outward surface of the ring 70.

The back surface 74 is a surface in a perimeter shape of which the normal line is in the axial direction. The back surface 74 constitutes the end surface of the ring 70 axially opposite to the joint body 20 side.

The inward curved surface part 75 and the outward curved surface part 76 are curved surfaces constituting the joint body 20 side end part of the ring 70. The inward curved surface part 75 and the outward curved surface part 76 are disposed such that they corresponds to respective halves of the thickness of the ring 70 in a radial direction. The inward curved surface part 75 constitutes the portion of the ring 70 bulging radially inward and toward the joint body 20 side. The outward curved surface part 76 constitutes the portion of the ring 70 bulging radially outward and toward the joint body 20 side.

The outward inclination surface 77 is an inclination surface interconnecting the outer surface 72 and the back surface 74. This inclination surface is formed so as to be positioned radially inward as it is closer to the back surface 74 side in the axial direction. The inward inclination surface 78 is an inclination surface interconnecting the inner surface 71 and the back surface 74. This inclination surface is formed so as to be positioned radially outward as it is closer to the back surface 74 side in the axial direction.

The ring 70 had an inner diameter b1 of 57.7 mm, an outer diameter b2 of 68.5 mm, and an axial thickness b3 of 8.0 mm. Moreover, a smaller inclination angle of inclination angles between the inclination surface of the outward inclination surface 77 and the axial direction was 45 degrees. A smaller inclination angle of inclination angles between the inclination surface of the inward inclination surface 78 and the axial direction was 45 degrees. Moreover, the inclination surface of the outward inclination surface 77 had a shape and size as if a corner would be diagonally cut 0.5 mm wide in the axial direction and 0.5 mm wide in the radial direction (see b6 in FIG. 9). The inclination surface of the inward inclination surface 78 had a shape and size as if a corner would be diagonally cut 0.3 mm wide in the axial direction and 0.3 mm wide in the radial direction (see b7 in FIG. 9). Moreover, the thickness b9 of the ring 70 in a radial direction was 5.4 mm.

Figure 10:
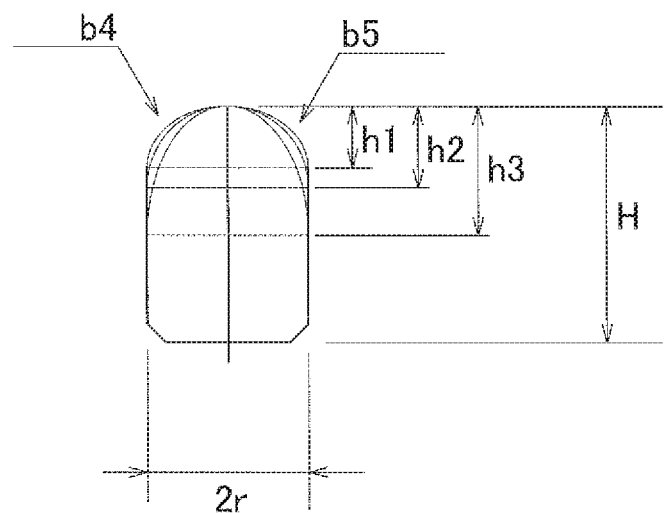
FIG. 10 is an explanatory cross sectional view illustrating the curvature of an inward curved surface part of the ring.

It should be noted that, during simulations, as illustrated in the cross sectional view of FIG. 10, by changing the curvature b4 of the outward curved surface part 76 and the curvature b5 of the inward curved surface part 75, changes in a tightening force and the like were studied. Here, the curvatures of the inward curved surface part 75 and the outward curved surface part 76 were changed by changing the axial widths h (=b8) of the inward curved surface part 75 and the outward curved surface part 76 from 0.1r to 2.0r (h1, h2, h3 . . . ). It should be noted that even in the case in which the axial widths b8 of the inward curved surface part 75 and the outward curved surface part 76 were changed, the axial width H (=b3) of the ring 70 was not changed but fixed, and the radial width 2r (=b9) of the ring 70 was not changed but fixed. Here, in actual simulations, a parameter was defined as α=h/r to perform an evaluation, and α was changed from 0.1 to 2.0.

Here, in the case in which the thickness b9 of the ring 70 in a radial direction is 2r, and in the case in which the axial widths b8 of the inward curved surface part 75 and the outward curved surface part 76 are r (in the case of h2 of FIG. 10), the inward curved surface part 75 and the outward curved surface part 76 constitute a semicircle.

Then, the axial widths b8 of the inward curved surface part 75 and the outward curved surface part 76 are shorter than r (in the case of h1 of FIG. 10), the inward curved surface part 75 and the outward curved surface part 76 constitute a half of an ellipse having a major diameter along a major axis with a length equal to the thickness b9 (=2r) of the ring 70 in a radial direction and a minor diameter along a minor axis with a length equal to the axial widths b8 of the inward curved surface part 75 and the outward curved surface part 76.

Furthermore, the axial widths b8 of the inward curved surface part 75 and the outward curved surface part 76 are longer than r (in the case of h3 of FIG. 10), the inward curved surface part 75 and the outward curved surface part 76 constitute a half of an ellipse having a major diameter along a major axis with a length twice as long as the axial widths b8 of the inward curved surface part 75 and the outward curved surface part 76 and a minor diameter along a minor axis with a length equal to the thickness b9 (=2r) of the ring 70 in a radial direction.

For the ring 70, simulations were performed in the case in which the ring 70 was composed of PCTFE and in the case in which the ring 70 was composed of PTFE.

The ring 70 of PCTFE had a Young's modulus of 1400.0 MPa, a Poisson's ratio of 0.42, a yield stress of 41.0 MPa, and a surface roughness Ra of 3.2.

Figure 11:
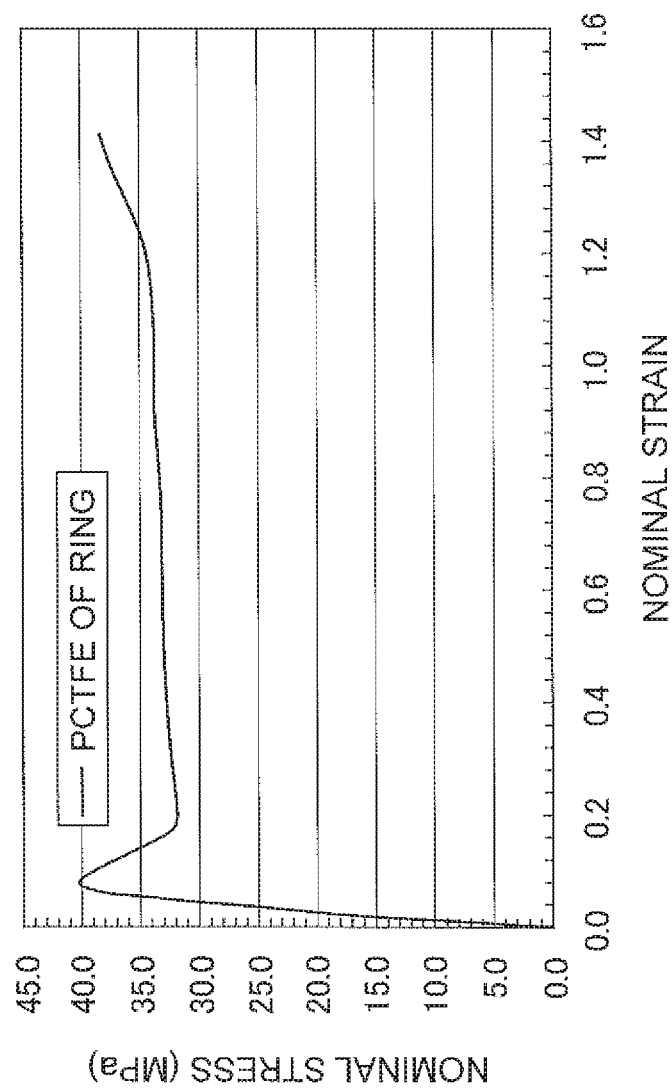
FIG. 11 is a nominal stress-nominal strain diagram of PCTFE of the ring.
Figure 12:
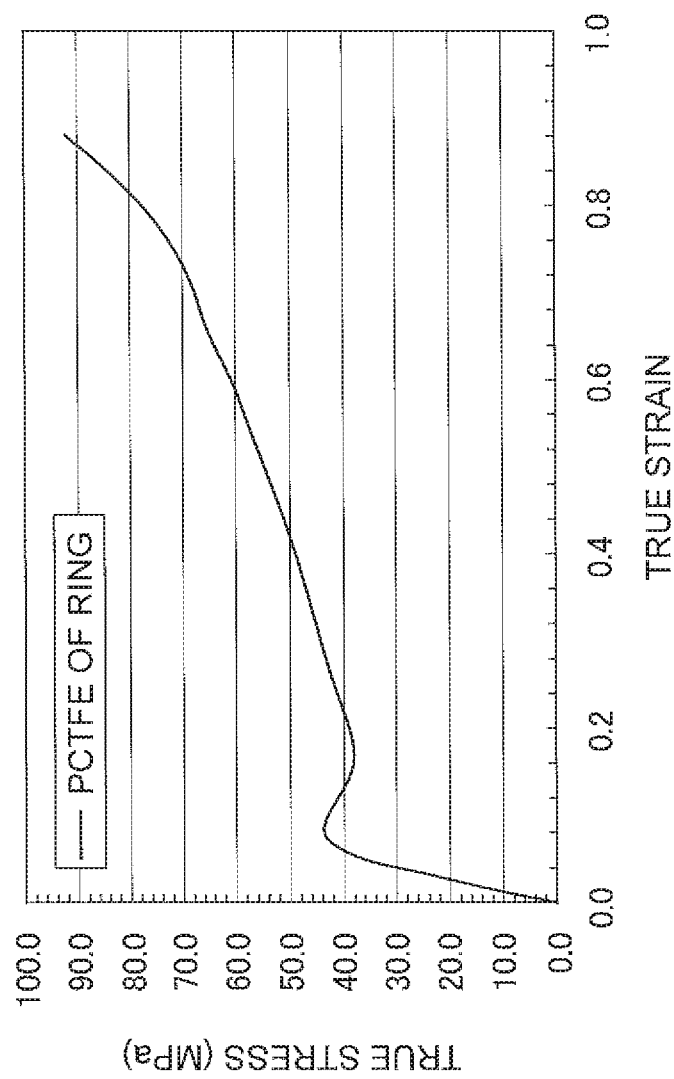
FIG. 12 is a true stress-true strain diagram of PCTFE of the ring.

Here, with respect to PCTFE, which is material of the ring 70, FIG. 11 illustrates a nominal stress-nominal strain diagram, and FIG. 12 illustrates a true stress-true strain diagram.

Moreover, the ring 70 of PTFE had a Young's modulus of 440 MPa, a Poisson's ratio of 0.46, and a yield stress of 7.6 MPa.

(Nut 30)

Figure 13:
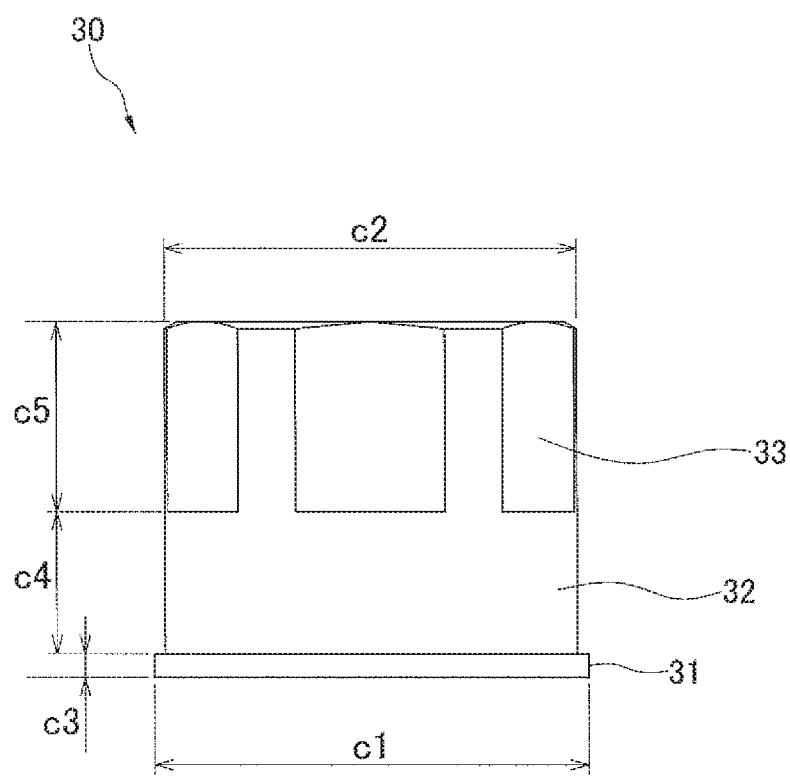
FIG. 13 is a side view of a nut.
Figure 14:
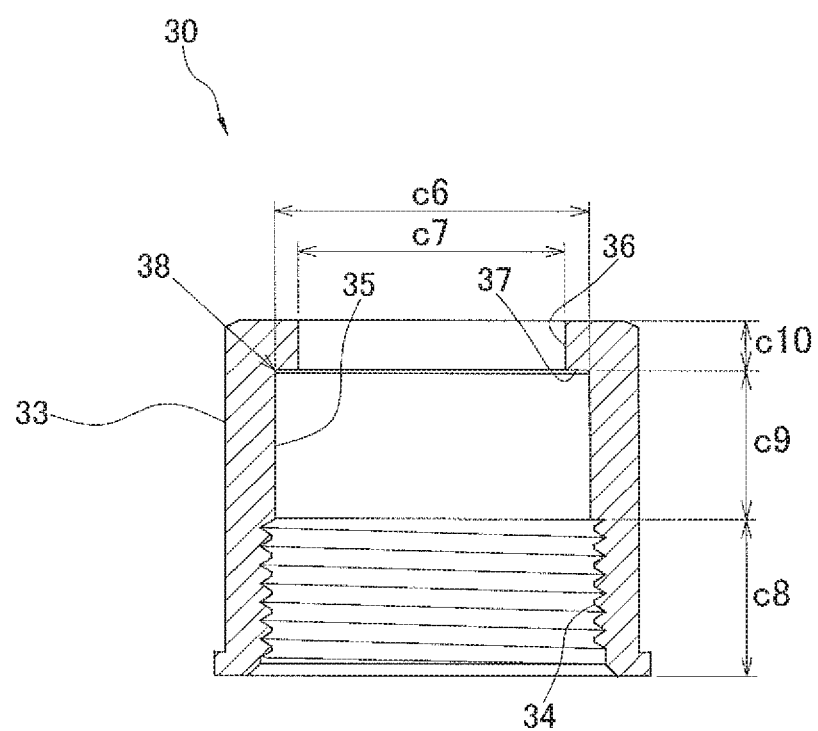
FIG. 14 is a cross-sectional side view of the nut.
Figure 15:
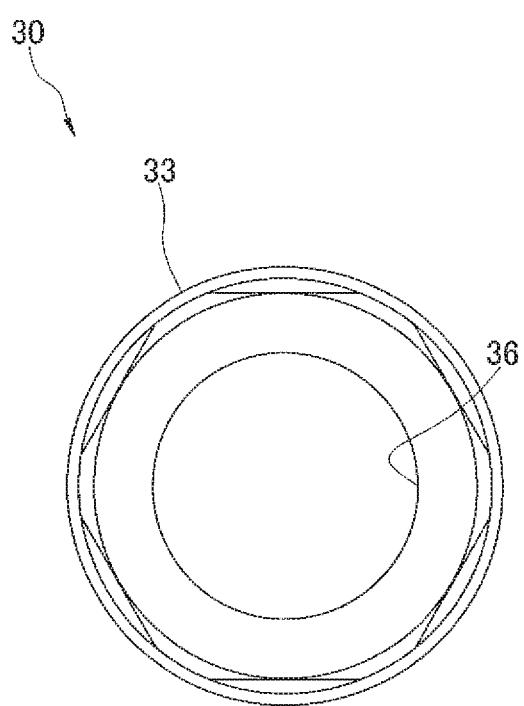
FIG. 15 is a view of the nut as viewed in the axial direction from a constricted diameter part side.

As illustrated in the side external view of FIG. 13, the cross-sectional side view of FIG. 14, and the view of FIG. 15 as viewed in the axial direction from the constricted diameter part side, the nut 30 is provided with an insertion end part 31, an outer cylindrical part 32, the nut operation part 33, the nut thread part 34, a nut cylindrical part 35, the constricted diameter part 36, the abutted part 37, and a bend part 38.

The insertion end part 31 constitutes an insertion side distal end during the insertion of the nut 30 onto the joint body 20. The insertion end part 31 has a shape widen substantially radially outward. The outer cylindrical part 32 axially extends in a cylindrical shape. The nut operation part 33 is the portion held by a wrench or human's fingers during the screwing of the nut 30 onto the joint body 20. The nut operation part 33 is formed on the side axially opposite to the insertion end part 31 side relative to the outer cylindrical part 32. As illustrated in FIG. 15, as viewed in the axial direction, this nut operation part 33 is configured to have hexagonal corners. Each of the corners is rounded. The nut thread part 34 constitutes the insertion end part 31 side inside the nut 30 to be able to threadedly engaged with the main body thread part 23 from radially outward of the main body thread part 23 when the nut 30 is inserted and screwed onto the joint body 20. The constricted diameter part 36 extends between the end part on the side opposite to the insertion end part 31 side and the insertion end part 31 side. The constricted diameter part 36 constitutes a cylindrical portion inside the nut 30. The nut cylindrical part 35 constitutes a cylindrical portion inside the nut 30 to interconnect the nut thread part 34 and the constricted diameter part 36 in the axial direction. The nut cylindrical part 35 constitutes a portion radially outward of the constricted diameter part 36 and radially inward of the nut thread part 34 in the radial direction. The abutted part 37 is configured with the end surface of the constricted diameter part 36 facing the insertion end part 31 side. The bend part 38 is an R shaped portion disposed at a portion interconnecting the abutted part 37 and the end part of the nut cylindrical part 35 on the side opposite to the insertion end part 31 side.

As illustrated in FIG. 13, the nut 30 had an outer diameter c1 of the insertion end part 31 of 95.0 mm and a length c2 of 90.0 mm connecting rounded portions of the nut operation part 33 facing each other. Moreover, as illustrated in FIG. 13, with respect to axial lengths, the length c3 of the insertion end part 31 was 41.5 mm, the length c4 of the outer cylindrical part 32 was 31.0 mm, and the length c5 of the nut operation part 33 was 5.0 mm. Moreover, as illustrated in FIG. 14, the inner diameter c6 of the nut cylindrical part 35 was 69.0 mm, and the inner diameter c7 of the constricted diameter part 36 was 58.0 mm. Furthermore, as illustrated in FIG. 14, with respect to axial lengths, the length c8 of the nut thread part 34 was 34.0 mm, the length c9 of the nut cylindrical part 35 was 32.5 mm, and the length c10 of the constricted diameter part 36 was 11.0 mm. It should be noted that the radius of curvature of the bend part 38 was 0.5 mm.

The nut 30 was composed of PFA having properties different from the tube 90. This nut 30 had a Young's modulus of 390 MPa, a Poisson's ratio of 0.47, and a yield stress of 8.9 MPa.

Figure 16:
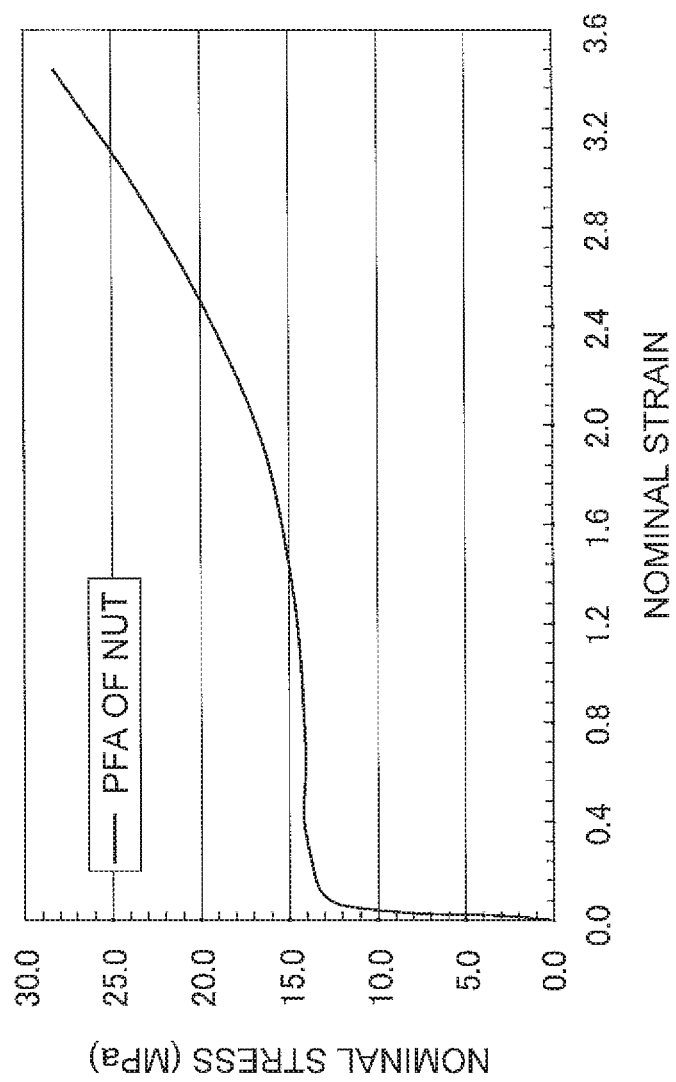
FIG. 16 is a nominal stress-nominal strain diagram of PFA of the nut.
Figure 17:
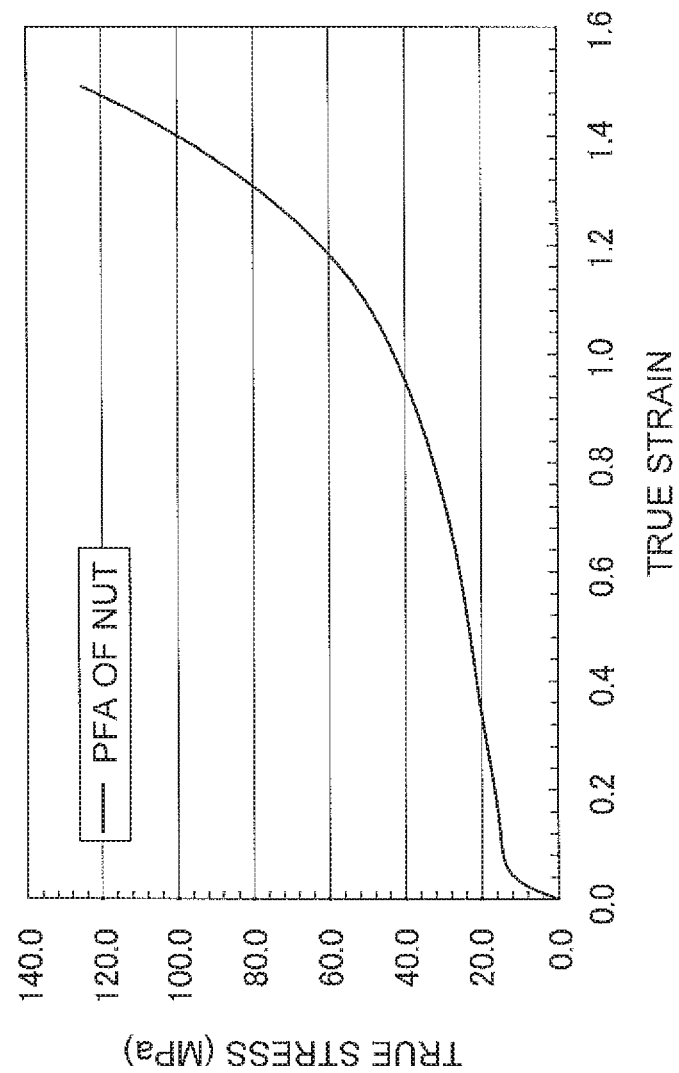
FIG. 17 is a true stress-true strain diagram of PFA of the nut.

Here, with respect to PFA, which is material of the nut 30, FIG. 16 illustrates a nominal stress-nominal strain diagram, and FIG. 17 illustrates a true stress-true strain diagram.

(Coupling and Fixing Action)

By fixing the joint body 20, the ring 70, and the nut 30 to the tube 90, the tube 90 is coupled and fixed to the joint 100.

Figure 18:
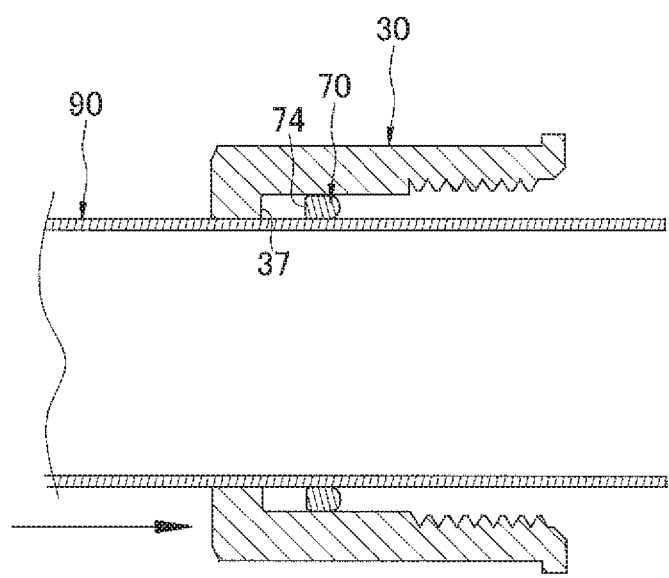
FIG. 18 is a cross-sectional side view of a state in which the ring and the nut are attached to the tube.

Here, initially, the distal end of the tube 90 to which the joint 100 is to be attached is inserted into the nut 30 via the constricted diameter part 36 side. Furthermore, the distal end is inserted into the ring 70 as illustrated in a cross-sectional side view of FIG. 18.

Figure 19:
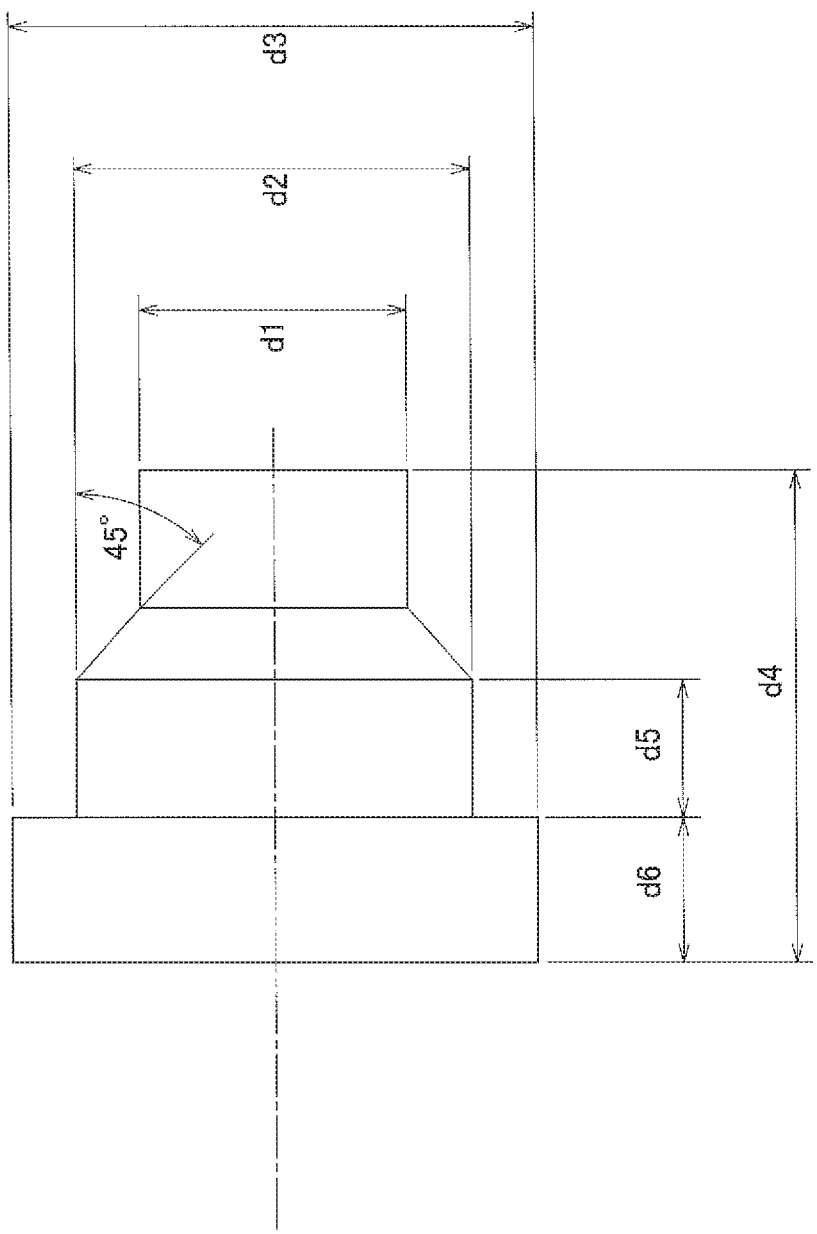
FIG. 19 is a side view illustrating a schematic configuration of a flaring tool.

Then, the end part of the tube 90 is expanded and shaped with a flaring tool illustrated in FIG. 19. This flaring tool is composed of PTFE. As illustrated in FIG. 19, the flaring tool is provided with the smallest column portion having an outer diameter (d1=50.5 mm) on an axially insertion side end part, and successively provided with a column portion having a greater outer diameter (d2=62.8 mm) and a column portion having a further greater outer diameter (d3=78.0 mm) on the side opposite to the axially insertion side. The flaring tool has an axial width d4 of 70.0 mm. The respective column portions on the side opposite to the axially insertion side have an axial width d4 and d5 of 20.0 mm. The end part of the column portion on the axially insertion side end part, which is on the side opposite to the axially insertion side, is inclined such that the end part has an outer diameter becoming greater toward the side opposite to the insertion side. Here, the inclination angle of the inclination portion is 45 degrees relative to the peripheral portion of the axially middle column portion. Here, it should be noted that the tube 90 is heated with a heater or the like and softened when the tube 90 is inserted into the flaring tool. Then, the tube 90 is expanded to be shaped.

Figure 20:
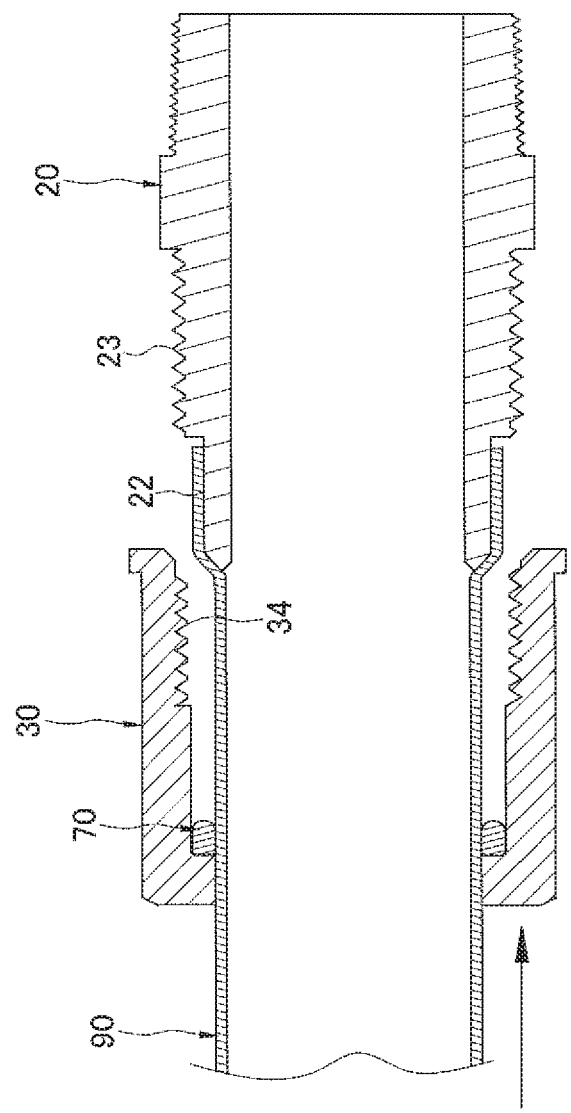
FIG. 20 is a cross-sectional side view of a state in which an expanded distal end of the tube is coupled to the joint body.

Then, the tube coupling part 22 of the joint body 20 is inserted into the expanded distal end of the tube 90 as illustrated in the cross-sectional side view of FIG. 20. It should be noted that the position of the distal end of the tube 90 fell within the axial width of the tube coupling part 22.

Figure 21:
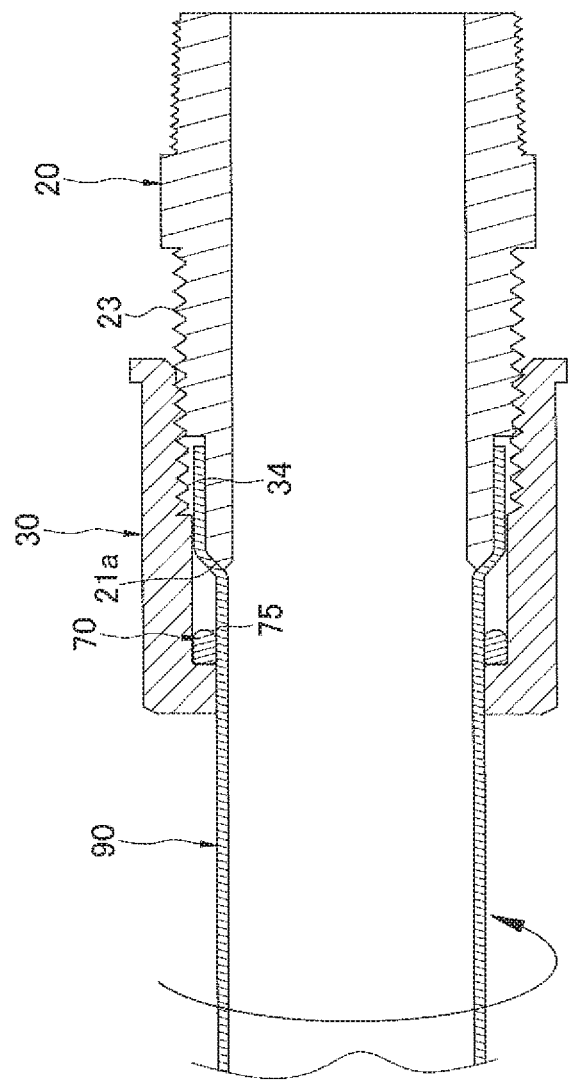
FIG. 21 is a cross-sectional side view illustrating a manner in which the nut is screwed onto the joint body.

Thereafter, the nut 30 is moved axially closer to the joint body 20 and moved to the portion at which the nut thread part 34 of the nut 30 and the main body thread part 23 of the joint body 20 start to be threadedly engaged with each other. At this time, the back surface 74 of the ring 70 abuts the abutted part 37 of the nut 30 in the axial direction, and thereby the ring 70 moves to the joint body 20 side in the axial direction. Then, the nut 30 is caused to rotate about the joint body 20, and thereby, the nut 30 is screwed onto the joint body 20 as illustrated in the cross-sectional side view of FIG. 21. Here, it should be noted that the joint body 20 and the tube 90 are substantially incorporated, and thus, they do not rotate with the rotation of the nut 30. Moreover, the nut 30 and the ring 70 are configured to be separate, although the nut 30 rotates, generally, the ring 70 moves on the outer surface of the tube 90 in the axial direction, and the ring 70 does not rotate on the outer surface of the tube 90.

Figure 22:
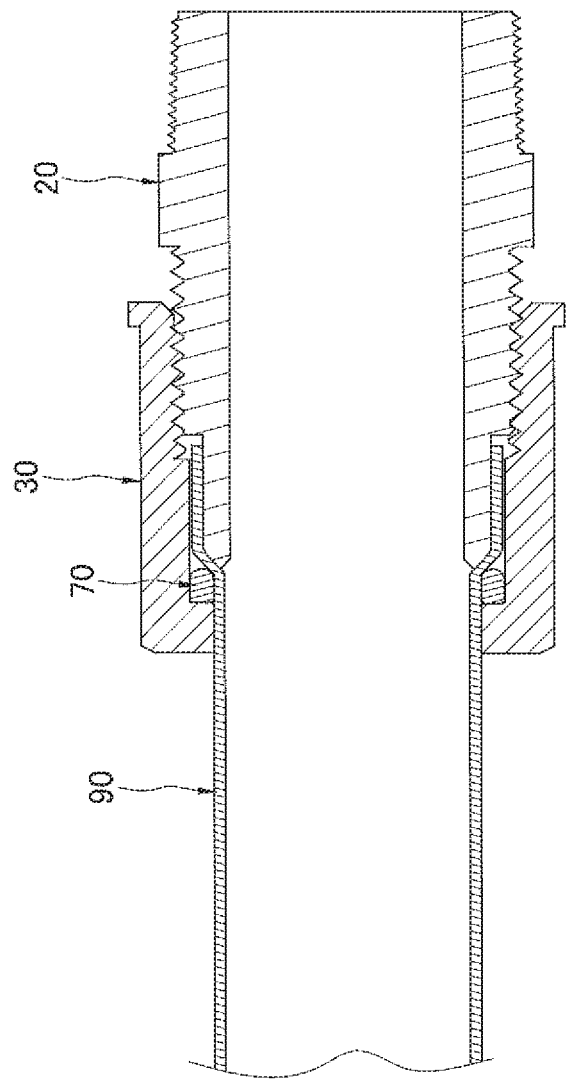
FIG. 22 is a schematic cross-sectional side view of a state in which the joint is coupled and fixed to the tube.

Moreover, as the screwing operation of the nut 30 onto the joint body 20 continues, as illustrated in the cross-sectional side view of FIG. 22, the inward curved surface part 75 of the ring 70 comes into contact with the portion of the tube 90 facing the radially outward insertion part 21a of the tube coupling part 22 of the joint body 20. This contact state was determined as a starting location. The distance between the starting location and a location at which the screwing is finally completed was defined as a tightening margin. It should be noted that, during simulations, this tightening margin was changed from 0 mm to 5.0 mm.

(Details of Setting of Simulations)

The followings were considered to perform simulations.

Geometric shapes of the tube and the ring had axial symmetry. Likewise, geometric shapes of the joint body and the nut had axial symmetry since they were able to be considered to have approximately axial symmetry. Here, a thread groove was considered to be a simple plane by adjusting a frictional force. Moreover, likewise, a loading had axial symmetry since in a process of tightening of the nut it was able to be considered to have approximately axial symmetry. Likewise, the loading had axial symmetry in a process of pulling out of the tube.

In simulations, the "process of tightening of the nut" and the "process of pulling out of the tube" were performed using FEM analysis (Finite Element Method). For the construction of an analytical model, four parts, that is, the joint body, the tube, the ring, the nut were used. Each of the parts had approximately axial symmetry of a geometric shape and a loading state. Thus, any one cross section of a structure was retrieved to make an analytical model.

During the analysis, the joint body 20, the tube 90, the ring 70, and the nut 30 were made of a plastoelastic material satisfying the von Mises yield criterion, and were modeled using two-dimensional solid elements. Moreover, mutual contact between each of members was modeled by a contact element accompanied by friction. More particularly, criteria were designated for contact between the joint body 20 and the tube 90, between the joint body 20 and the nut 30, between the tube 90 and the ring 70, between the tube 90 and the nut 30, and between the ring 70 and the nut 30.

The number of element of this analytical model was 9,016, and the number of node of this analytical model was 9,643.

Moreover, during the analysis, for the end part of the joint body 20 on the side opposite to the tube coupling part 22 side, a constraint condition was given to restrain axial displacement. As a loading condition, in the "process of tightening of the nut", the end part of the nut 30 on the joint body 20 side was subjected to uniform axial forced displacement, and in the "process of pulling out of tube", the end part of the tube 90 on the side opposite to the end part on the tube coupling part 22 side was subjected to uniform axial forced displacement. Then, a loading of torque tightening the nut 30 was converted to axial forced displacement to which the nut 30 was subjected, and was used.

Moreover, with respect to properties of each part used for simulations, true stress-true strain diagrams and nominal stress-nominal strain diagrams demonstrate significantly great maximum fracture strains. Thus, the tube 90 was readily expected to perform behavior accompanied by significant deformation and significant strain in the "process of tightening of the nut" and the "process of pulling out of the tube". Here, for precise and accurate analysis in the case of occurrence of significant deformation and significant strain, it was considered that it was a common practice to convert a nominal stress and nominal strain to a true stress and a true strain, respectively, to be used. True stresses and true strains of various resin materials were obtained from nominal stresses and nominal strains of these materials using the following equation (1) derived from the assumption that metallic materials would not be subjected to a hydrostatic pressure (no volume would be changed) after plastic yield:

<Equation 1>

$$\sigma_t = \sigma(1+\epsilon), \; \epsilon_t = \ln(1+\epsilon) \tag{1},$$

where $\sigma_t$, $\epsilon_t$ represent a true stress and a true strain, respectively, $\sigma$, $\epsilon$ represent a nominal stress and nominal strain, respectively.

FIG. 3, FIG. 8, FIG. 12, and FIG. 17 illustrate true stress-true strain diagrams for various resin materials calculated on the basis of nominal stress-nominal strain diagrams for these materials and equation (1). The diagrams as discussed above each indicate that a nominal stress-nominal strain diagram is noticeably different from a true stress-true strain diagram as a strain increases.

During simulations, material constitutive equations for the joint body 20, the tube 90, and the nut 30 were represented by an isotropic hardening and plastoelastic material model, which satisfies the von Mises yield criterion, using multi-linear approximation. A material constitutive equation for the ring 70 was represented by an isotropic hardening and plastoelastic material model, which satisfies the von Mises yield criterion, using bi-linear approximation.

Moreover, during simulations, behavior after yield (the rate of strain hardening) was specified using the true stress-true strain diagrams as illustrated in FIG. 3, FIG. 8, FIG. 12, and FIG. 17.

Moreover, a coefficient of friction between each of parts was uniform, and analysis was performed in the case in which the coefficient of friction was 0.10, 0.05, and 0.03.

It should be noted that von Mises stress refers to one of equivalent stresses used to indicate a stress state generated in an object as a single value. Originally, a stress is a three-dimensional symmetric second-order tensor field. In order to accurately represent a state of the stress, six values should be described, which makes it significantly difficult to understand how a force is actually applied. Therefore, the von Mises stress is used to represent a stress state as one numeral value and as a scalar field to understand the state. Moreover, this von Mises stress is commonly used as a failure criterion for a ductile material and a criterion for force relating to plastic deformation. This von Mises stress is zero in a hydrostatic stress state (hydrostatic pressure stress state). Moreover, the von Mises stress in a uniaxial tension state is equal to the tensile stress. In a principle stress space, a curved surface having a given von Mises stress has a cylindrical shape with a given distance from the hydrostatic axis. During these simulations, the von Mises stress described above was used for the determination of yield of the ring 70, the tube 90, and the like.

(Simulations of Process of Tightening of Nut)

Simulations were performed to compare changes in a tightening force in the "process of tightening of the nut" in the case in which the ring 70 is composed of PCTFE with those in the case in which the ring 70 is composed of PTFE.

Figure 23:
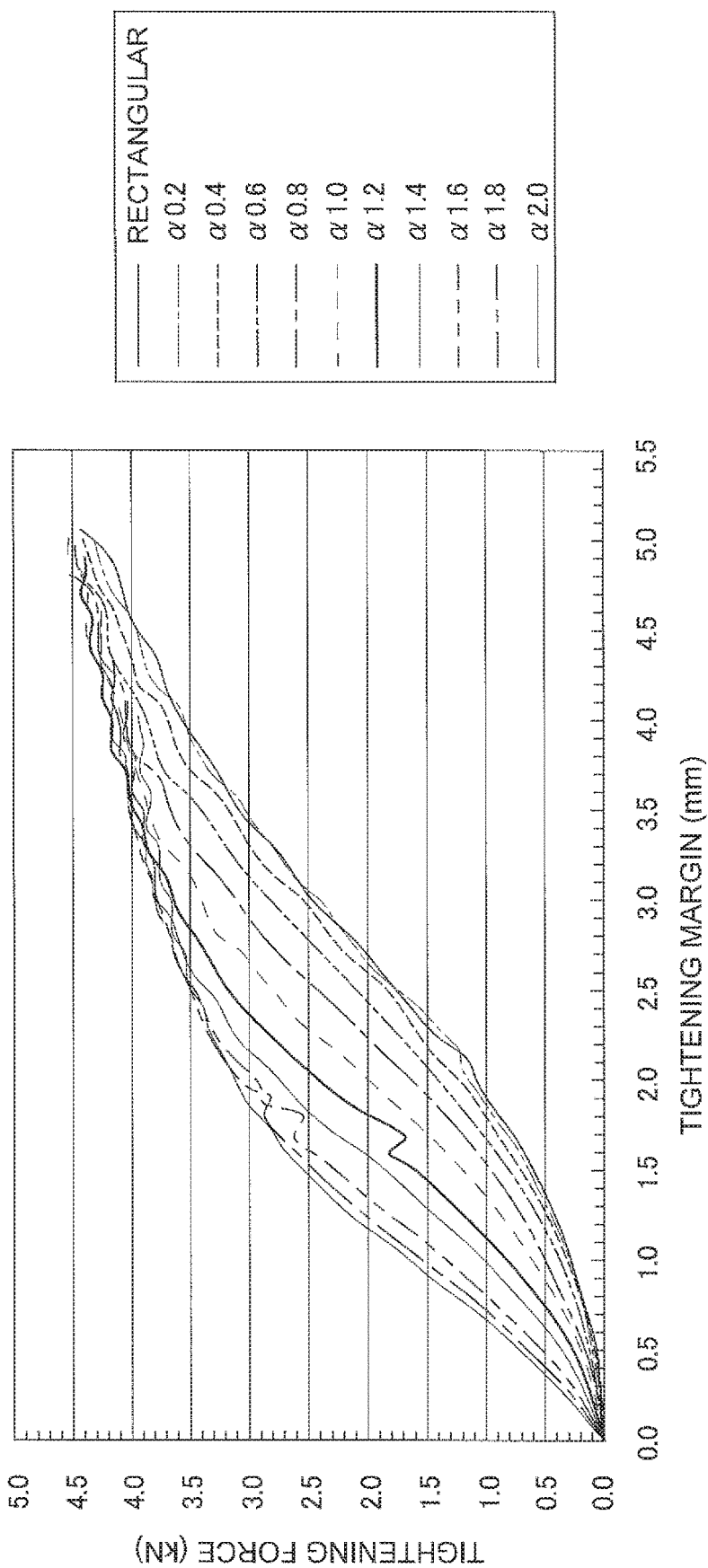
FIG. 23 illustrates a graph demonstrating simulation results on changes in a tightening force corresponding to a tightening margin in the case in which the value of $\alpha(=h/r)$ is changed and in the case in which the ring 70 is composed of PCTFE.

FIG. 23 illustrates a graph demonstrating simulation results on changes in a tightening force corresponding to a tightening margin in the case in which the value of $\alpha(=h/r)$ was changed and in the case in which the ring 70 was composed of PCTFE.

Figure 24:
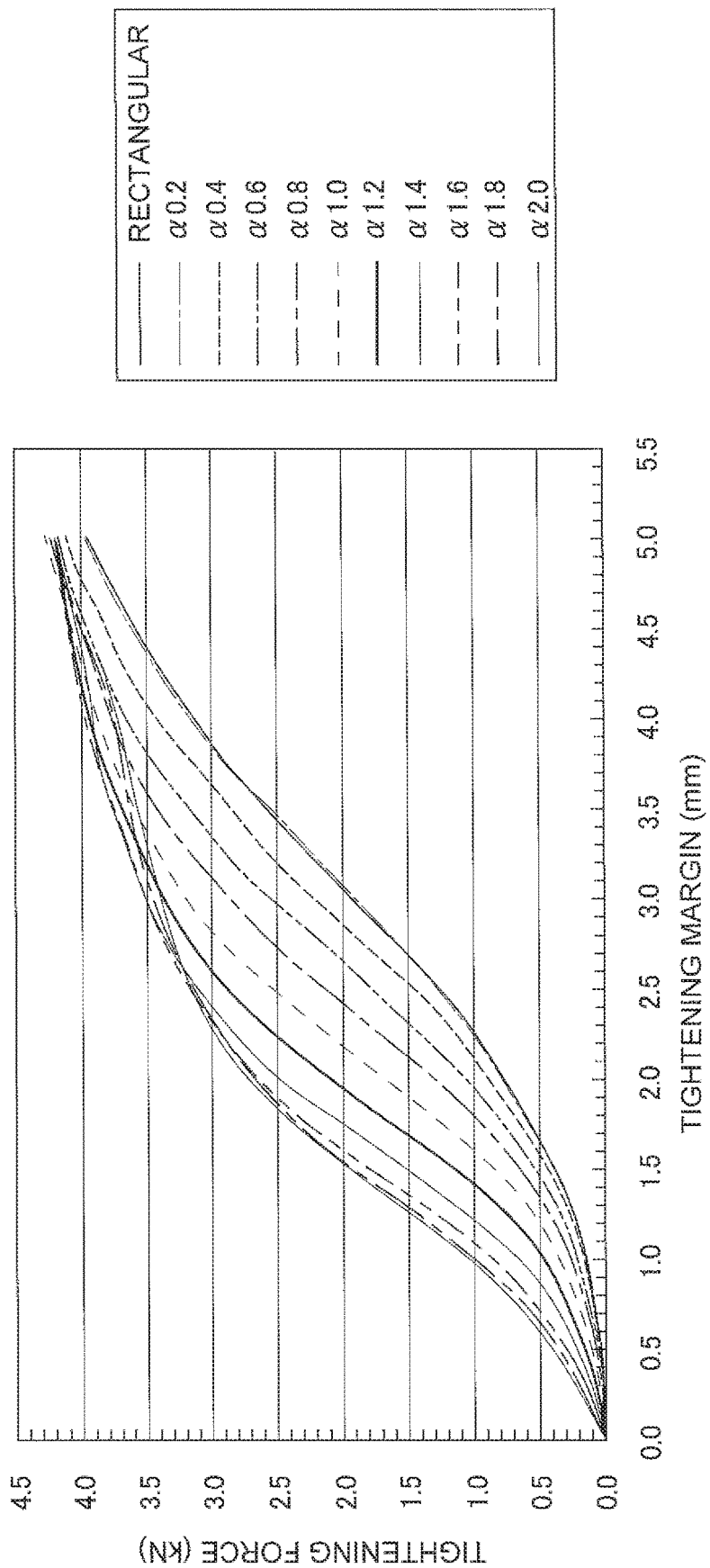
FIG. 24 illustrates a graph demonstrating simulation results on changes in a tightening force corresponding to a tightening margin in the case in which the value of $\alpha(=h/r)$ is changed and in the case in which the ring 70 is composed of PTFE.

FIG. 24 illustrates a graph demonstrating simulation results on changes in a tightening force corresponding to a tightening margin in the case in which the value of $\alpha(=h/r)$ was changed and in the case in which the ring 70 was composed of PTFE.

It should be noted that a value defined as SMX in each of diagrams in FIGS. 25 through 38 refers to a maximum value (maximum von Mises stress) of the von Mises stress of a location at which the ring 70 was in contact with the tube 90.

It should be noted that the value of α was changed from 0.2 to 2.0. Also, simulations were performed in the case in which the ring 70 was rectangular. In the case in which the ring 70 was rectangular, a radially inward corner of the ring 70 was chamfered by 0.3 mm×0.3 mm, and a radially outward corner of the ring 70 was chamfered by 0.5 mm×0.5 mm in cross-section of the ring 70.

From FIG. 23 and FIG. 24, it is clear that a greater tightening forces is obtained with shorter a tightening margin when PCTFE was used as material of the ring 70 than when PTFE was used as material of the ring 70.

It is considered that a sufficient preferable value of tightening force is 25 MPa (2.5 kN/cm²) in view of a common maximum pressure of 7 MPa (0.7 kN/cm²) used for a fluorocarbon resin pipe and a commonly used factor of safety of three times. For example, from FIG. 23, it is clear that, when the value of α is 2.0, a tightening margin needs to be 1.5 mm or greater in the case in which the ring 70 is composed of PCTFE.

Figure 25:
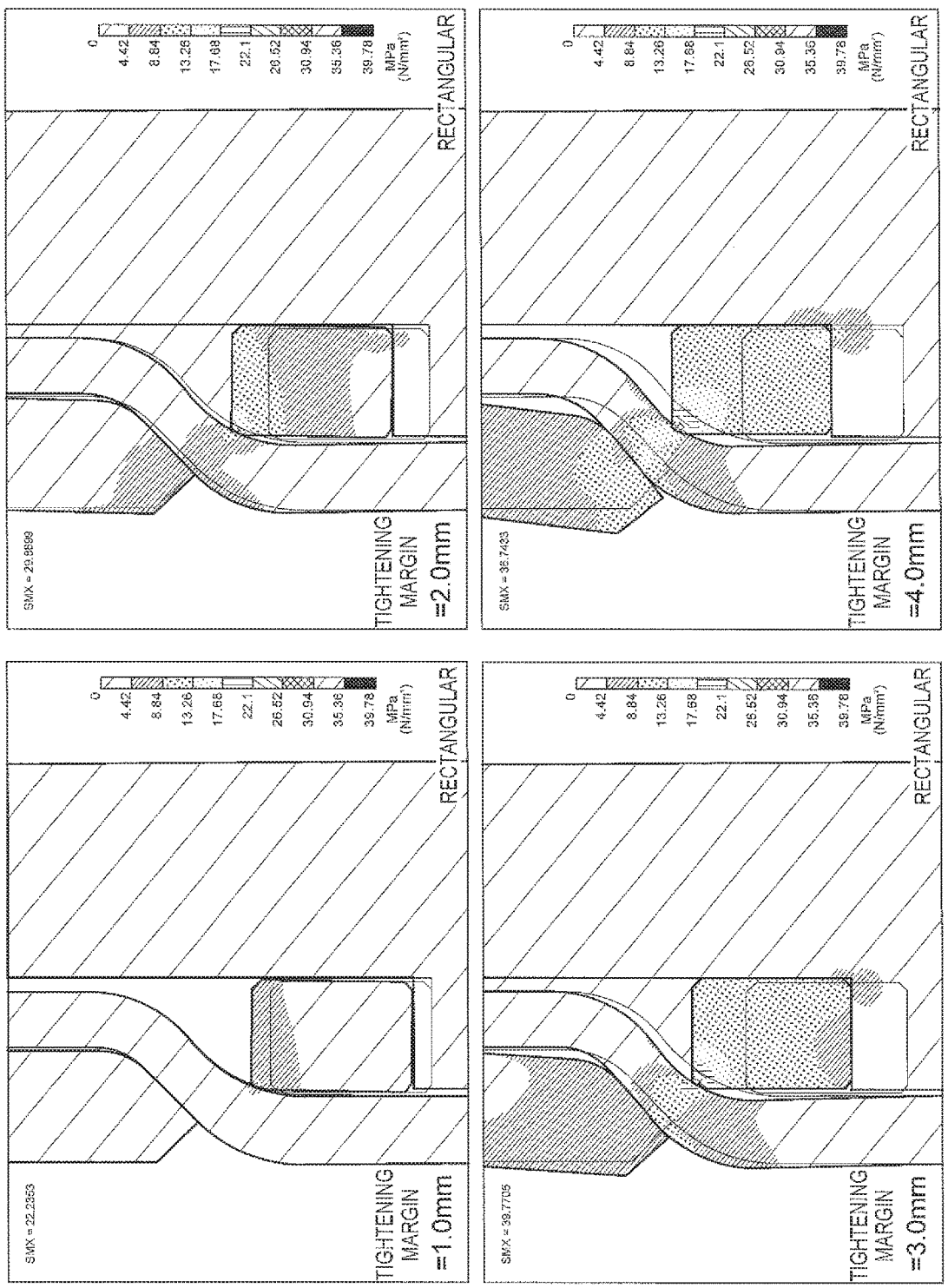
FIG. 25 illustrates simulation results on von Mises stress distribution corresponding to a tightening margin in the case in which the ring 70 is composed of PCTFE and is rectangular.
Figure 26:
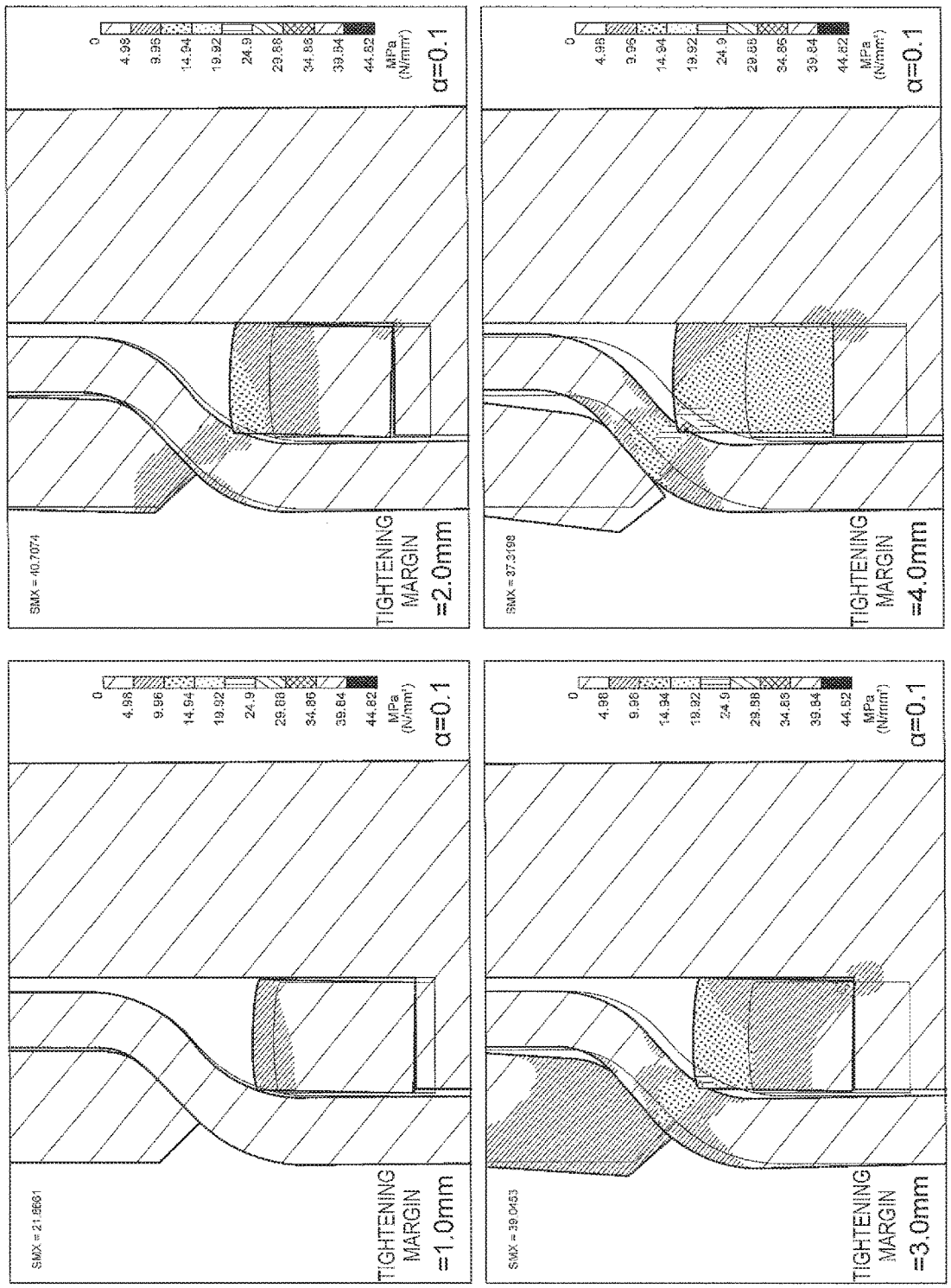
FIG. 26 illustrates simulation results on von Mises stress distribution corresponding to a tightening margin in the case of $\alpha=0.1$ and in the case in which the ring 70 is composed of PCTFE.
Figure 27:
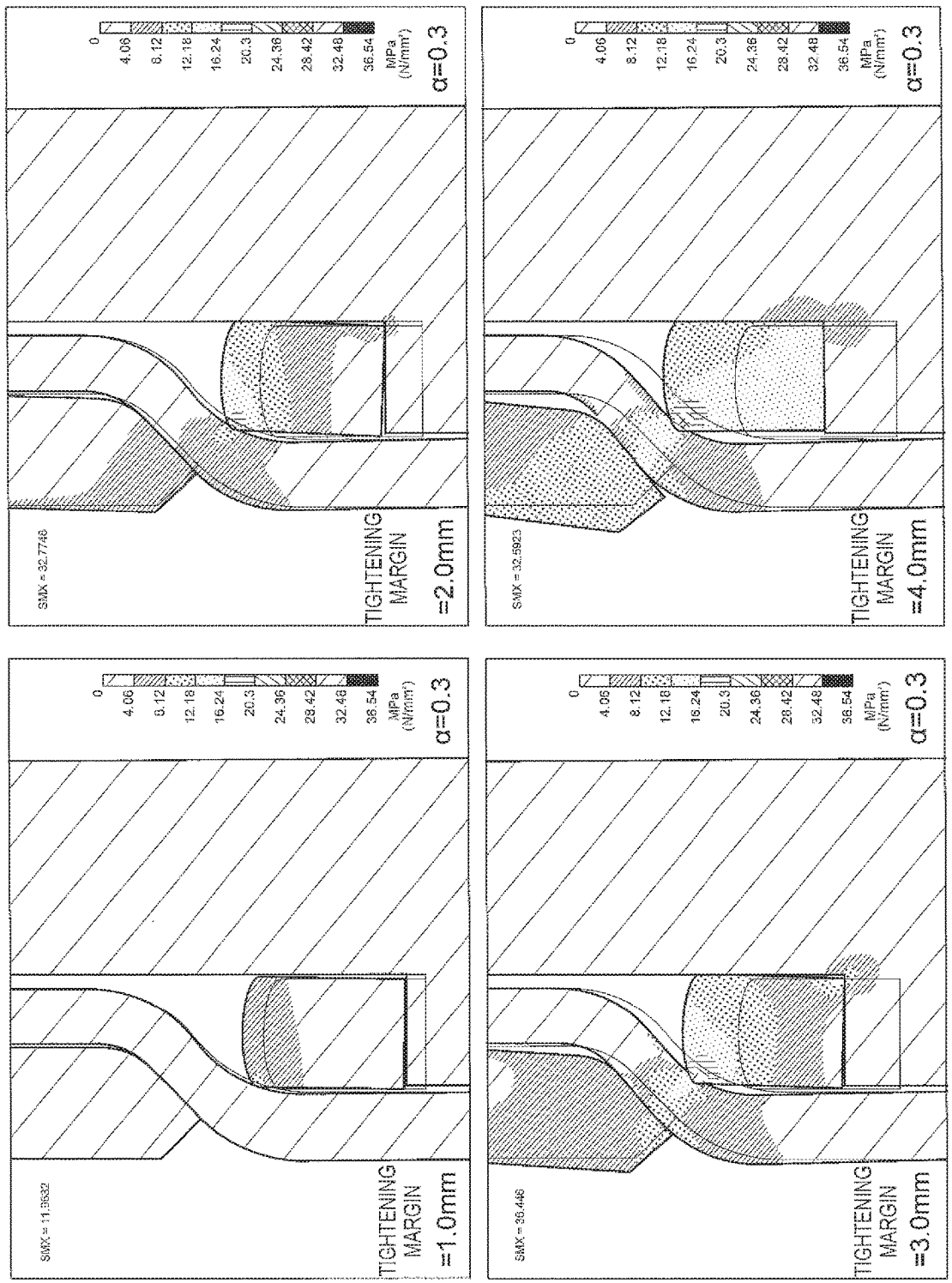
FIG. 27 illustrates simulation results on von Mises stress distribution corresponding to a tightening margin in the case of $\alpha=0.3$ and in the case in which the ring 70 is composed of PCTFE.
Figure 28:
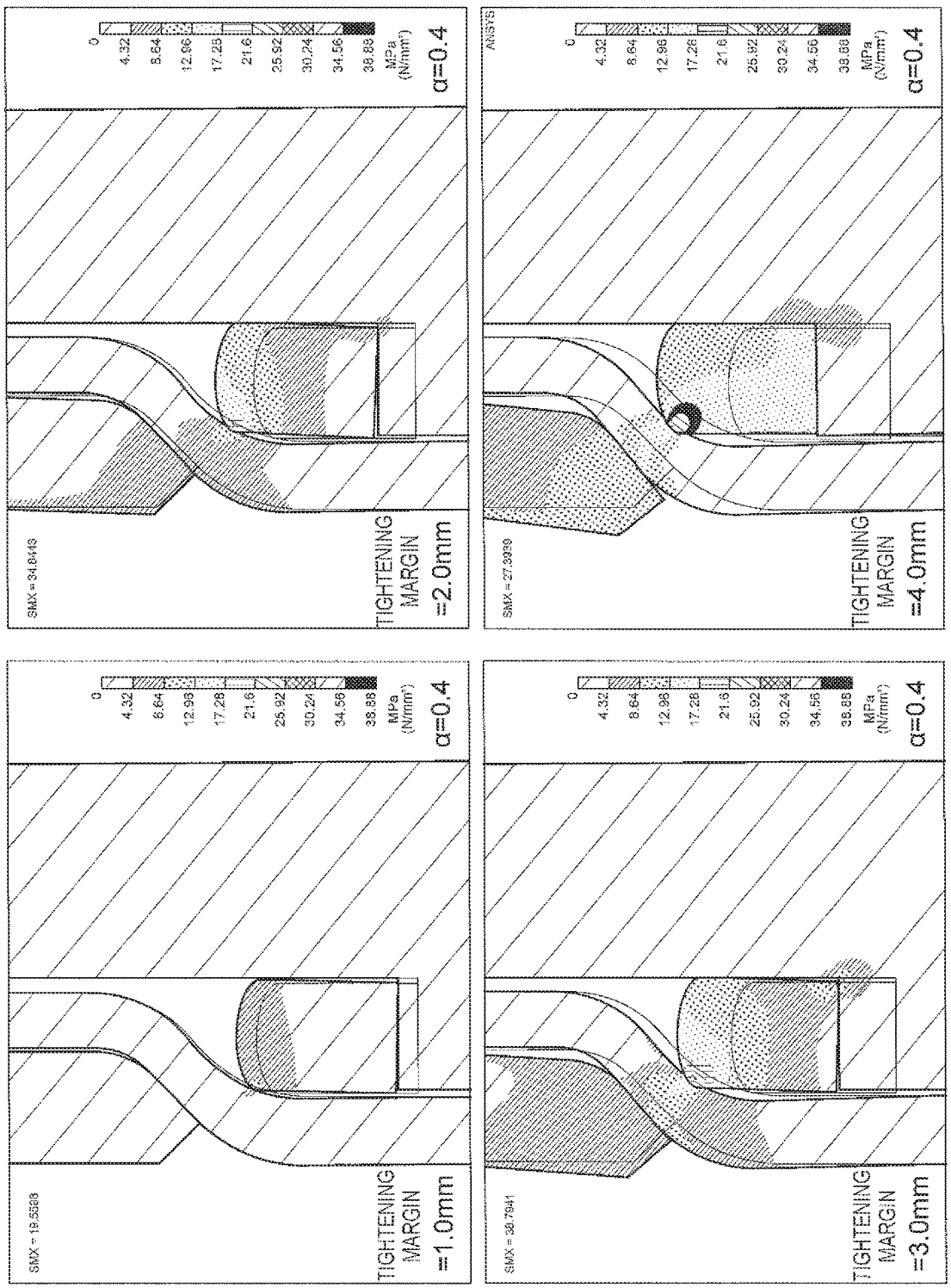
FIG. 28 illustrates simulation results on von Mises stress distribution corresponding to a tightening margin in the case of $\alpha=0.4$ and in the case in which the ring 70 is composed of PCTFE.
Figure 29:
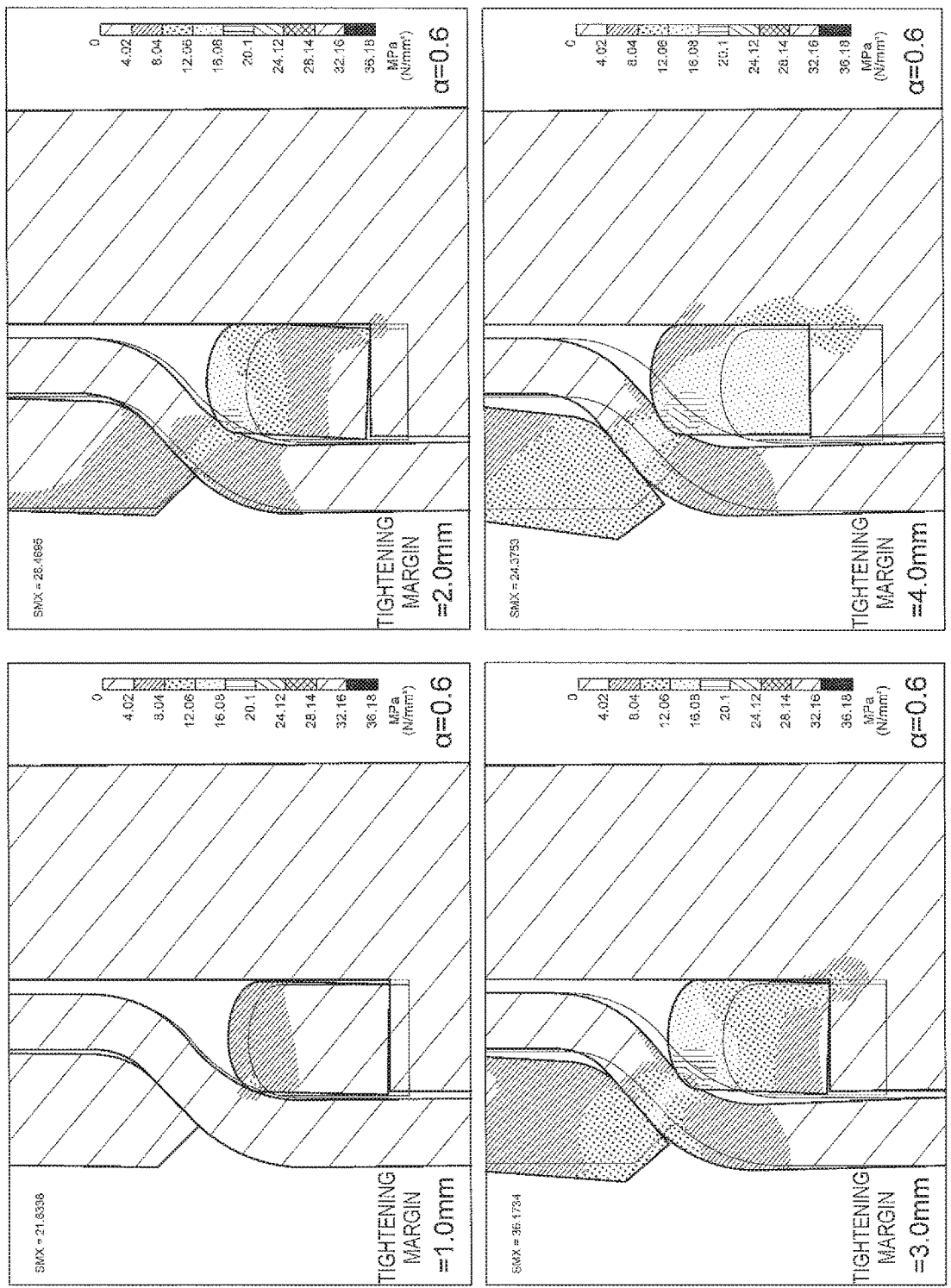
FIG. 29 illustrates simulation results on von Mises stress distribution corresponding to a tightening margin in the case of $\alpha=0.6$ and in the case in which the ring 70 is composed of PCTFE.
Figure 30:
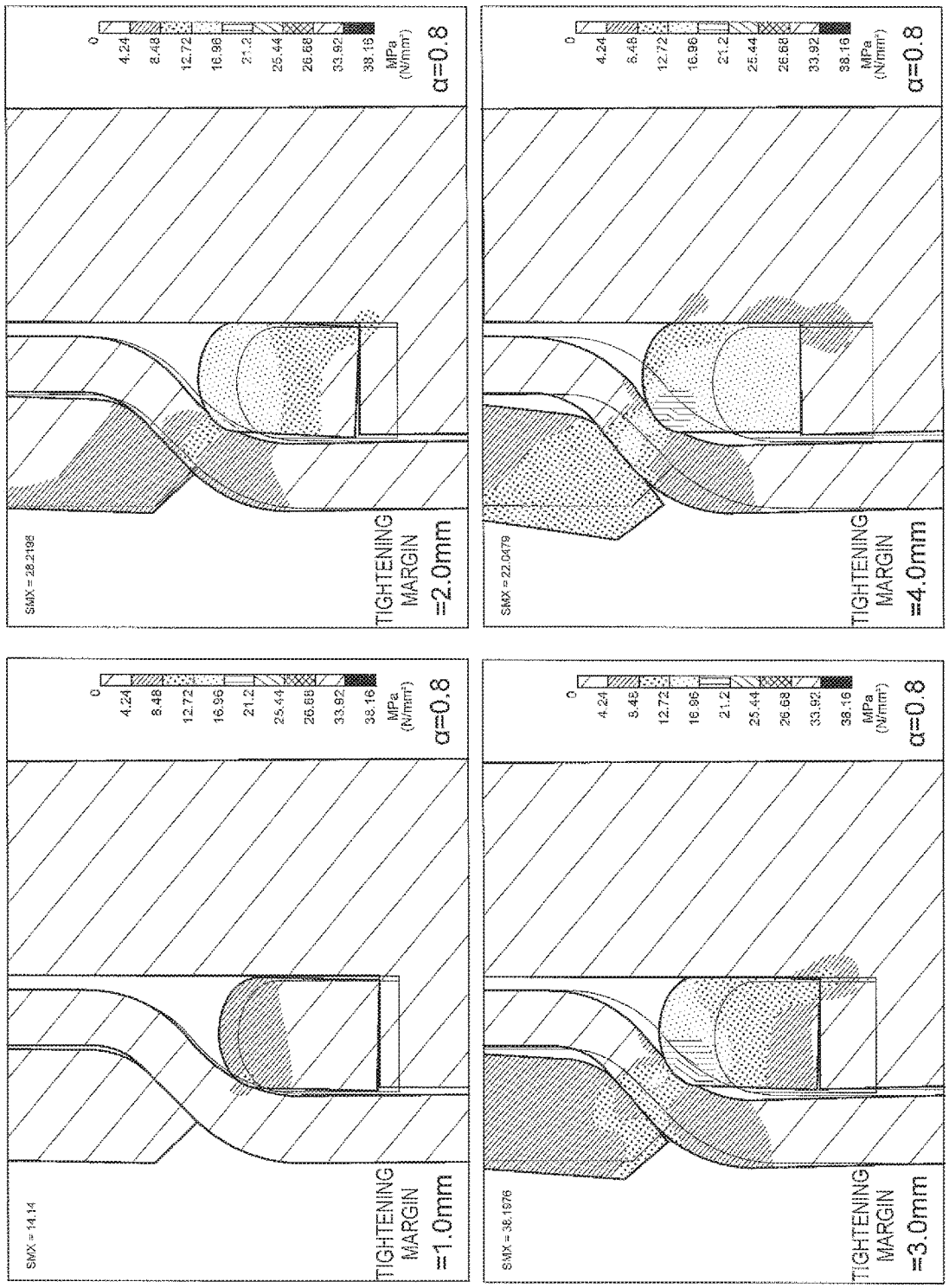
FIG. 30 illustrates simulation results on von Mises stress distribution corresponding to a tightening margin in the case of $\alpha=0.8$ and in the case in which the ring 70 is composed of PCTFE.
Figure 31:
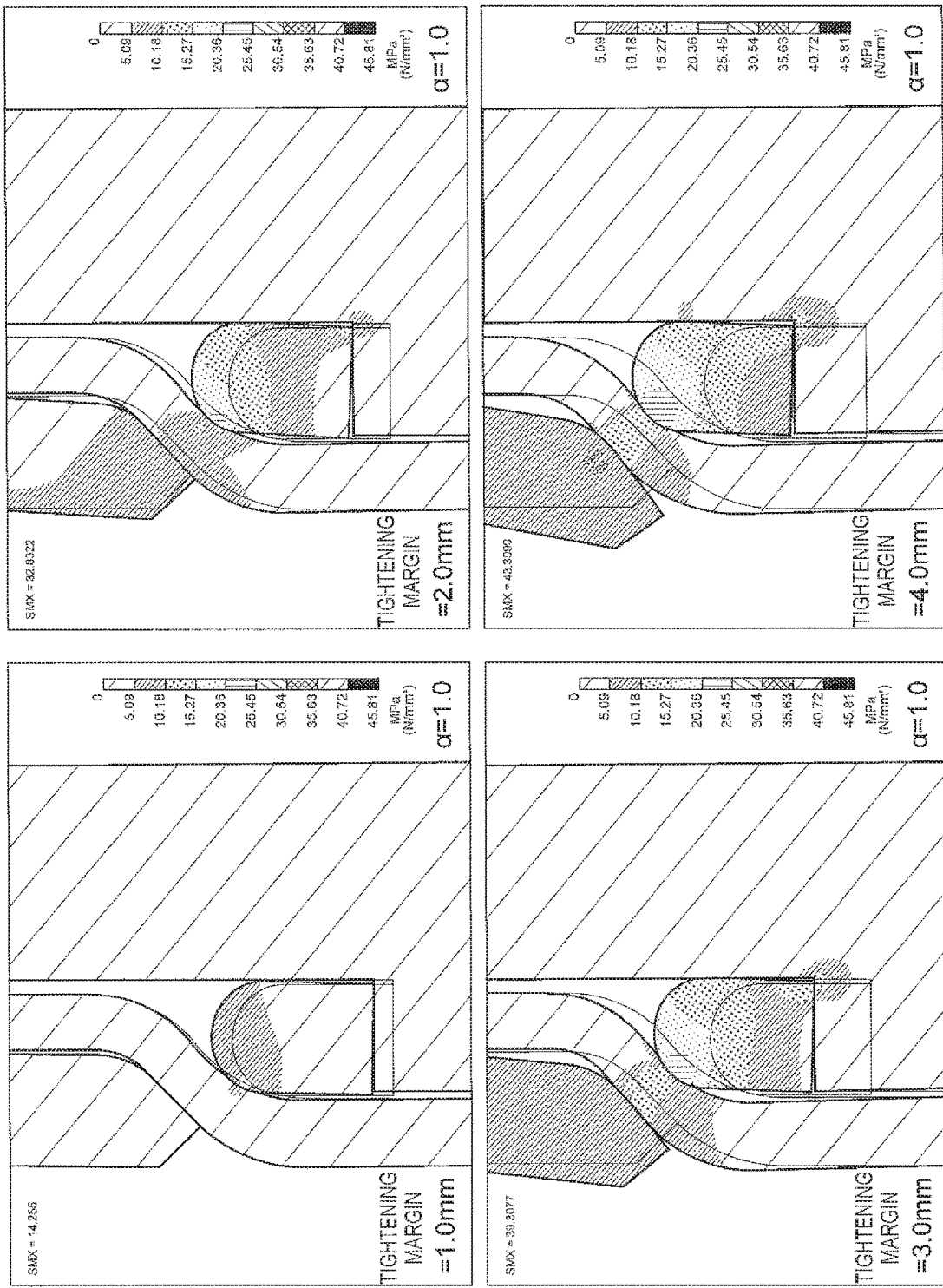
FIG. 31 illustrates simulation results on von Mises stress distribution corresponding to a tightening margin in the case of $\alpha=1.0$ and in the case in which the ring 70 is composed of PCTFE.
Figure 32:
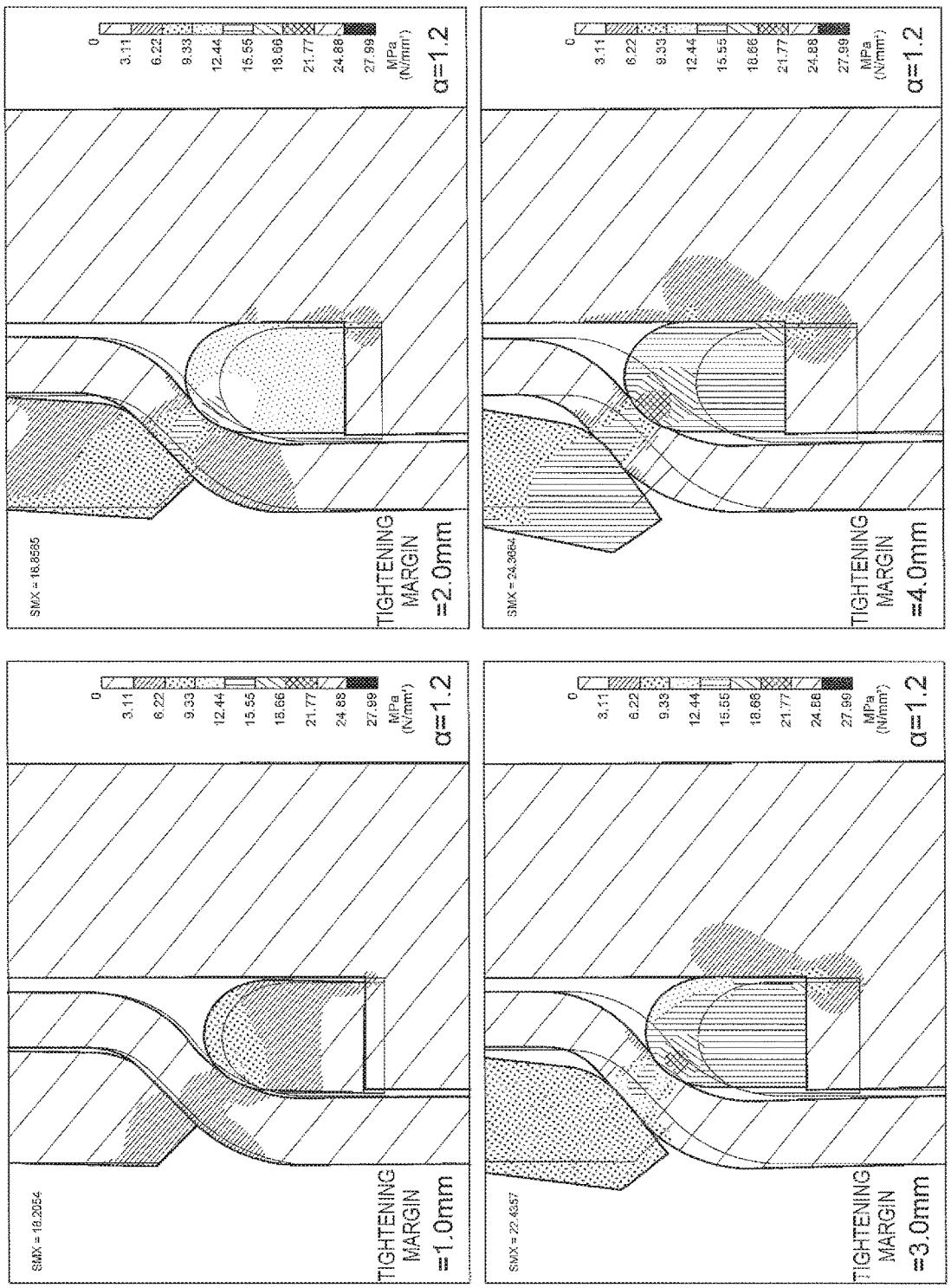
FIG. 32 illustrates simulation results on von Mises stress distribution corresponding to a tightening margin in the case of $\alpha=1.2$ and in the case in which the ring 70 is composed of PCTFE.
Figure 33:
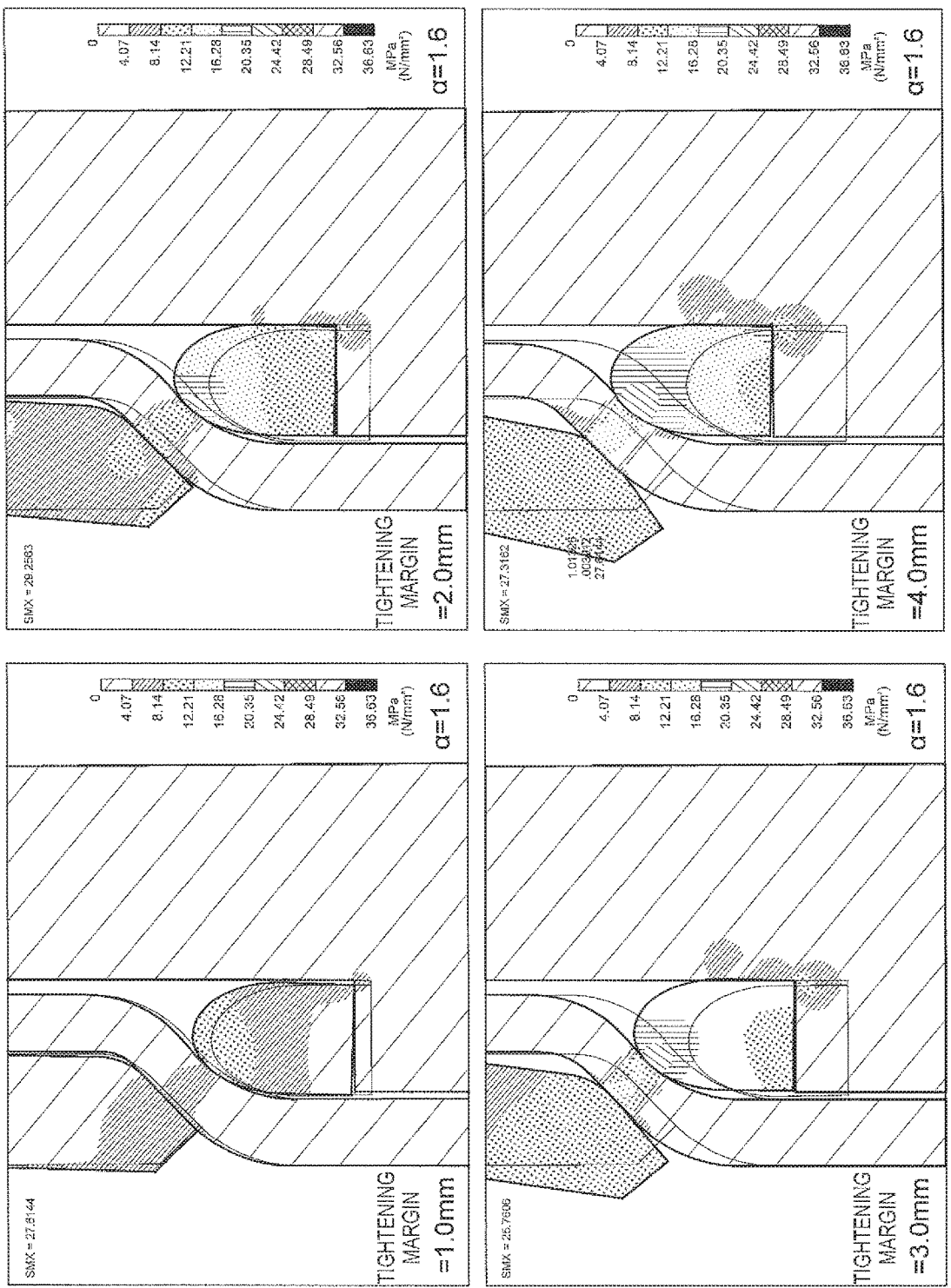
FIG. 33 illustrates simulation results on von Mises stress distribution corresponding to a tightening margin in the case of $\alpha=1.6$ and in the case in which the ring 70 is composed of PCTFE.
Figure 34:
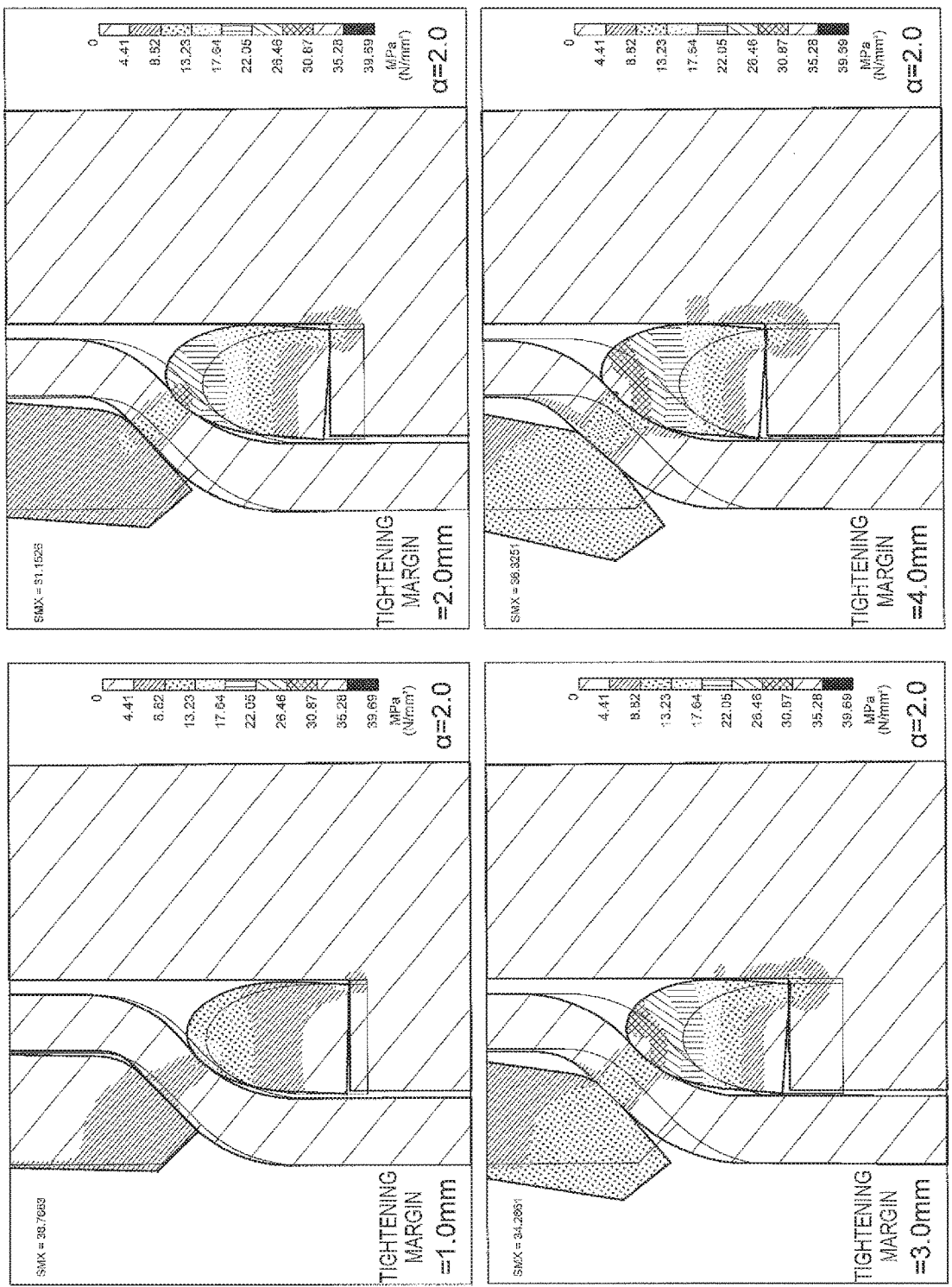
FIG. 34 illustrates simulation results on von Mises stress distribution corresponding to a tightening margin in the case of $\alpha=2.0$ and in the case in which the ring 70 is composed of PCTFE.
Figure 35:
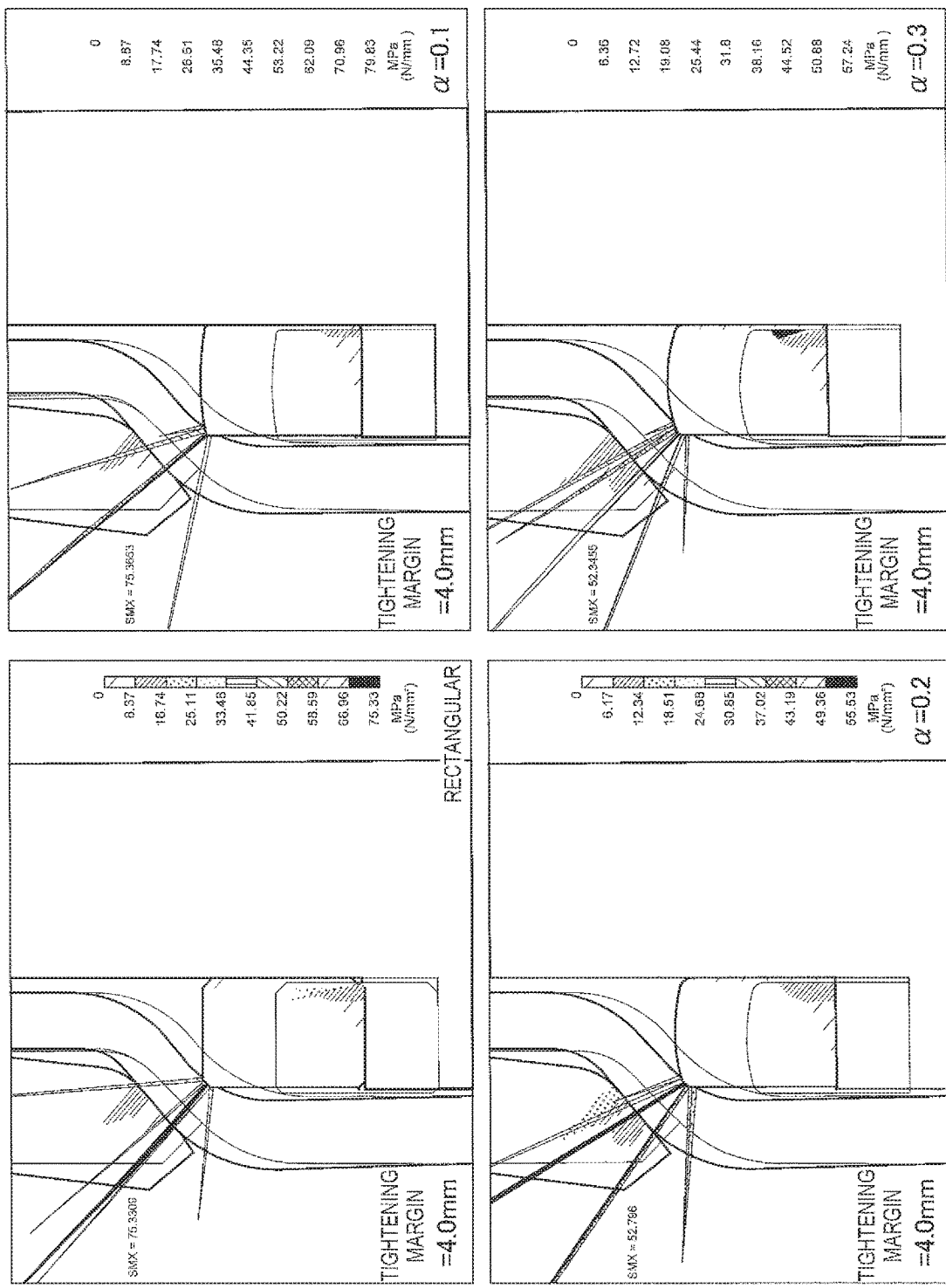
FIG. 35 illustrates simulation results on contact pressure distribution of a tightening margin of 4.0 mm in the case of $\alpha=0.1, 0.2, 0.3$ and in the case in which the ring 70 is composed of PCTFE and is rectangular.
Figure 36:
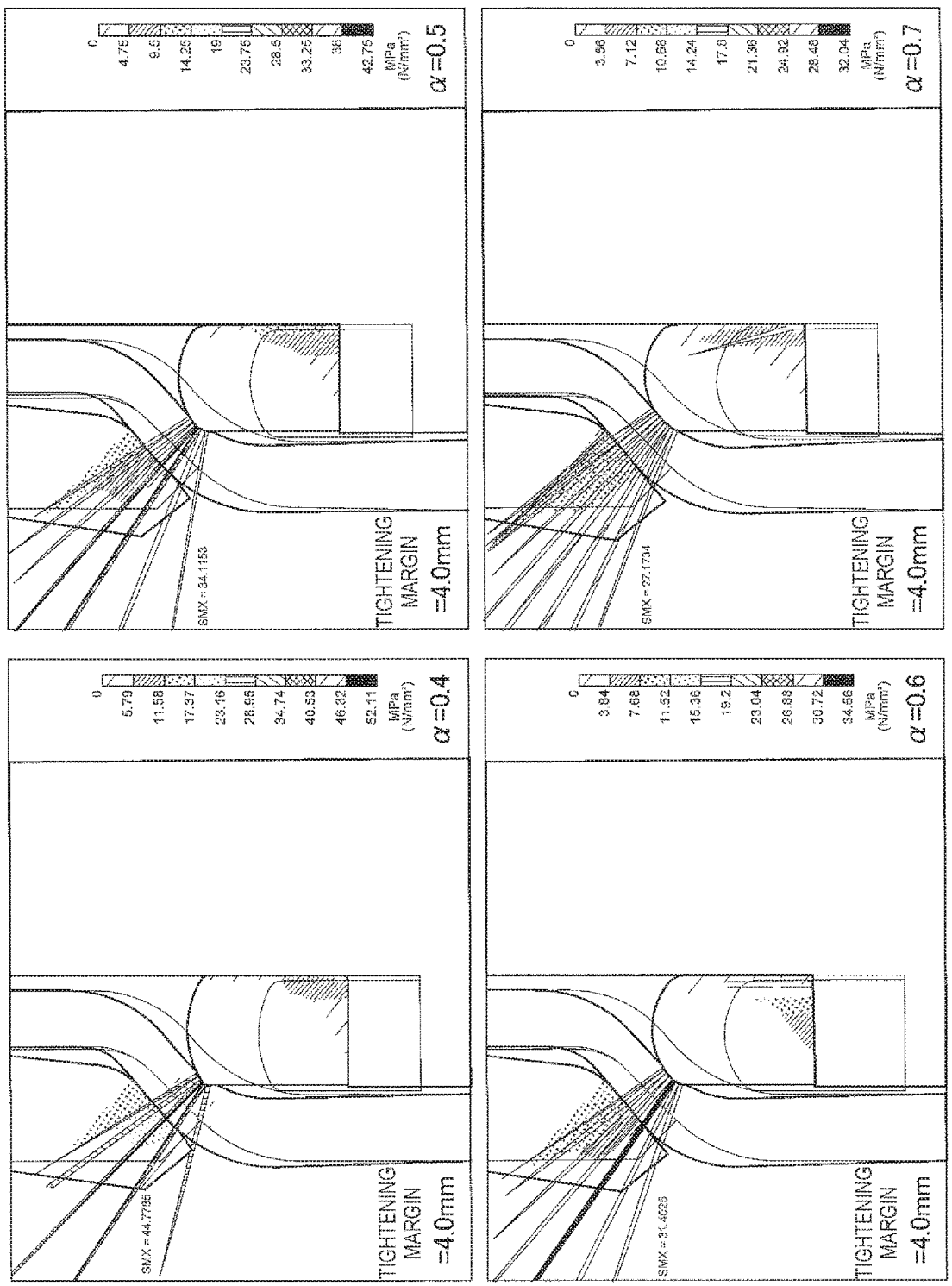
FIG. 36 illustrates simulation results on contact pressure distribution of a tightening margin of 4.0 mm in the case of $\alpha=0.4, 0.5, 0.6, 0.7$ and in the case in which the ring 70 is composed of PCTFE.
Figure 37:
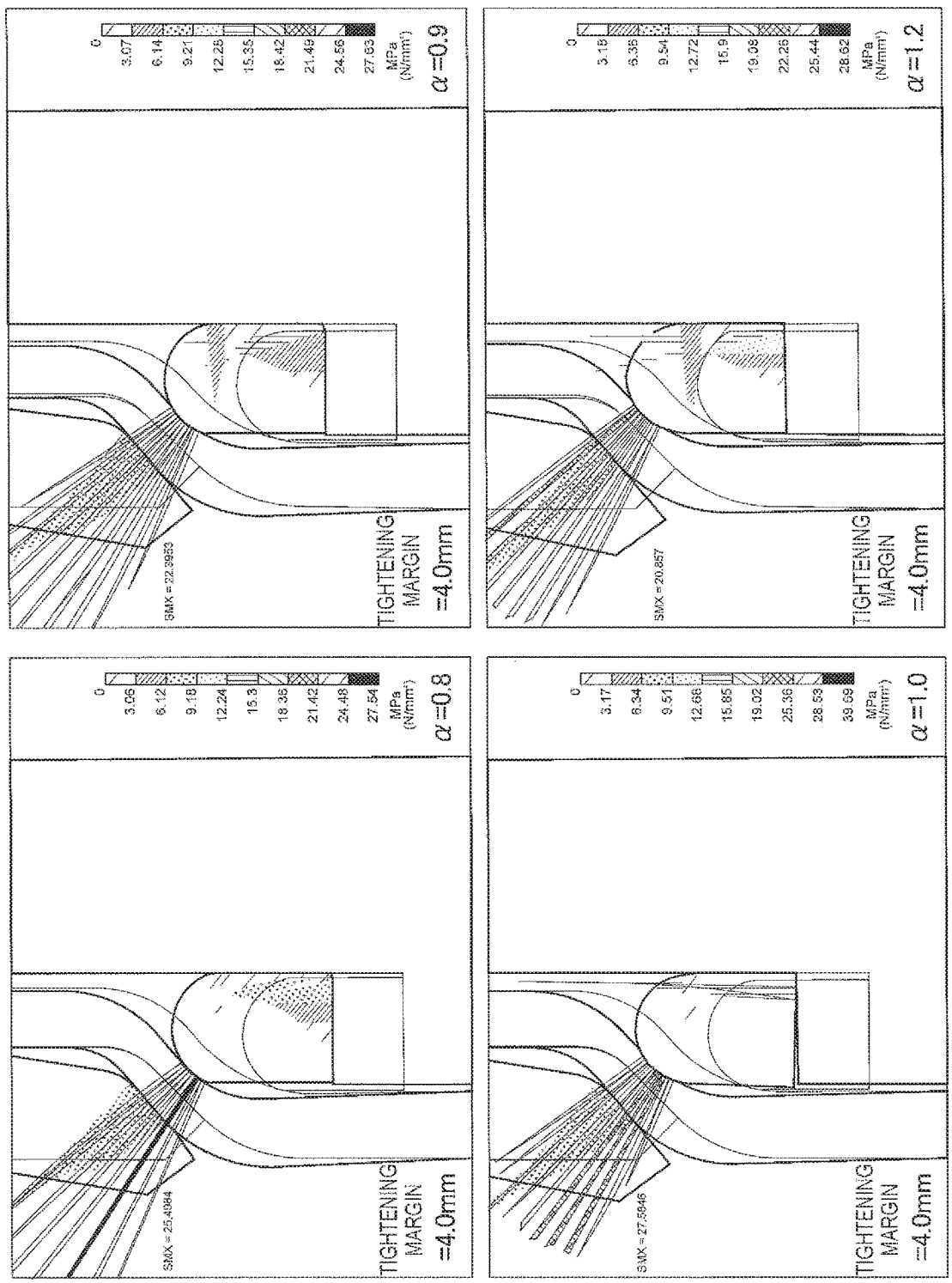
FIG. 37 illustrates simulation results on contact pressure distribution of a tightening margin of 4.0 mm in the case of $\alpha=0.8, 0.9, 1.0, 1.2$ and in the case in which the ring 70 is composed of PCTFE.
Figure 38:
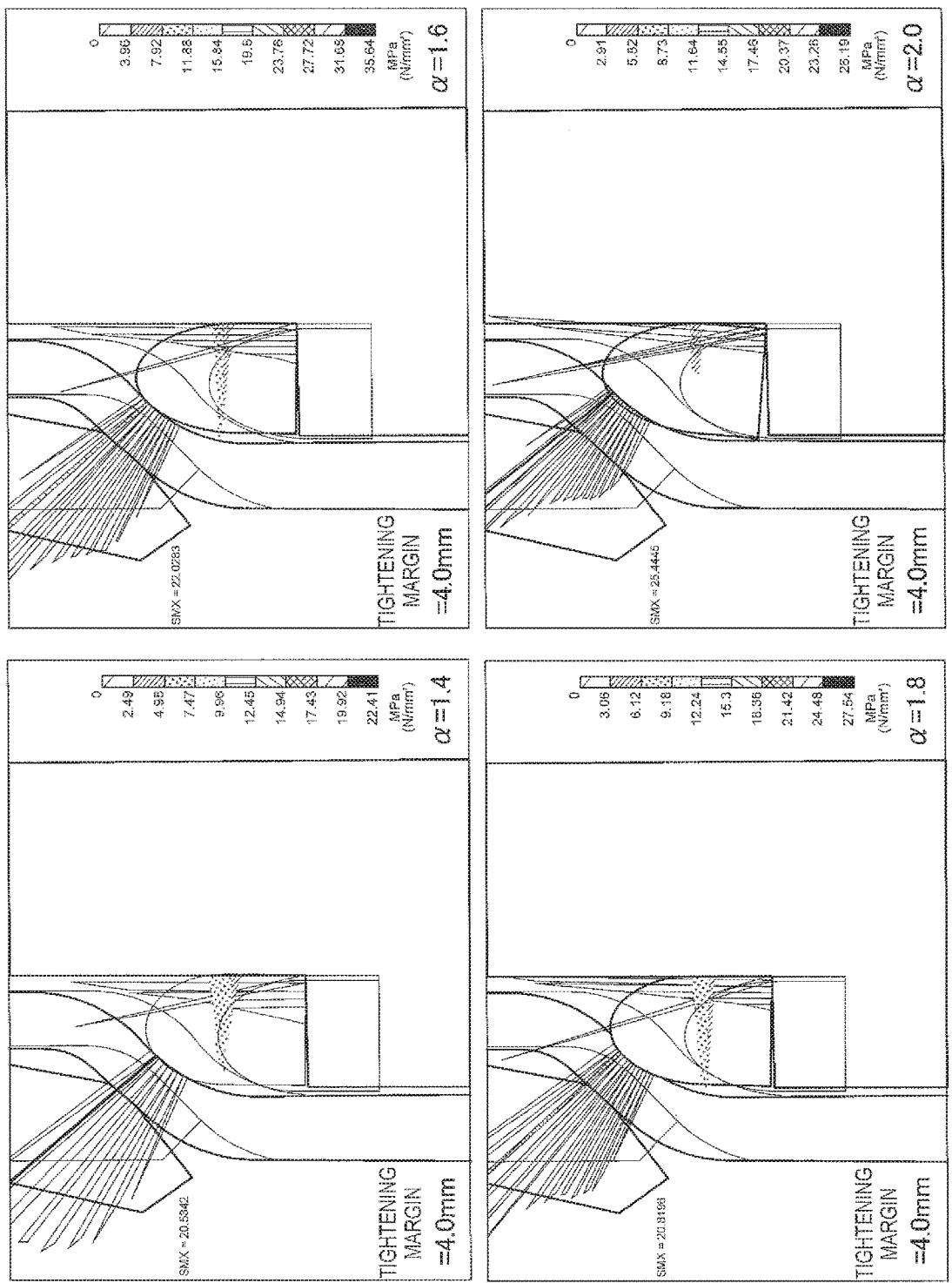
FIG. 38 illustrates simulation results on contact pressure distribution of a tightening margin of 4.0 mm in the case of $\alpha=1.4, 1.6, 1.8, 2.0$ and in the case in which the ring 70 is composed of PCTFE.

FIG. 25 illustrates simulation results on von Mises stress distribution corresponding to a tightening margin in the case in which the ring 70 was composed of PCTFE and was rectangular.

FIG. 26 through FIG. 34 illustrate simulation results on von Mises stress distribution corresponding to a tightening margin in the case in which the value of α (=h/r) was changed and in the case in which the ring 70 was composed of PCTFE.

FIG. 35 through FIG. 38 illustrate simulation results on contact pressure distribution of in the case of a tightening margin of 4.0 mm and in the case in which the ring 70 was composed of PCTFE and was rectangular, and in the case in which α was changed. It should be noted that hatchings relating to the location at which the ring 70 is in contact with the tube 90 primarily indicate portions having a von Mises stress close to SMX of the maximum von Mises stress.

From these figures, it is clear that, as the tightening margin increases, the maximum stress of the location at which the ring 70 is in contact with the tube 90 increases. Thereby, a sealing property is improved. Moreover, when the tightening margin is 4.0 mm, and in the case in which the ring 70 is rectangular or α=0.1, the wedging of the ring 70 into the tube 90 is observed. Therefore, the tube 90 is readily cut when the tightening margin is greater than 4.0 mm. Thus, it is clear that, preferably, the tightening margin is 4.0 mm or smaller.

On the other hand, as the tightening margin is smaller and the ring 70 less wedges into the tube 90, flaws on the tube 90 are prevented. However, the tightening force will be smaller to decrease sealing property.

Moreover, it is clear that, preferably, the tightening margin is 30% or greater and 125% or smaller of the thickness of the tube 90 with reference to the thickness of the tube 90.

It should be noted that it is clear that it is desirable that the value of α is 0.2 or more and 1.1 or less, and that the tightening margin is 2.0 mm or greater and 5.0 mm or smaller in order to ensure a maximum von Mises stress SMX at the contact location of 25 MPa (2.5 kN/cm²) or greater as a sufficient tightening force.

(Simulations of Process of Pulling Out of Tube)

Simulations were performed to ascertain changes in a pulling force according to the value of α and/or a tightening margin during the "process of pulling out of the tube" in which the tube 90 is pulled out from a state in which the tube 90 is tighten by the ring 70 having each of different values of α and for each tightening margin.

Here, a pulling force was calculated such that the tube 90 would be subjected to axial forced displacement in the process of pulling out of the tube 90. More particularly, the pulling force was calculated on the basis of a force needed to cause the tube 90 to be subjected to axial forced displacement. Moreover, given that a pulling speed was sufficiently slow in the process of pulling out of the tube, the yield strength and the like of a material of the tube 90 was considered.

Figure 39:
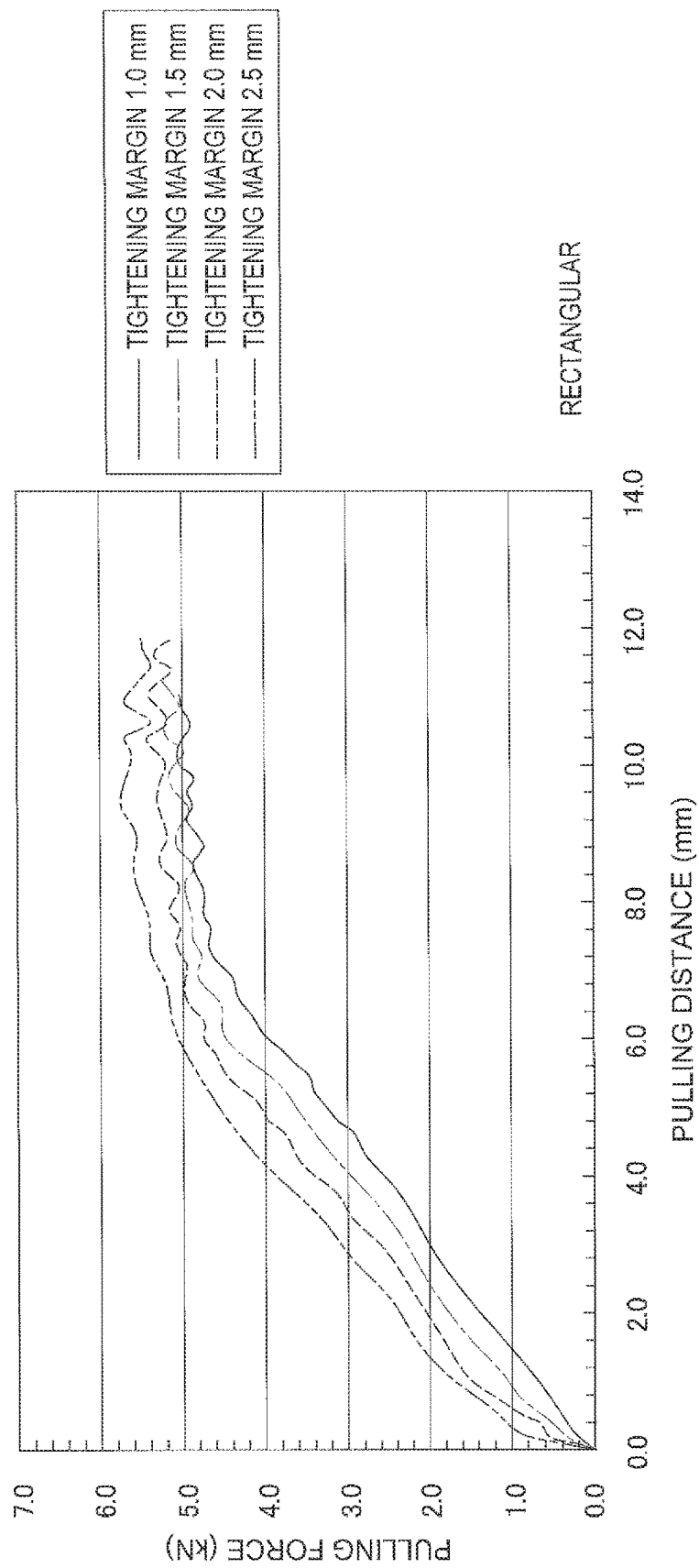
FIG. 39 illustrates simulation results on a pulling force for each tightening margin corresponding to a pulling distance in the case in which the ring 70 is composed of PCTFE and is rectangular.
Figure 40:
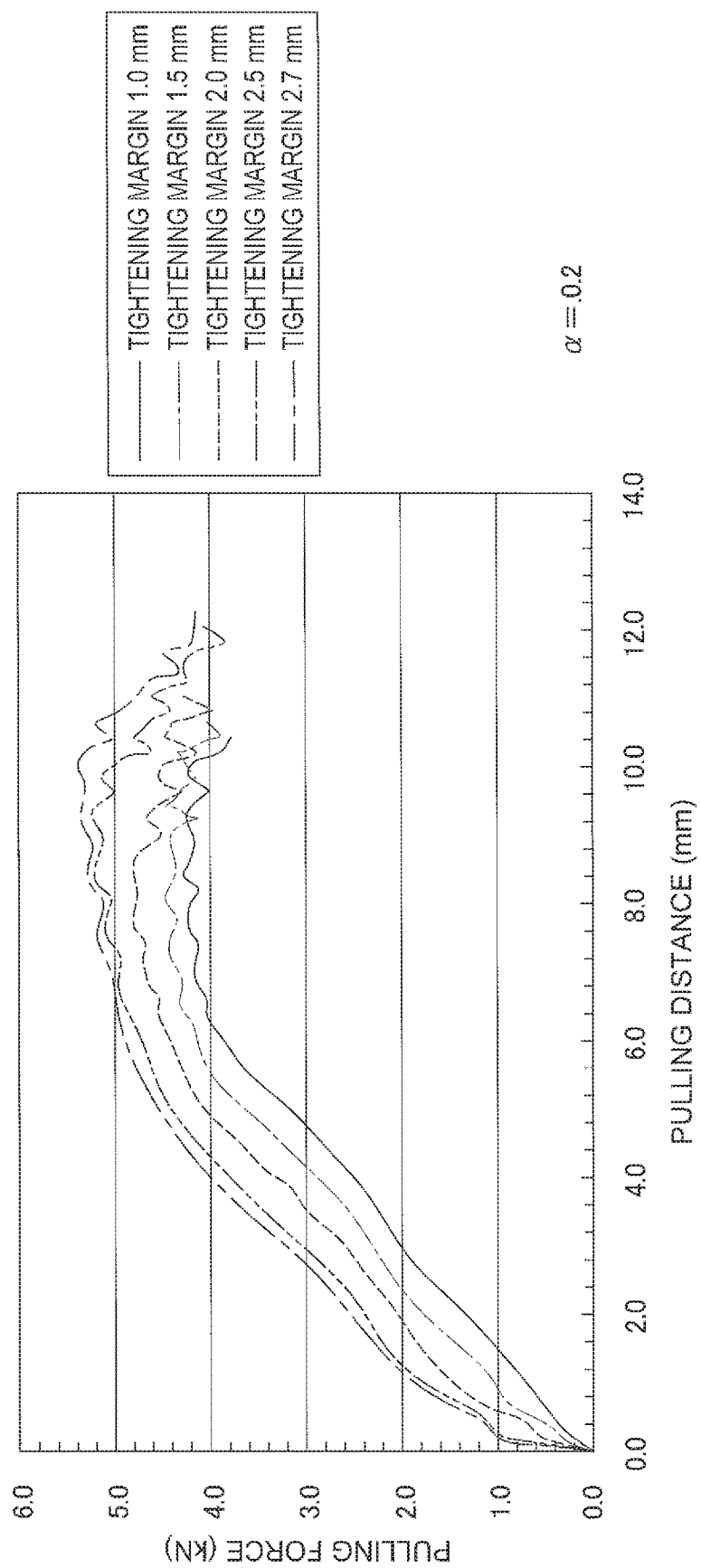
FIG. 40 illustrates simulation results on a pulling force for each tightening margin corresponding to a pulling distance in the case of $\alpha=0.2$ and the ring 70 is composed of PCTFE.
Figure 41:
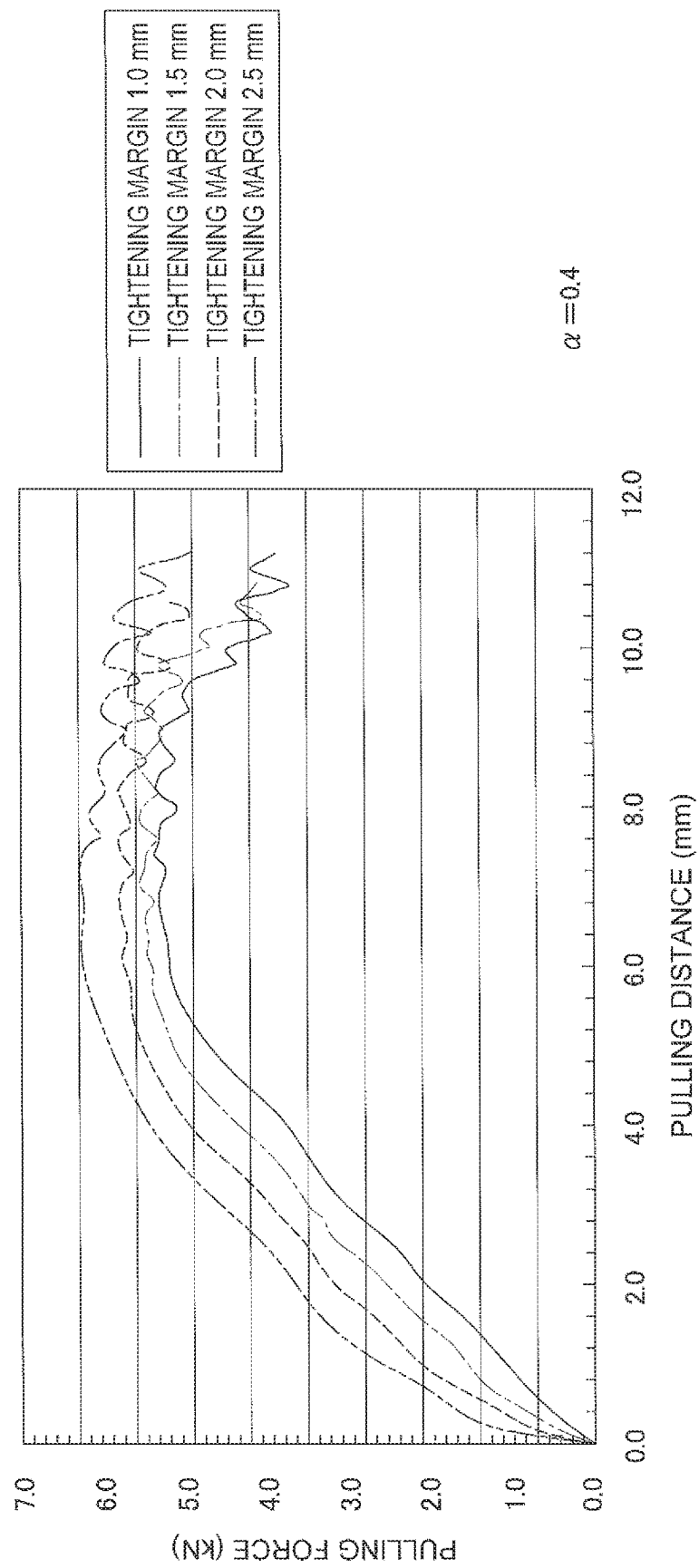
FIG. 41 illustrates simulation results on a pulling force for each tightening margin corresponding to a pulling distance in the case of $\alpha=0.4$ and the ring 70 is composed of PCTFE.
Figure 42:
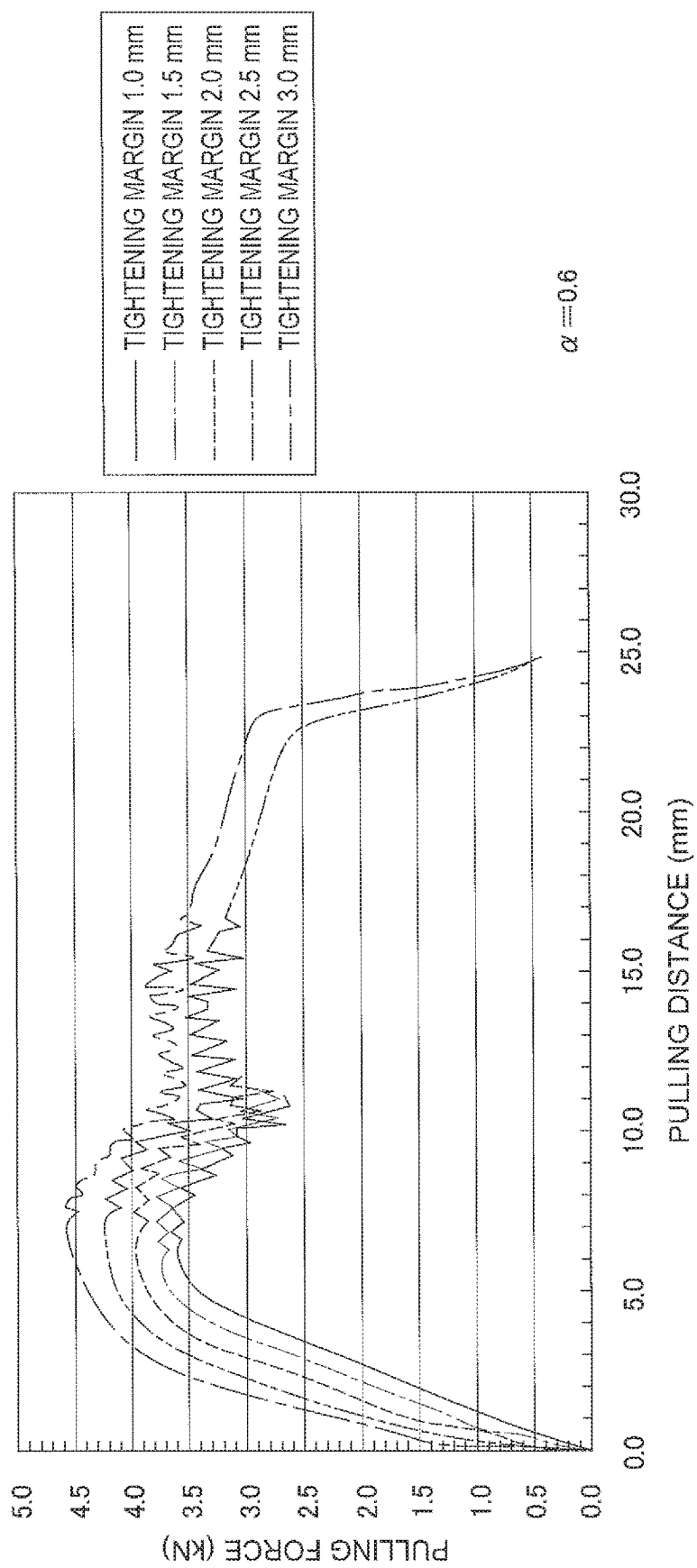
FIG. 42 illustrates simulation results on a pulling force for each tightening margin corresponding to a pulling distance in the case of $\alpha=0.6$ and the ring 70 is composed of PCTFE.
Figure 43:
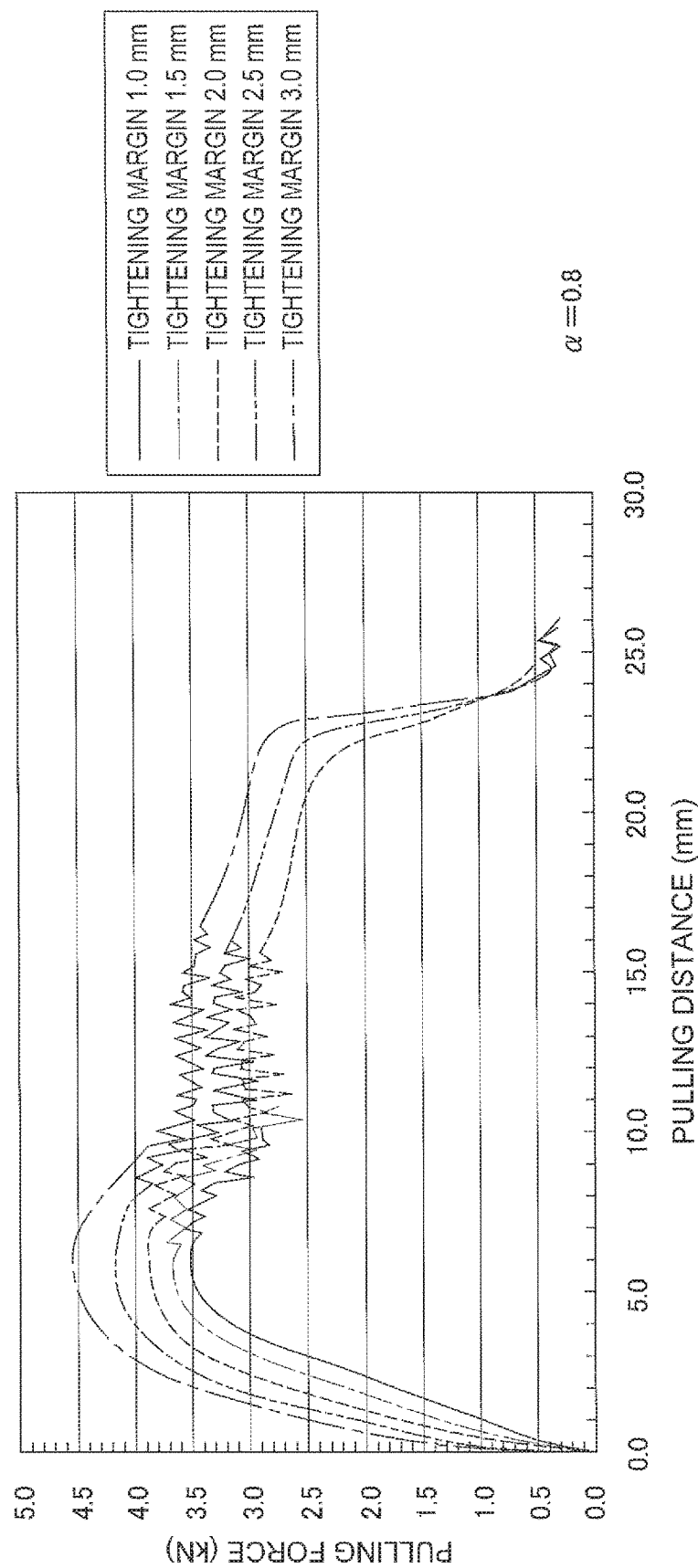
FIG. 43 illustrates simulation results on a pulling force for each tightening margin corresponding to a pulling distance in the case of $\alpha=0.8$ and the ring 70 is composed of PCTFE.
Figure 44:
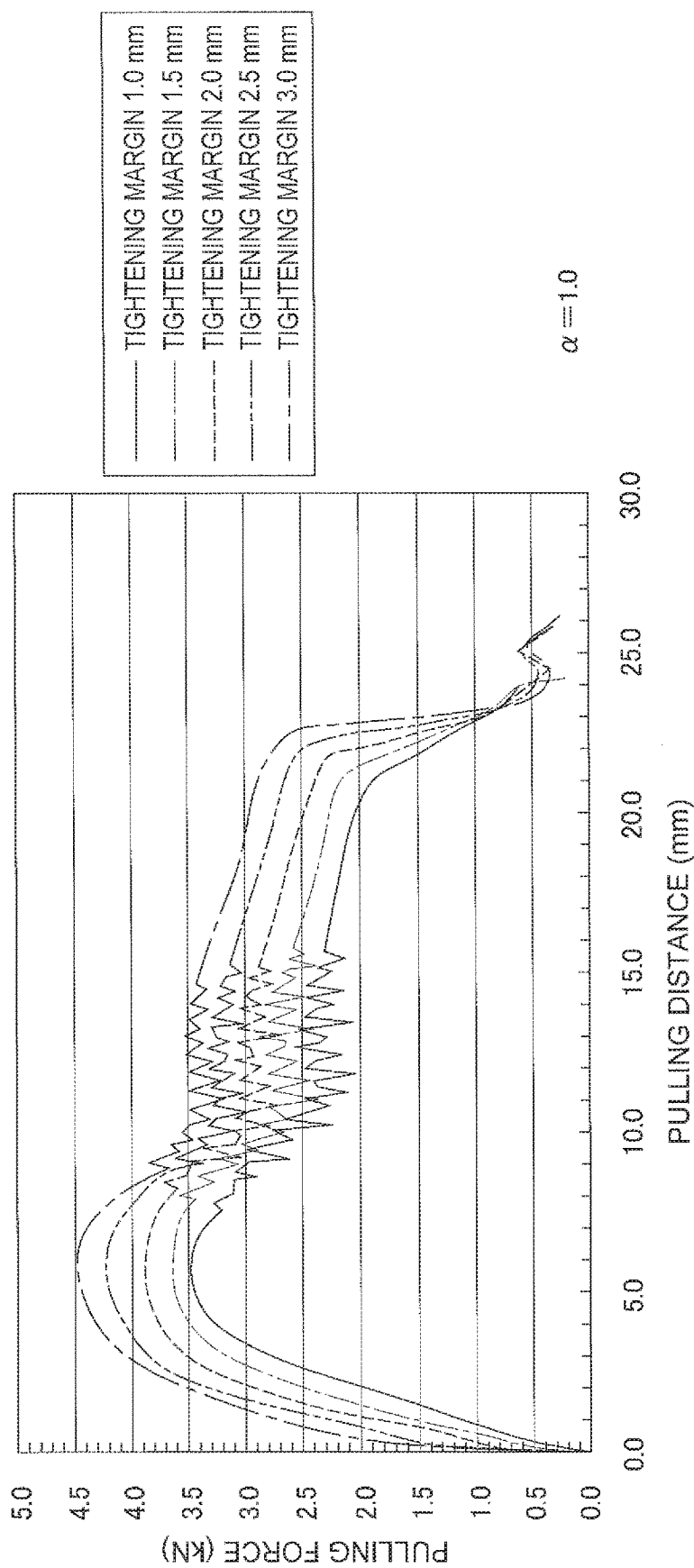
FIG. 44 illustrates simulation results on a pulling force for each tightening margin corresponding to a pulling distance in the case of $\alpha=1.0$ and the ring 70 is composed of PCTFE.
Figure 45:
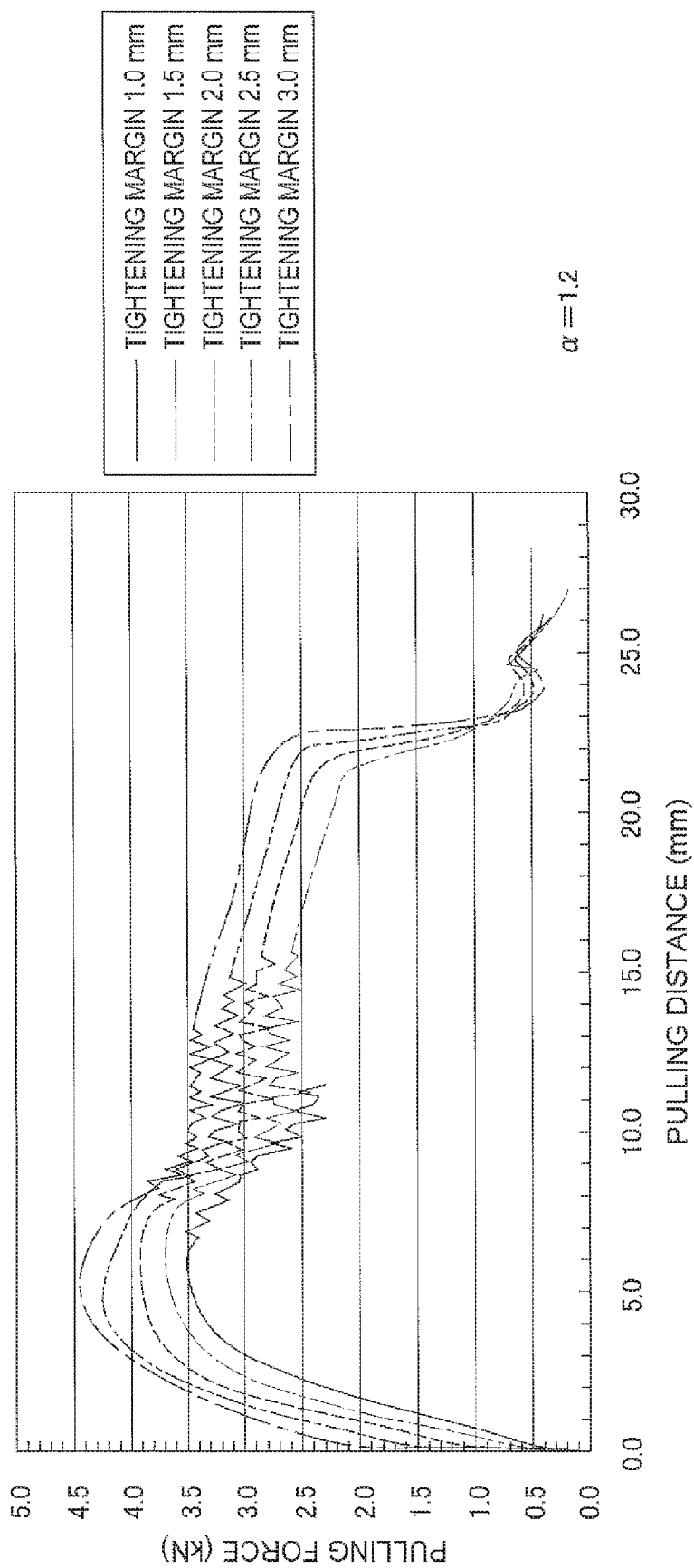
FIG. 45 illustrates simulation results on a pulling force for each tightening margin corresponding to a pulling distance in the case of $\alpha=1.2$ and the ring 70 is composed of PCTFE.
Figure 46:
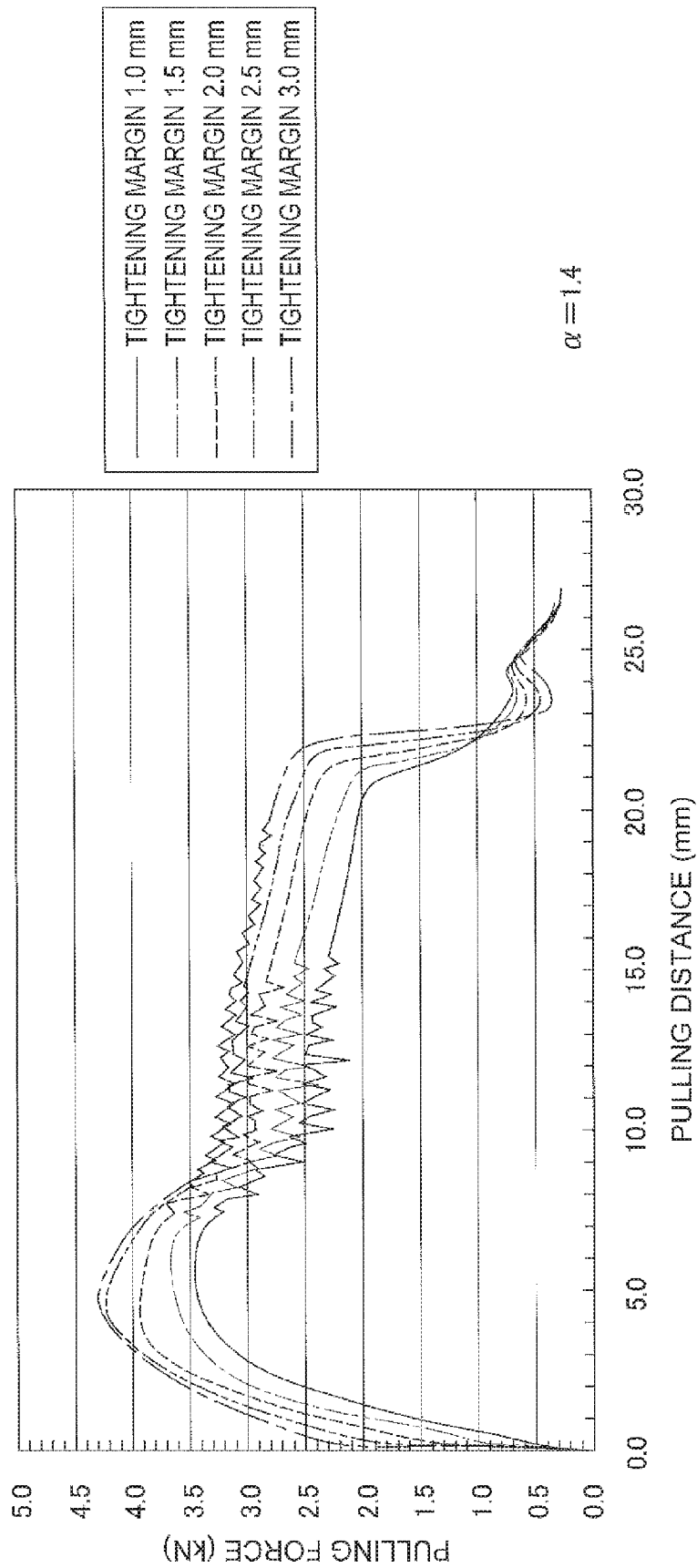
FIG. 46 illustrates simulation results on a pulling force for each tightening margin corresponding to a pulling distance in the case of $\alpha=1.4$ and the ring 70 is composed of PCTFE.
Figure 47:
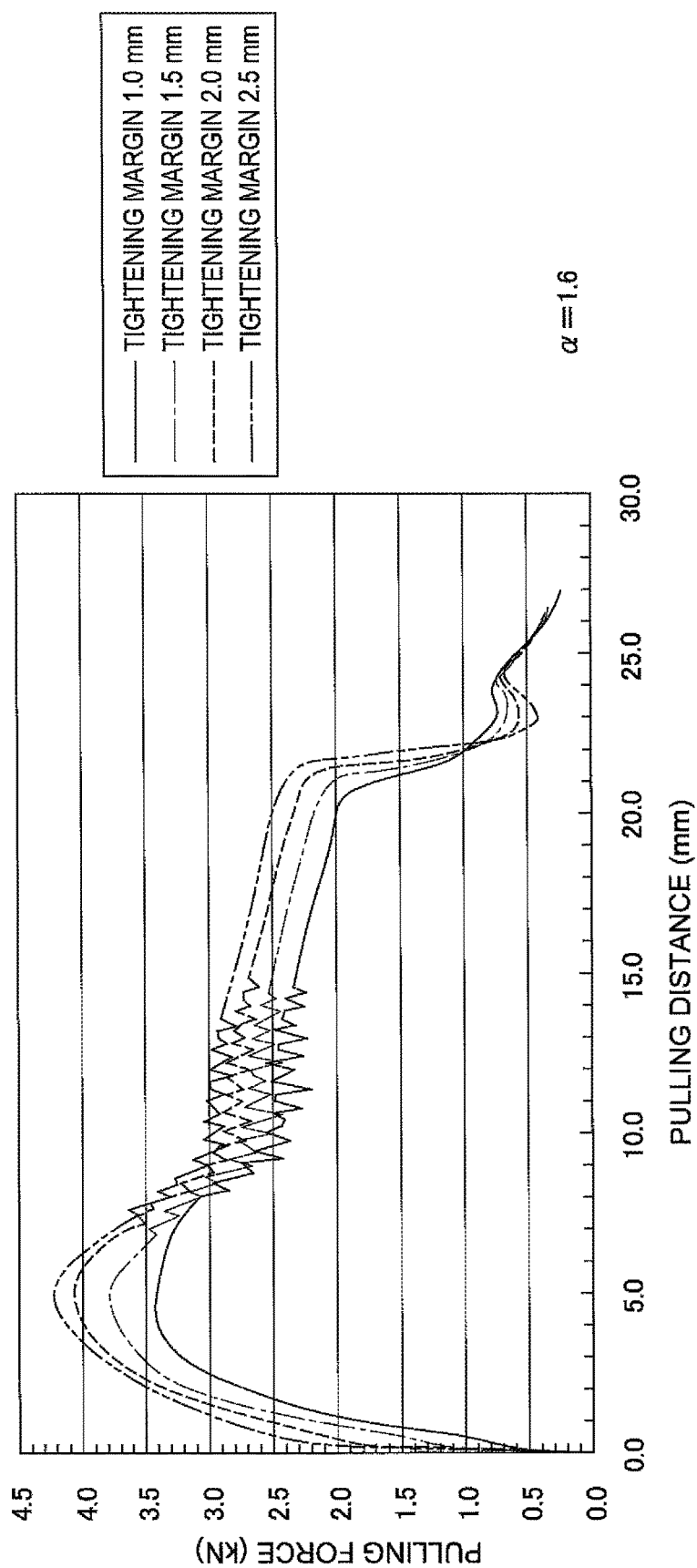
FIG. 47 illustrates simulation results on a pulling force for each tightening margin corresponding to a pulling distance in the case of $\alpha=1.6$ and the ring 70 is composed of PCTFE.
Figure 48:
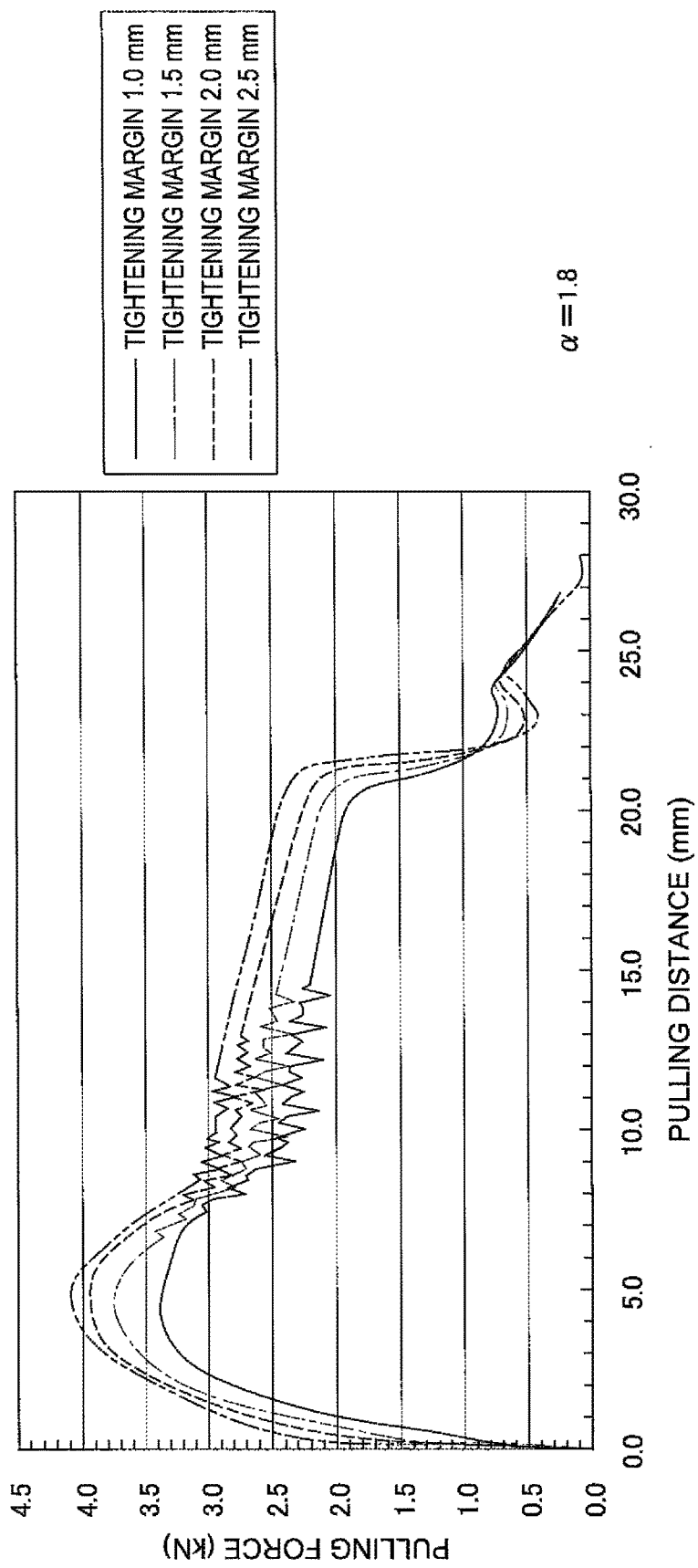
FIG. 48 illustrates simulation results on a pulling force for each tightening margin corresponding to a pulling distance in the case of $\alpha=1.8$ and the ring 70 is composed of PCTFE.
Figure 49:
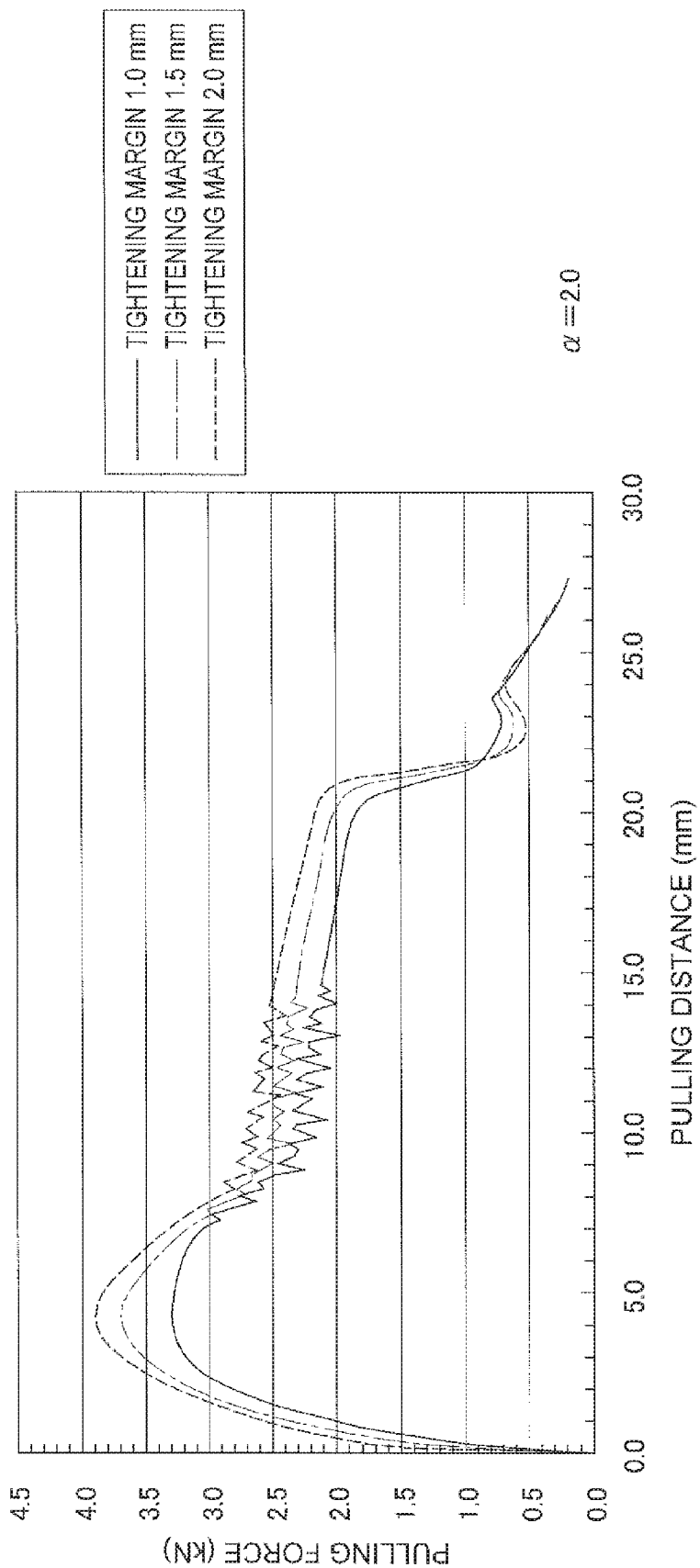
FIG. 49 illustrates simulation results on a pulling force for each tightening margin corresponding to a pulling distance in the case of $\alpha=2.0$ and the ring 70 is composed of PCTFE.

FIG. 39 illustrates simulation results on a pulling force for each of tightening margins corresponding to a pulling distance in the case in which the ring 70 was composed of PCTFE and was rectangular.

FIG. 40 through FIG. 49 illustrate simulation results on a pulling force for each tightening margin corresponding to a pulling distance in the case in which the ring 70 had α=0.2, 0.4, 0.6, 0.8, 1.0, 1.2, 1.4, 1.6, 1.8, 2.0, and the ring 70 was composed of PCTFE.

Figure 50:
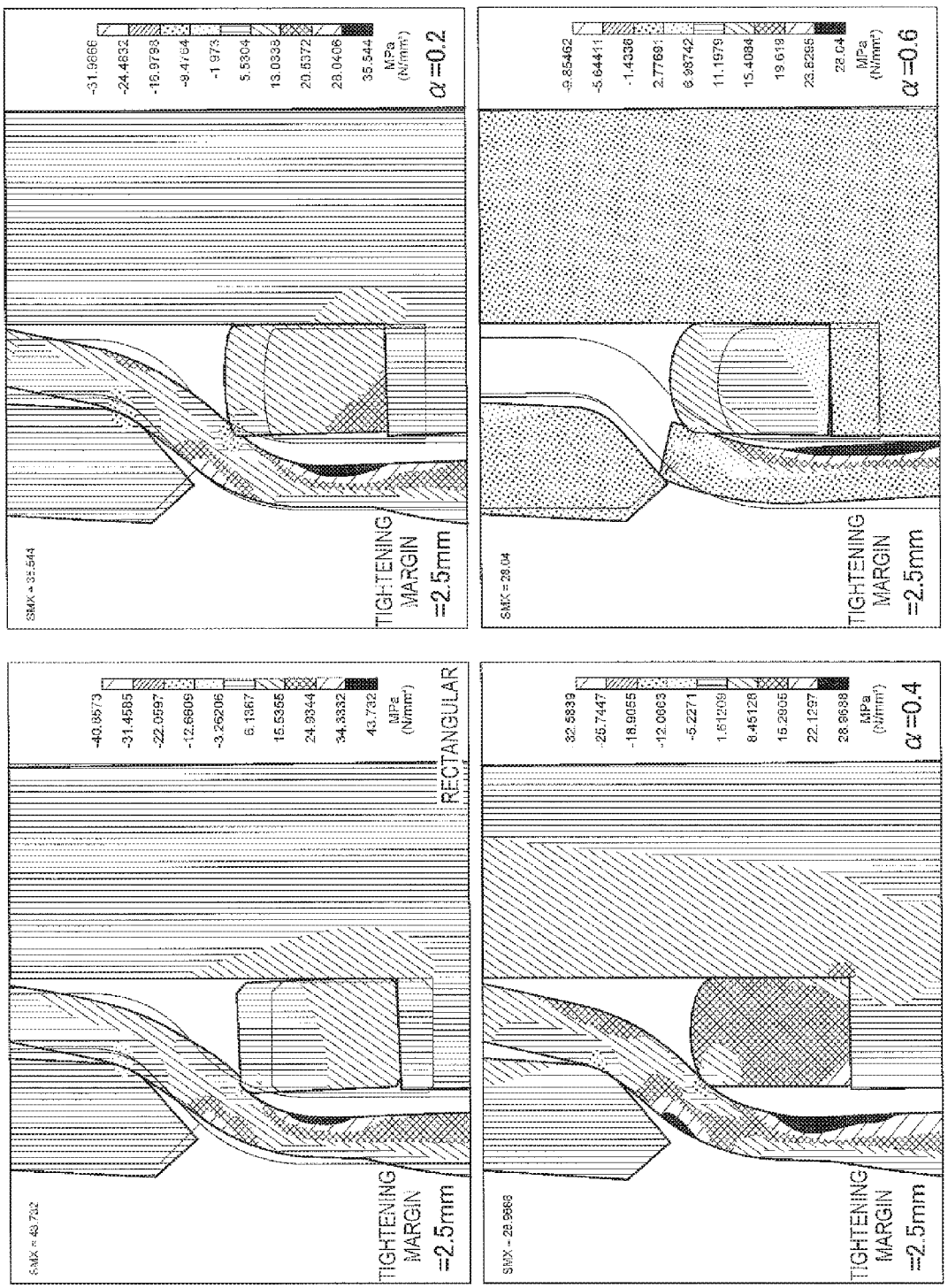
FIG. 50 illustrates simulation results on first principle stress distribution during pulling out of the tube in the case in which the tightening margin is 2.5 mm, the ring 70 has $\alpha=0.2, 0.4, 0.6$, and the ring 70 is composed of PCTFE and is rectangular.
Figure 51:
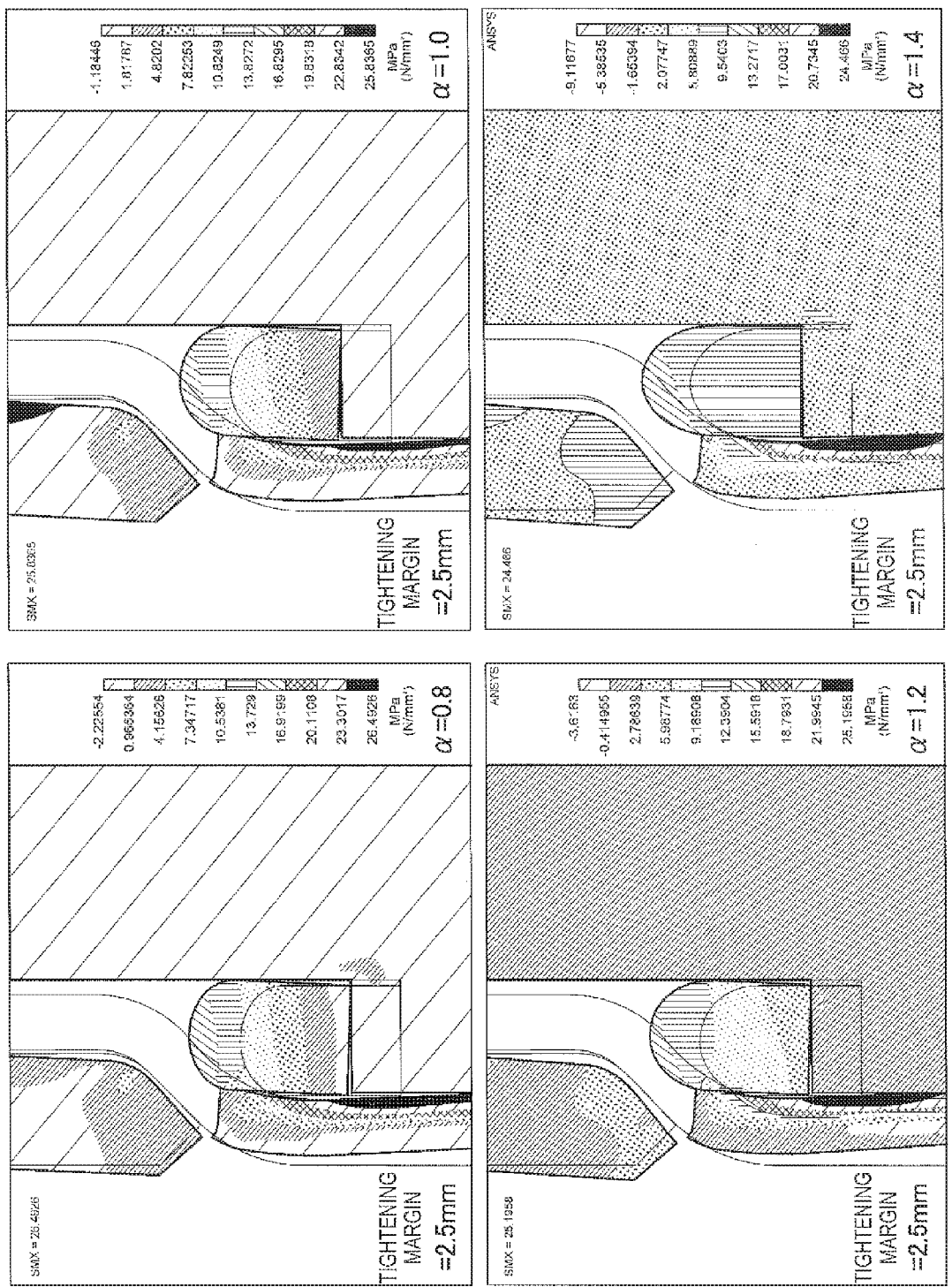
FIG. 51 illustrates simulation results on first principle stress distribution during pulling out of the tube in the case in which the tightening margin is 2.5 mm, the ring 70 has $\alpha=0.8, 1.0, 1.2, 1.4$, and the ring 70 is composed of PCTFE.

FIG. 50 through FIG. 52 illustrate simulation results on first principle stress distribution during the pulling out of the tube (the final state in view of calculation) in the case in which the tightening margin was 2.5 mm, the ring 70 had α=0.2, 0.4, 0.6, 0.8, 1.0, 1.2, 1.4, 1.6, 1.8, and the ring 70 was composed of PCTFE and was rectangular. Here, the values defined as SMX refer to a maximum value of stress distributed.

From these figures, it is clear that in the case in which the ring 70 is rectangular and/or the value of α is small, the tube 90 is caught by the ring 70 and extended during the pulling out, and a great tensile stress is acted on the tube. It is clear that in the case in which a portion of the ring 70 abutting the tube 90 significantly wedges into the tube 90 during the tightening of the nut 30, the tube 90 may be cut in the case in which a pulling force is acted on the tube 90.

It is clear that in the case in which the ring 70 has the value of α of 0.2, 0.4, the tube was pulled out in the same manner as in the case in which the ring 70 was rectangular.

Moreover, it was found that in the case in which the value of α of the ring 70 was greater than 0.4, the tube 90 is resistant to being caught by the portion at which the ring 70 contact the tube 90, and thus, the tube 90 is readily detached. Moreover, it is clear that, as the ring 70 has a greater α, the pulling force on the tube 90 tends to decrease.

Thus, it is clear that, preferably, the value of α of the ring 70 is 0.5 or more and 1.2 or less in order to make the tube 90 resistant to the wedging of the ring 70 and to ensure a sufficient pulling force during the pulling out of the tube 90.

(Simulations in Case of Inclined End Part of Ring on Nut Side)

Figure 53:
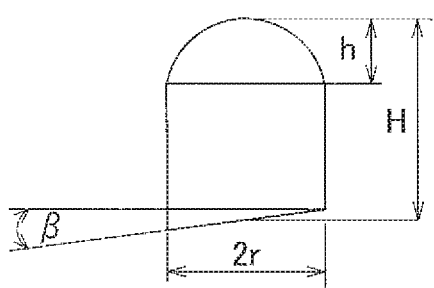
FIG. 53 is an explanatory diagram of an inclination angle $\beta$ in the case in which the surface of the ring on the nut side is inclined.

As illustrated in FIG. 53, simulations were performed to verify whether a tightening force was changed according to the size of the inclination angle β relative to the radial direction in the case in which the end surface of the ring 70 on the nut 30 side opposite to the joint body 20 side was inclined toward the nut 30 side such that an inward axial component of the ring 70 was long.

Figure 54:
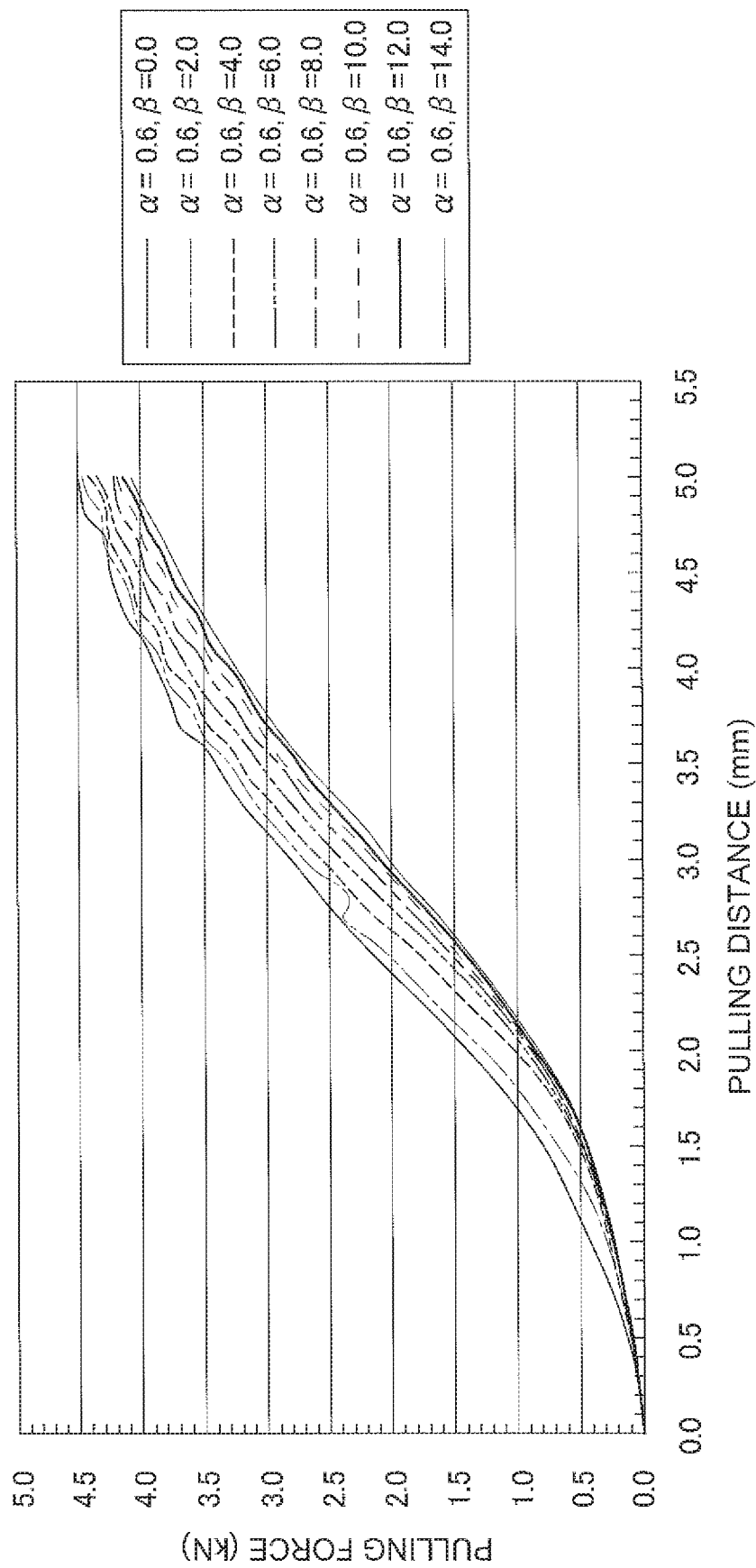
FIG. 54 illustrates simulation results on the relationship of a tightening force corresponding to the tightening margin in the case in which the ring 70 has a fixed value of α=0.6, the value of β is changed from 0.0 to 14.0, and the ring 70 is composed of PCTFE.

FIG. 54 illustrates simulation results on the relationship of a tightening force corresponding to a tightening margin in the case in which the ring 70 had a fixed value of α=0.6, the value of β was changed from 0.0 to 14.0, and the ring 70 was composed of PCTFE.

Figure 55:
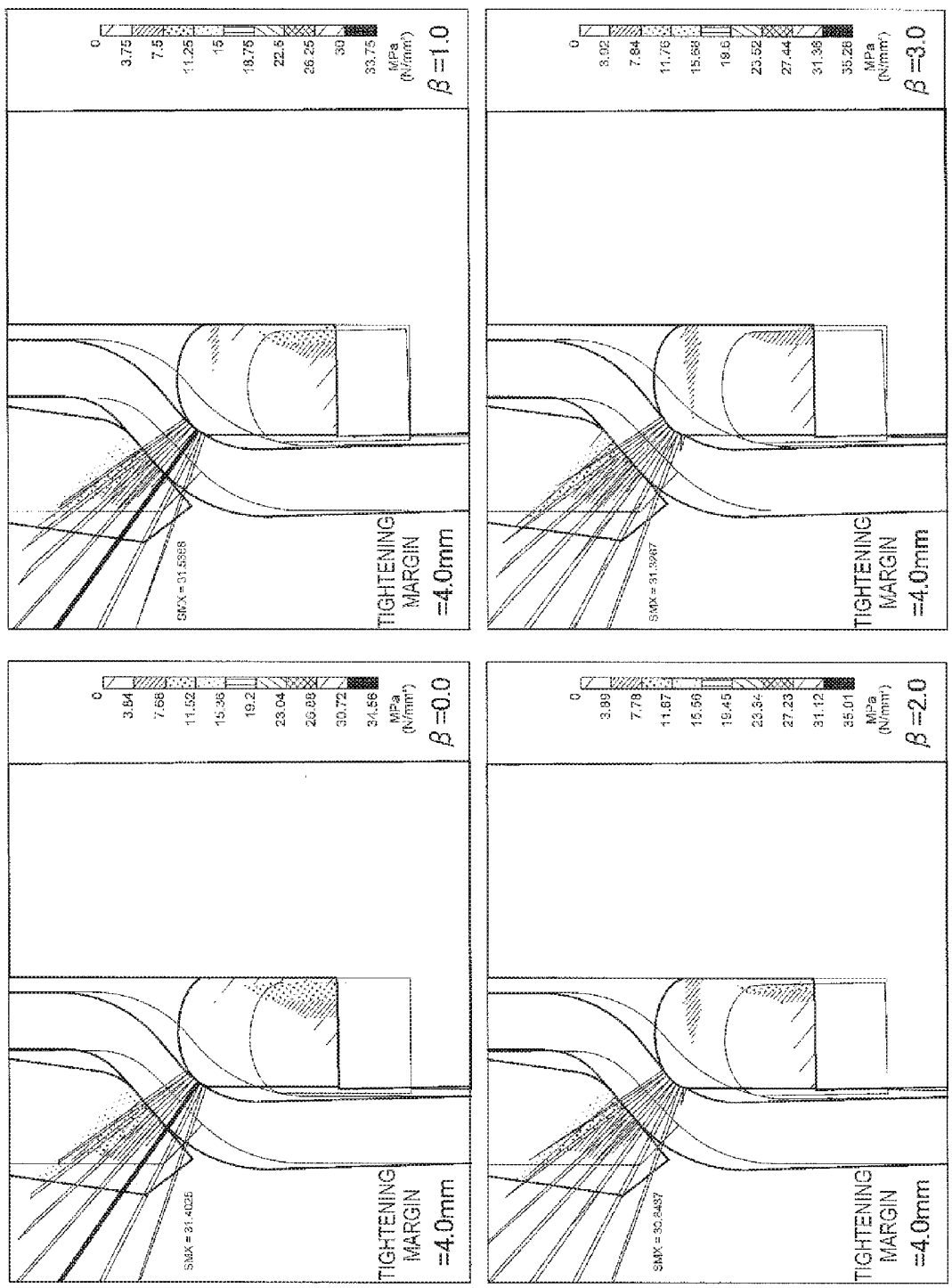
FIG. 55 illustrates simulation results on contact pressure distribution in the case in which the tightening margin is 4.0 mm, the ring 70 has a fixed value of α=0.6, the value of β is 0.0, 1.0, 2.0, 3.0, and the ring 70 is composed of PCTFE.
Figure 56:
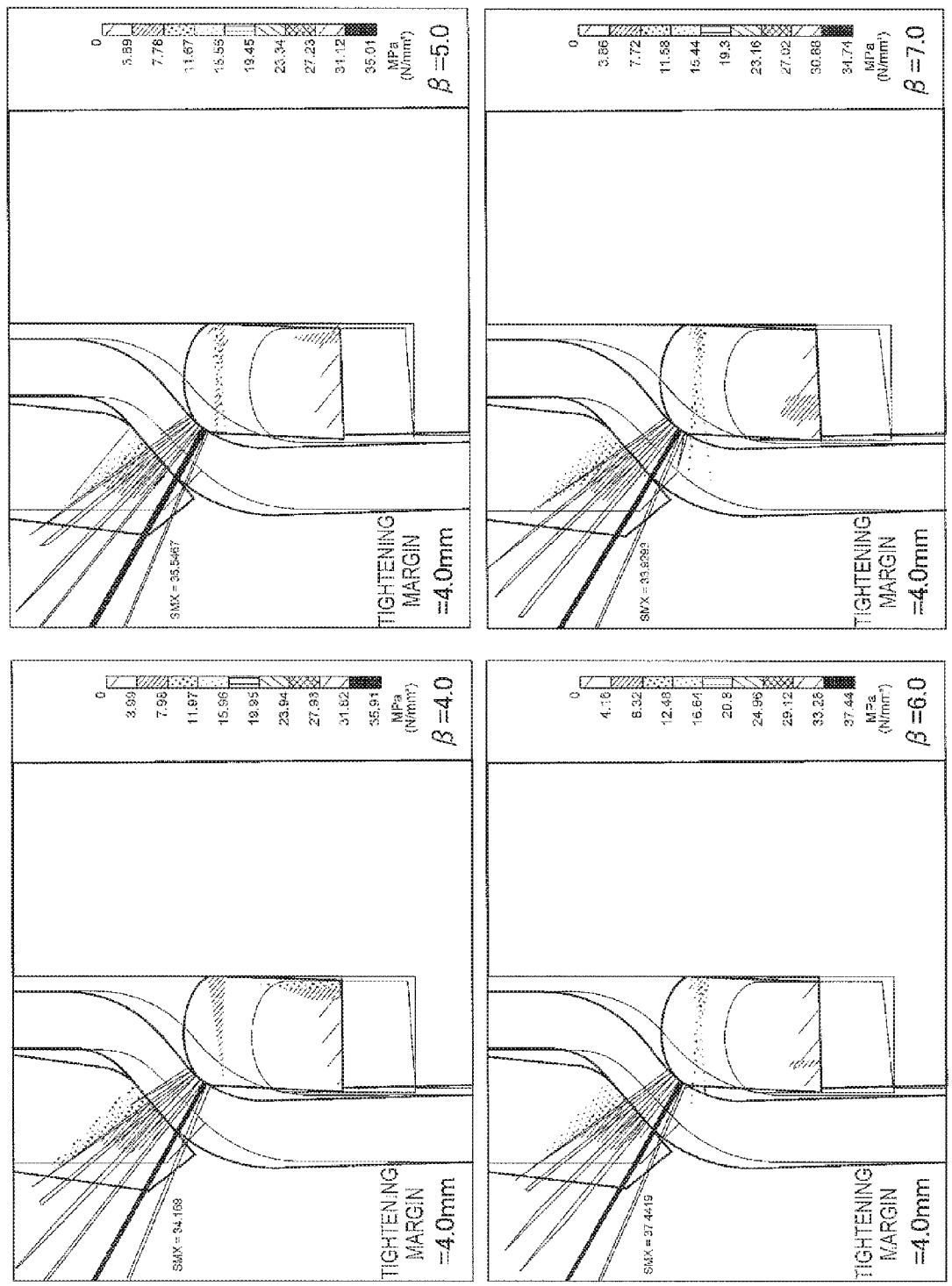
FIG. 56 illustrates simulation results on contact pressure distribution in the case in which the tightening margin is 4.0 mm, the ring 70 has a fixed value of α=0.6, the value of β is 4.0, 5.0, 6.0, 7.0, and the ring 70 is composed of PCTFE.

FIG. 55 through FIG. 57 illustrate simulation results on contact pressure distribution in the case in which the tightening margin was 4.0 mm, the ring 70 had a fixed value of α=0.6, the value of β was changed from 0.0 to 9.0, and the ring 70 was composed of PCTFE.

It should be noted that a value defined as SMX in each of diagrams in FIGS. 55 through 57 refers to a maximum value (maximum von Mises stress) of the von Mises stress of a location at which the ring 70 was in contact with the tube 90.

It should be noted that hatchings relating to the location at which the ring 70 is in contact with the tube 90 primarily indicate portions having a von Mises stress close to SMX of the maximum von Mises stress.

From these figures, it is clear that, as the inclination angle β of the ring 70 increases, the tightening force decreases. It is considered that this decrease in the tightening force is caused by the reduction in the contact area of the ring 70 with the nut 30 according to the increase in the inclination angle β of the ring 70.

Moreover, it is clear that the deformation in the ring 70 itself is able to decrease and contact pressure distribution over the contact portion between the ring 70 and the abutted part of the nut 30 is able to be made uniform in the radial direction even in a state in which a sufficient tightening force of the ring 70 on the tube 90 has been ensured and in the case in which the surface of the ring 70 on the side axially opposite to the joint body 20 side is inclined between 1.0 degrees or greater and 7.0 degrees or smaller relative to the surface of the abutted part of the nut 30 such that the ring 70 is positioned closer to the abutted part side of the constricted diameter part 36 of the nut 30 radially inward.

What is claimed is:

1. A joint configured to be connected to a tube including a resin, the joint comprising:
    a joint body having a tube coupling part and a main body thread part, the tube coupling part constituting one axial end side of the joint body and having at least a portion of a periphery covered by the tube, the main body thread part having an outer diameter greater than an outer diameter of the tube coupling part, and an axially extending through hole being formed in the joint body;
    a nut having a nut thread part and a constricted diameter part, the nut thread part threadedly engageable with the main body thread part in a state in which the tube coupling part of the joint body is inserted from an axial direction, the constricted diameter part being disposed on an insertion and travel side of the nut and having an inner diameter smaller than an inner diameter of the nut thread part, and the tube coupling part being inserted and traveling toward the insertion and travel side of the nut; and
    a ring arranged in a space radially inward of the nut thread part of the nut, the ring abutting an abutted part that is a portion of the constricted diameter part of the nut, and the ring having a Young's modulus greater than that of the tube,
    the ring having a curved surface part at least at a radially inward portion of the ring axially facing the joint body, the curved surface part bulging radially inwardly and axially toward the joint body, and
    a maximum thickness of the ring in a radial direction being defined as 2r, an axial length of the curved surface part of the ring being defined as h, and α=h/r being 0.5 to 1.2.

2. The joint according to claim 1, wherein the curved surface part of the ring constitutes an arc or an ellipsoid arc axially in cross-section.

3. The joint according to claim 2, wherein the radially inward portion of the ring has a shape more rounded than a radially outward portion of the ring.

4. The joint according to claim 2, wherein the abutted part of the constricted diameter part of the nut abuts a portion of the ring during tightening, and at the abutted part, the ring primarily has a portion inclined between 1.0 degrees and 7.0 degrees relative to a primary surface of the abutted part of the nut such that the portion of the ring is positioned closer to the abutted part as the portion of the ring extends radially inward.

5. The joint according to claim 2, wherein a radially outward surface in a vicinity of an end part of the tube coupling part of the joint body on the insertion and travel side of the nut is inclined between 30 degrees and 60 degrees relative to an axial direction.

6. The joint according to claim 2, wherein the tube is composed of a resin composition containing at least one of PFA and FEP, the nut is composed of a resin composition containing at least one selected from the group consisting of PTFE, PFA, PVDF, ETFE, and ECTFE, and the ring is composed of a resin composition containing at least one selected from the group consisting of PTFE, PFA, PCTFE, PVDF, ETFE, ECTFE, PPS, and PEEK.

7. The joint according to claim 2, wherein the ring is non-transparent, and the nut is transparent or translucent.

8. The joint according to claim 1, wherein the radially inward portion of the ring has a shape more rounded than a radially outward portion of the ring.

9. The joint according to claim 8, wherein the abutted part of the constricted diameter part of the nut abuts a portion of the ring during tightening, and at the abutted part, the ring primarily has a portion inclined between 1.0 degrees and 7.0 degrees relative to a primary surface of the abutted part of the nut such that the portion of the ring is positioned closer to the abutted part as the portion of the ring extends radially inward.

10. The joint according to claim 8, wherein a radially outward surface in a vicinity of an end part of the tube coupling part of the joint body on the insertion and travel side of the nut is inclined between 30 degrees and 60 degrees relative to an axial direction.

11. The joint according to claim 8, wherein the tube is composed of a resin composition containing at least one of PFA and FEP, the nut is composed of a resin composition containing at least one selected from the group consisting of PTFE, PFA, PVDF, ETFE, and ECTFE, and the ring is composed of a resin composition containing at least one selected from the group consisting of PTFE, PFA, PCTFE, PVDF, ETFE, ECTFE, PPS, and PEEK.

12. The joint according to claim 8, wherein
the ring is non-transparent, and the nut is transparent or translucent.

13. The joint according to claim 1, wherein
the abutted part of the constricted diameter part of the nut abuts a portion of the ring during tightening, and
at the abutted part, the ring primarily has a portion inclined between 1.0 degrees and 7.0 degrees relative to a primary surface of the abutted part of the nut such that the portion of the ring is positioned closer to the abutted part as the portion of the ring extends radially inward.

14. The joint according to claim 13, wherein
a radially outward surface in a vicinity of an end part of the tube coupling part of the joint body on the insertion and travel side of the nut is inclined between 30 degrees and 60 degrees relative to an axial direction.

15. The joint according to claim 13, wherein
the tube is composed of a resin composition containing at least one of PFA and FEP,
the nut is composed of a resin composition containing at least one selected from the group consisting of PTFE, PFA, PVDF, ETFE, and ECTFE, and
the ring is composed of a resin composition containing at least one selected from the group consisting of PTFE, PFA, PCTFE, PVDF, ETFE, ECTFE, PPS, and PEEK.

16. The joint according to claim 1, wherein
a radially outward surface in a vicinity of an end part of the tube coupling part of the joint body on the insertion and travel side of the nut is inclined between 30 degrees and 60 degrees relative to an axial direction.

17. The joint according to claim 16, wherein
the tube is composed of a resin composition containing at least one of PFA and FEP,
the nut is composed of a resin composition containing at least one selected from the group consisting of PTFE, PFA, PVDF, ETFE, and ECTFE, and
the ring is composed of a resin composition containing at least one selected from the group consisting of PTFE, PFA, PCTFE, PVDF, ETFE, ECTFE, PPS, and PEEK.

18. The joint according to claim 1, wherein
the tube is composed of a resin composition containing at least one of PFA and FEP,
the nut is composed of a resin composition containing at least one selected from the group consisting of PTFE, PFA, PVDF, ETFE, and ECTFE, and
the ring is composed of a resin composition containing at least one selected from the group consisting of PTFE, PFA, PCTFE, PVDF, ETFE, ECTFE, PPS, and PEEK.

19. The joint according to claim 1, wherein
the ring is non-transparent, and the nut is transparent or translucent.

20. A joint assembly comprising:
a tube including a resin; and
a joint connected to the tube, the joint including
    a joint body having a tube coupling part and a main body thread part, the tube coupling part constituting one axial end side of the joint body and having at least a portion of a periphery covered by the tube, the main body thread part having an outer diameter greater than an outer diameter of the tube coupling part, and an axially extending through hole being formed in the joint body,
    a nut having a nut thread part and a constricted diameter part, the nut thread part threadedly engageable with the main body thread part in a state in which the tube coupling part of the joint body is inserted from an axial direction, the constricted diameter part being disposed on an insertion and travel side of the nut and having an inner diameter smaller than an inner diameter of the nut thread part, and the tube coupling part being inserted and traveling toward the insertion and travel side of the nut, and
    a ring arranged in a space radially inward of the nut thread part of the nut, the ring abutting an abutted part that is a portion of the constricted diameter part of the nut, and the ring having a Young's modulus greater than that of the tube,
the ring having a curved surface part at least at a radially inward portion of the ring axially facing the joint body, the curved surface part bulging radially inwardly and axially toward the joint body, and
a maximum thickness of the ring in a radial direction being defined as 2r, an axial length of the curved surface part of the ring being defined as h, and $\alpha = h/r$ being 0.5 to 1.2.

* * * * *